(12) United States Patent
Heim

(10) Patent No.: US 7,806,825 B2
(45) Date of Patent: Oct. 5, 2010

(54) DIAGNOSTIC SIGNAL PROCESSING METHOD AND SYSTEM

(75) Inventor: Warren P. Heim, Boulder, CO (US)

(73) Assignee: Team Medical LLC, Boulder, CO (US)

( * ) Notice: Subject to any disclaimer, the term of this patent is extended or adjusted under 35 U.S.C. 154(b) by 1880 days.

(21) Appl. No.: 10/714,020

(22) Filed: Nov. 14, 2003

(65) Prior Publication Data

US 2004/0122317 A1 Jun. 24, 2004

Related U.S. Application Data

(60) Provisional application No. 60/426,348, filed on Nov. 14, 2002.

(51) Int. Cl.
*A61B 8/00* (2006.01)
(52) U.S. Cl. .................. 600/453; 600/437; 600/456; 73/595; 367/7; 367/11; 367/130; 367/138
(58) Field of Classification Search .............. 600/437, 600/453, 456; 73/595–633; 367/7, 11, 130, 367/138
See application file for complete search history.

(56) References Cited

U.S. PATENT DOCUMENTS

| 4,509,526 A | | 4/1985 | Barnes et al. ............ 128/663 |
| 5,628,321 A | * | 5/1997 | Scheib et al. ............ 600/453 |
| 6,134,268 A | * | 10/2000 | McCoy ..................... 375/229 |

FOREIGN PATENT DOCUMENTS

WO WO2004/046877 A3 6/2004

OTHER PUBLICATIONS

David, Jean-Yves, Steven A. Jones, and Don P. Gidddens. "Modern Spectral Analysis Techniques for Blood Flow Velocity and Spectral Measurements with Pulsed Doppler Ultrasound", IEEE Transactions on Biomedical Engineering, 38:6 (Jun. 1991) 589-596.*
Boor, C. A Practical Guide to Splines. Springer-Verlag: New York, 1978. pp. xi-3, 108-115, 136-139, 154-161, 165-169, 235-239, 270-273.

(Continued)

*Primary Examiner*—Brian Casler
*Assistant Examiner*—John F Ramirez
(74) *Attorney, Agent, or Firm*—Marsh Fischmann & Breyfogle LLP

(57) ABSTRACT

A signal processing utility is disclosed involving time-to-frequency domain transforms for applications including medical diagnostic signal processing. Such transforms can be used to define a continuous spectral density function or other spectral density function including nonzero values at irregularly spaced frequency intervals. The invention thereby enables more accurate representation of certain real spectra and reduced spectral broadening. The utility also accounts for digitization errors associated with analog-to-digital conversion. The invention has particular advantages with respect to medical contexts where the received signal has a changing spectral content as a result of interaction of an interrogating signal with moving physiological material such as blood flowing through an artery.

15 Claims, 45 Drawing Sheets

OTHER PUBLICATIONS

Conte, Samuel D. and Carl de Boor. Elementary Numerical Analysis. McGraw-Hill: New York, 1980. pp. 235-253.

Hillier, Frederick S. and Gerald J. Lieberman. Introduction to Operations Research (Seventh Edition). McGraw-Hill: New York, 2001. pp. 697-699.

Fletcher, R. Practical Methods of Optimization (Second Edition). John Wiley & Sons: New York, 1987. pp. 110-119, 139-145, 277-297, 322-325, 357-389.

Bertsekas, Dimitri P. Constrained Optimization and Lagrange Multiplier Methods. Athena Scientific: Belmont, Massachusetts, 1996. pp. 1-11, 18-31, 34-51, 58-61, 66-105, 120-125, 158-167, 302-321, 358-381.

Bhatti, M. Asghar. Practical Optimization Methods. Springer-Verlag: New York, 1998. pp. 585-599.

Pollock, D.S.G. Handbook of Time Series Analysis, Signal Processing and Dynamics. Harcourt Brace Academic Press (ISBN: 0 1256 0990 6), 1999. http://alpha.qmul.ac.uk/~ugte133/book/ pp. 3-17, 27-43, 227-244, 278-291, 365, 386-388, 313-547, 549-550, 555-573, 575-576, 583-593, 607-614, 637-643, 657-663, 667-681, 697-717.

Arnold, Douglas N. A Concise Introduction to Numerical Analysis. Published online. (2001). http://www.ima.umn.edu/~arnold/597.00-01/nabook.pdf pp. 1-34, 91-108, 196-206.

Boyd, John P. Chebyshev and Fourier Spectral Methods (Second Edition). Dover Publications: Mineola, NY (ISBN: 0486411834), 2001. http://www-personal.engin.umich.edu/~jpboyd/ aaabook. 9500may00.pdf pp. 1-31, 61-96, 172-179, 202-209, 222-227, 425-430, 473-478.

Bretthorst, G. Larry. Bayesian Spectral Analysis and Parameter Estimation. Springer-Verlag: New York (ISBN: 0-387-96871-7), 1988. pp. 1-11, 31-35, 43-53, 70-86, 108-115, 179-181.

Helmberg, C. Semidefinite Programming for Combinatorial Optimization. ZIB-Report 00-34, Konrad-Zuse-Zentrum fü,r Informationstechnik, Berlin (Oct. 2000). pp. 25-37, 63-143.

Byrne, Charles L. Mathematics of Signal Processing, Published Online (Aug. 28, 2003). http://faculty.uml.edu/cbyrne/master.pdf pp. 1-2, 13-15, 21-22, 41-45, 53-55, 65-69, 71-78, 83-84, 99-113, 115-118, 143-157, 163-167, 177-179, 181-195, 197-199, 201-207, 209-211, 219-227, 229-237, 239-250, 273-276.

Qi, Yuan, Thomas P. Minka, and Rosalind W. Picard. "Bayesian Spectral Estimation of Unevenly Sampled Nonstationary Data", 2002 International Conference on Acoustics, Speech, and Signal Processing (ICASSP 2002), IEEE, 2002.

Fischer, R. "The Adaptive Resolution Concept in Form-free Distribution Estimation", in W. Kluge, editor, Proceedings of the Workshop on Physics and Computer Science, Christian-Albrechts-University, Kiel, Germany, 1999. http://www.ipp.mpg.de/OP/Datenanalyse/Publications/Papers/fischer99b.ps.

Afify, Eldesoky E. "Comparison of Estimators of Parameters for the Rayleigh Distribution", Published online (2003), http://interstat.stat.vt.edu/InterStat/ARTICLES/2003/articles/U03001.pdf.

Andersen, Kim E. and Martin B. Hansen. "Multiplicative Censoring: Density Estimation by a Series Expansion Approach", Journal of Statistical Planning and Inference, 98 (2001) 137-155.

Gray, Robert M. and David L. Neuhoff. "Quantization", IEEE Transactions on Information Theory, 44:6 (Oct. 1998) 1-63.

Bercher, Jean-François and Christope Vignat. "Estimating the Entropy of a Signal with Applications", IEEE Transactions on Signal Processing, 48:6 (Jun. 2000) 1687-1694.

Le Besnerais, G., J.-F. Bercher, and G. Demoment G. "A New Look at the Entropy for Solving Linear Inverse Problems", (1994), http://citeseer.ist.psu.edu/rd/43454121%2C359896%2C1%2C0.25%2CDownload/http://citeseer.ist.psu.edu/compress/0/papers/cs/4080/ftp:zSzzSzftp.supelec.frzSzlsszSzReportszSzBercherzSzThesis95zSzAnnexeG.ps.gz/lebesnerais94new.ps.

Rojas, Marielba. A Large-Scale Trust-Region Approach to the Regularization of Discrete Ill-Posed Problems. Ph.D. thesis, Rice University (1998). http://citeseerast.psu.edu/rd/83232819%2C438834%2C1%2C0.25%2CDownload/ftp%3AqSqqSqftp.caam.rice.eduqSqpubqSqpeopleqSqmrojasqSqthesis.ps.gz.

Kilmer, Misha E. and Dianne P. O'Leary. "Choosing Regularization Parameters in Iterative Methods for Ill-Posed Problems" SIAM J. on Matrix Analysis and Applications, 22 (2001) 1204-1221.

Schäfer, Hartmut, "Inverse Ill-posed Problems in Experimental Data Analysis in Physics", Physics in Canada (1997). http://www.physics.brocku.ca/faculty/sternin/ip.ps.

Liu, Yangang and W. Patrick Arnott, and John Hallett. "Particle Size Distribution Retrieval from Multispectral Optical Depth: Influence of Particle Nonsphericity and Refractive Index", J. Geophys. Res. 104 (1999) 31753-31762.

Powell, M.J.D. "Direct Search Algorithms for Optimization Calculations", Acta Numerica 7, (1998) 287-336.

Musicant, David R. and Alexander Feinberg. "Active Set Support Vector Regression", IEEE Transactions on Neural Networks 15 (Mar. 2004) 268-275. http://www.cs.wisc.edu/~musicant/tr0102.ps.

Helmberg, C. and K.C. Kiwiel. "A Spectral Bundle Method with Bounds", Mathematical Programming 93 (2002) 173-194. http://citeseer.ist.psu.edu/rd/43454121%2C360001%2C1%2C0.25%2CDownload/http://citeseer.ist.psu.edu/compress/0/papers/cs/12460/ftp:zSzzSzftp.zib.dezSzpubzSzzib-publicationszSzreportszSzSC-99-37.ps.gz/helmberg99spectral.ps.

Fortin, Charles. A Survey of the Trust Region Subproblem within a Semidefinite Framework, Masters Thesis, University of Waterloo (2000).

Byrd, Richard H. and Jorge Nocedal. "Active Set and Interior Methods for Nonlinear Optimization", Doc.Math.J.DMV Extra vol. ICM III (1998) 667-676. http://citeseer.ist.psu.edu/rd/43454121%2C252133%2C1%2C0.25%2CDownload/http://citeseer.ist.psu.edu/compress/0/papers/cs/11516/http:zSzzSzwww.mathematik.uni-bielefeld.dezSzdocumentazSzxvol-icmzSz17zSzNocedal.MAN.ps.gz/active-set-and-.

Symes, William W. "Extrernal Regularization", http://www.caam.rice.edu/caam/trs/99/TR99-07.ps, 1999.

Fletcher, Roger and Sven Leyffer. "Nonlinear Programming Without a Penalty Function", Dundee Numerical Analysis Report NA/171, revised version(Aug. 2000). http://citeseer.ist.psu.edu/rd/43454121%2C471645%2C1%2C0.1%2CSource/http%3AqSqqSqwww.maths.dundee.ac.ukqSq%7EfletcherqSq.

Baryamureeba, Venansius, On Solving Large Sparse Linear Systems arising from Linear Programming and Linear Regression, Dr. S. Thesis, University of Bergen, Norway (Mar. 2000).

Byrd, Richard H. and Marcello Marazzi, and Jorge Nocedal. "On the Convergence of Newton Iterations to Non-Stationary Points", Report OTC 2001/01, Optimization Technology Center, Northwestern University, Evanston, IL. (Mar. 22, 2002). http://www.cs.colorado.edu/~richard/failofconv.ps.

Dias, Fabio Silva, "Quadratic Programming Applied to Modern Portfolio Selection", Published online. http://www.linux.ime.usp.br/~cef/mac499-01/monografias/fdias-rec/QP.pdf.

MacMillan, Daniel, Relaxing Convergence Conditions to Improve the Convergence Rate, Ph.D. Thesis, University of Colorado at Denver (1999). http://citeseer.ist.psu.edu/rd/64973575%2C72603%2C1%2C0.25%2CDownload/http://citeseer.ist.psu.edu/compress/0/papers/cs/6842/http:zSzzSzwww-math.cudenver.eduzSzgraduatezSzthesiszSzmacmillan.ps.gz/macmillan99relaxing.ps.

Vandenberghe, Lieven and Stephen Boyd. "Semidefinite Programming", SIAM Review 38: 1 (Mar. 1996) 49-95.

Berkelaar, Arlan B., Benjamin Jansen, Kees Roos, and Tamas Terlaky. "Sensitivity Analysis in (Degenerate) Quadratic Programming", No. 30 in Econometric Institute Report from Erasmus University Rotterdam, Econometric Institute(1996). http://www.eur.nl/WebDOC/doc/econometric/eeb19960111120022.ps.

Santarelli, Maria Filomena and Luigi Landini, "A Model of Ultrasound Backscatter for the Assessment of Myocardial Tissue Structure and Architecture", IEEE Transactions on Biomedical Engineering, 43:9 (Sep. 1996) 901-911.

Hammer, Martin, Anna N. Yaroslavskyna, and Dietrich Schweitzer. "A Scattering Phase Function for Blood with Physiological Haematocrit", Physics in Medicine and Biology 46 (2001) N65-N69.

Fontaine, Isabelle, Michel Bertrand, and Guy Cloutier. "A System-Based Approach to Modeling the Ultrasound Signal Backscattered by Red Blood Cells", Biophysical Journal 77 (1999) 2387-2399.

Wang, Tao and Jafar Sanije. "Analysis of Low-Order Autoregressive Models for Ultrasonic Grain Signal Characterization", IEEE Transactions on Ultrasonics, Ferroelectrics, and Frequency Control 38:2 (1991) 116-124.

Baldeweck, T. and P. Laugier, A. Herment, and G. Berger. "Application of Autoregressive Spectral Analysis for Ultrasound Attenuation Estimation: Interest in Highly Attenuating Medium", IEEE Transactions on Ultrasonics, Ferroelectrics, and Frequency Control 42:1 (1995) 99-110.

Wójcik, Janusz. "Conservation of Energy and Absorption in Acoustic Fields for Linear and Nonlinear Propagation", Journal Acoustical Society of America 104: 5 (Nov. 1998) 2654-2663.

He, Ping. "Determination of Ultrasonic Parameters Based on Attenuation and Dispersion Measurements", Ultrasonic Imaging 20 (1998) 275-287.

Varghese, Tomy. "Estimating Mean Scatter Spacing with Frequency-Smoothed Spectral Autocorrelation Function", IEEE Transactions on Ultrasonics, Ferroelectrics, and Frequency Control 42:3 (1995) 451-463.

Chen, Jian-Feng and James A. Zagzebski. "Frequency Dependence of Backscatter Coefficient Versus Scatterer vol. Fraction", IEEE Transactions on Ultrasonics, Ferroelectrics, and Frequency Control 43:3 (1996) 345-353.

Wear, K. A., R.F. Wagner, and B.S. Garra. "High Resolution Ultrasonic Backscatter Coefficeint Estimation Based on Autoregressive Spectral Estimation Using Burg's Algorithm", IEEE Transactions on Medical Imaging 13: 3 (1994) 500-507.

Wear, Keith A. "The Effects of Frequency-Dependent Attenuation and Dispersion on Sound Speed Measurements: Applications in Human Tabecular Bone", IEEE Transactions on Ultrasonics, Ferroelectrics, and Frequency Control 47:1 (2000)265-273.

Donohue, Kevin D. "Maximum Likelihood Estimation of A-Scan Amplitudes for Coherent Targets in Media of Unresolvable Scatterers", IEEE Transactions on Ultrasonics, Ferroelectrics, and Frequency Control 39:3 (1992) 422-431.

Filipczyński, L., T. Kujawska, R. Tymkiewicz, and J. Wójcik. "Nonlinear and Linear Propagation of Diagnostic Ultrasound Pulses", Ultrasound in Medicine and Biology 25:2 (1999) 285-299.

Narayanan, V. Manoj and P.M. Shankar. "Non-Rayleigh Statistics of Ultrasonic Backscattered Signals", IEEE Transactions on Ultrasonics, Ferroelectrics, and Frequency Control 41:6 (1994) 845-852.

Kutay, M. Alper, Athina P. Petropulu, and Catherine W. Piccoli. "On Modeling Biomedical Ultrasound RF Echoes Using a Power-Law Shot-Noise Model", work sponsored by NIH grant CA-52823 and NSF grant MIP-9553227, Oct. 1998 and Jun. 2000.

Donohue, Kevin D., John M. Bressler, Tomy Varghese, and Nihat M. Bilgutay. "Spectral Correlation in Ultrasonic Pulse Echo Signal Processing", IEEE Transactions on Ultrasonics, Ferroelectrics, and Frequency Control 40:4 (1993) 330-337.

Girault, Jean-Marc, Frédéric Ossant, Abdeljalil Ouahabi, Denis Konamé, and Frédéric Patat. "Time-varying Autoregressive Spectral Estimation for Ultrasound Attenuation in Tissue Characterization", IEEE Transactions on Ultrasonics, Ferroelectrics, and Frequency Control 45:3 (1998) 650-659.

Erikson, Kenneth R., Francis J. Fry, and Joie P. Jones. "Ultrasound in Medicine-A Review", IEEE Transactions on Sonics and Ultrasonics, us-21:3 (1974) 144-170.

Marple Jr., S. Lawrence. "A Tutorial Overview of Modern Spectral Estimation", IEEE CH2673-2/89/0000-2152 (1989).

Jensen, Jørgen Arendt. "An Analysis of Pulsed Wave Ultrasound Systems for Blood Velocity Estimation", presented at Acoustical Imaging 22 (1995). http://www.es.oersted.dtu.dk/ftp/bme/conferences/1995/jai_ai_1995.ps.

Hong, X., P.M. Sharkey, and K. Warwick. "Automatic Nonlinear Predictive Model-construction Algorithm Using Forward Regression and the PRESS Statistic", IEEE Proc.-Control Theory Appl. 150:3 (May 2003) 245-254).

Chen, Yang. Bayesian Time Series: Financial Models and Spectral Analysis. Ph.D. Thesis, Duke University (1997). http://ftp.stat.duke.edu/Theses/yang.ps.gz pp. iv-v, 1-47, 61-102, 106-132.

Jenet, F.A. and T.A. Prince. "Detection of Variable Frequency Signals Using a Fast Chirp Transform", Physical Review D (Particles, Fields, Gravitation, and Cosmology) 62 (2000) 122001. http://arxiv.org/PS_cache/gr-qc/pdf/0012/0012029.pdf.

Güler, İnan, Firat Hardalaç, and Serdar Müldür. "Determination of Aorta Failure with the Application of FFT, AR and Wavelet Methods to Doppler Technique", Computers in Biology and Medicine 31 (2001) 229-238.

Übeyli, Elif Derya and İnan Güler. "Determination of Stenosis and Occlusion in Arteries with the Application of FFT, AR, and ARMA Methods", Journal of Medical Systems 27:2 (Apr. 2003) 105-120.

Nus, Patrice, Olivier Caspary, and Francois Devillard. "DSP-Based Sliding Hartley Transform for Real-Time Spectral Analysis with Zoom Effect", ICSPAT'96—7th International Conference on Signal Processing Applications & Technology, Boston, (Oct. 7-10,1996) vol. 1, 151-154.

Molgedey, Lutz and Elvis Galic. "Extracting Factors for Interest Rate Scenarios", The European Physical Journal B, 20:4 (Apr. 2001) 517-522. http://summa.physik.hu-berlin.de/papers/LutzMolgedey/yieldcurve.ps.gz.

Amaldi, Edoardo and Marco Mattavelli. "A Combinatorial Optimization Approach to Extract Piecewise Linear Structure from Nonlinear Data and an Application to Optical Flow Segmentation", Technical Report 97-12, Cornell Computational Optimization Project (CCOP), Cornell University, New York, School of Operations Research and Industrial Engineering, Cornell University, 1997.

Morelli, Eugene A. "High Accuracy Evaluation of the Finite Fourier Transform Using Sampled Data", NASA Technical Memorandum 110340, National Aeronautics and Space Administration, Langley Research Center, Hampton, VA (Jun. 1997). http://techreports.larc.nasa.gov/ltrs/PDF/1997/NASA-97-tm110340.pdf.

Allam, Mahmaud E. and James F. Greenleaf. "Isomorphism Between Pulsed-Wave Doppler Ultrasound and Direction-of-Arrival Estimation-Part I: Basic Principles", IEEE Transactions on Ultrasonics, Ferroelectrics, and Frequency Control 43:5 (1996) 911-922.

Keeton, P.I.J. and F.S. Schlindwein. "Spectral Broadening of Clinical Doppler Signals Using FFT and Autoregressive Modelling", European Journal of Ultrasound 7 (1998) 209-218.

Bailey, David H. and Paul N. Swarztrauber. "The Fractional Fourier Transform and Applications", SIAM Review 33:3 (Sep. 1991) 389-404. http://crd.lbl.gov/~dhbailey/dhbpapers/fracFFT.pdf.

Mordant, Nicolas and Jean-François Pinton. "Time Resolved Tracking of a Sound Scatterer in a Complex Flow: Non-stationary Signal Analysis and Applications", The Journal of the Acoustical Society of America, 112:1 (2002) 108-118. http://arxiv.org/PS_cache/physics/pdV0103/0103083.pdf.

Hansen, P.C. "The L-curve and its Use in the Numerical Treatment of Inverse Problems", Computational Inverse Problems in Electrocardiology, ed. P. Hohnston, Advances in Computational Bioengineering, vol. 4. WIT Press, Southampton (2000), 119-142. http://www.imm.dtu.dk/documents/ftp/tr99/tr15_99.pdf.

Bell, B.M. and D.B.Percival. "A Two Step Burg Algorithm", IEEE Transactions on Signal Processing, 39:1 (Jan. 1991) 185-189.

Broersen, Piet M. T. "Automatic Spectral Analysis with Time Series Models", IEEE Transactions on Instrumentation and Measurement, 51:2 (Apr. 2002) 211-216.

Broersen, Piet M.T. "Autogregressive Model Orders for Durbin's MA and ARMA Estimators", IEEE Transactions on Signal Processing, 48:8 (Aug. 2000) 2454-2457.

Güler, I., F. Hardalaç and F.S. Erol. "Comparison of FFT, AR and Wavelet Methods in Transcranial Doppler Signal Obtain from Intracerebral Vessels" 2001 Proceedings of the 23rd Annual EMBS International Conference, Istanbul, Turkey (Oct. 25-28, 2001) 1832-. 1834.

Durbin, J. "Efficient Estimation of Parameters in Moving-Average Models", Biometrika, 46:3/4 (Dec. 1959), 306-316.

Broersen, Piet M. T. "Facts and Fiction in Spectral Analysis", IEEE Transactions on Instrumentation and Measurement, 49:4 (Aug. 2000) 766-772.

Broersen, P. M. T. "Facts and Fiction in Spectral Analysis of Stationary Stochastic Processes", S. Theodoridis, I. Pitas, A. Stouraitis, N. Kalouptsidis (eds.); Signal Processing IX: Theories and Applications, Proceedings Eusipco Conference, Rhodes, Greece, (1998) 61-64. ISBN: 9607620062.

Broersen, Piet M.T. "Finite Sample Criteria for Autoregressive Order Selection", IEEE Transactions on Signal Processing, 48:12 (Dec. 2000) 3550-3558.

Ruano, M. Graca. "Numerical Techniques for Modeling Doppler Ultrasound Spectral Systems", Journal of Computational Acoustics, 9:3 (2001) 805-814.

Stetsen, Paul F. and Jørgen Arendt Jensen. "Real-Time Blood Flow Estimation Using a Recursive Least-Squares Lattice Filter", IEEE Ultrasonics Symposium Proceedings, (Oct. 1997) 1259-1262. http://www.es.oersted.dtu.dk/ftp/bme/conferences/1997/pfs_jaj_ieee_symp_1997.pdf.

Broersen, P.M.T. "The Quality of Models for ARMA Processes", IEEE Transactions on Signal Processing, 46:6 (Jun. 1998) 1749-1752.

Helmberg, Christoph and Franz Rendl. "A Spectral Bundle Method for Semidefinite Programming", SIAM Journal on Optimization, 10:3 (2000) 673-696.

Nash, Stephen G. and Ariela Sofer, "Why Extrapolation Helps Barrier Methods", (1998) http://bass.gmu.edu/~asofer/nashl3.ps.

Neumaier, Arnold. "Solving Ill-conditioned and Singular Linear Systems: A Tutorial on Regularization", SIAM Review, 40 (1998), 636-666. http://www.mat.univie.ac.at/~neum/ms/regtutorial.pdf.

Cvetkovif, Zoran and Martin Vetterli, "Error Rate Characteristics of Oversampled Analog-to-digital Conversion", IEEE Transactions on Information Theory, 44:5 (Sep. 1998) 1961-1964.

Voutilainen, Arto. Statistical Inversion Methods for the Reconstruction of Aerosol Size Distributions, Ph.D. Thesis, University of Kuopio (2001). 24-25.

Reginska, Teresa . "Regularization of Discrete Ill-posed Problems", Published online (Sep. 2002) http://www.impan.gov.pl/Preprints/p630.pdf.

Watson, G.A. "Data Fitting Problems with Bounded Uncertainties in the Data", SIAM J Matrix Analysis and Applications, 22:4 (2001) 1274-1293. http://www.maths.dundee.ac.uk/~gawatson/35659.ps.

Schäfer, H., E. Sternin, R. Stannarius, M. Arndt, and F. Kremer . . . "Novel Approach to the Analysis of Broadband Dielectric Spectra", Physical Review Letters, 76:12 (Mar. 1996) http://www.uni-leipzig.de/~stann/papers/PRL02177.pdf.

Buttgereit, R., T. Roths, J. Honerkamp, and L. B. Aberle. "Simultaneous Regularization Method for the Determination of Radius Distributions from Experimental Multiangle Correlation Functions", Physical Review E, 64:4 (Statistical, Nonlinear, and Soft Matter Physics) (Oct. 2001) 041404-1 to 041404-10. http://www.ifam.fhg.de/2804/indkt/klebchem/licht/literatur/multiangle_correction_functions.pdf.

Kilmer, Misha and G. W. Stewart. "Iterative Regularization and MINRES", SIAM J Matrix Analysis and Applications, 21:2(1999) 613-628. http://www.tufts.edu/~mkilme01/papers/minres.pdf.gz.

Chandrasekaran S., G. Golub, M. Gu, and A. H. Sayed, "An Efficient Algorithm for a Bounded Errors-in-variables Model", SIAM J Matrix Analysis and Applications, 20:4 (Oct. 1999) 839-859. http://www.ee.ucla.edu/asl/publications/journal_articles/simax_oct_1999.pdf.

Rojas, M. and D.C. Sorensen. "A Trust-Region Approach to the Regularization of Large-Scale Discrete Ill-Posed Problems" Technical Report TR99-26, Department of Computational and Applied Mathematics, Rice University, (1999, Revised 2001). Also published in SIAM Journal on Scientific Computing, 23:6 (2002)1842-1860.

Birbil, S. Ilker, Shu-Cherng Fang, and Jiye Han. "Entropic Regularization Approach for Mathematical Programs with Equilibrium Constraints", ERIM Report Series Reference No. ERS-2002-71-LIS. Erasmus Research Institute of Management, Erasmus Universiteit, Rotterdam (Mar. 11, 2003). http://papers.ssrn.com/sol3/Delivery.cfm/222.pdf?abstractid=371020.

de Waele, S. and P.M.T. Broersen. "Spectral Analysis of Segmented Data", Proceedings of CDC 2000, Conference on Decision and Control, Sydney, Australia, Dec. 2000, 189-190.

Broersen, P.M.T and S. de Waele, "Windowed Periodograms and Moving Average Models", Proceedings of CDC 2000, Conference on Decision and Control, Sydney, Australia, Dec. 2000, 2706-2709. http://www.dcsc.tudelft.nl/Research/PubSSC/dsis/publications/deWaele_S/WPerMACDC00.pdf.

Pardey, J., S. Roberts, and L. Tarassenko, "A Review of Parametric Modelling Techniques for EEG Analysis", Med Eng Phys 18:1 (1996) 2-11. http_citeseer.ist.psu.edu_cache_papers_cs_902_http_zSzzSzwww.ee.ic.ac.ukzSzhpzSzstaffzSzsjrobzSzPubszSzjmep.pdf_pardey96review.

Elter, Peter; Eric Seiter, Torsten Karch, Wilhelm Stork, Klaus D. Mueller-Glaser, and Norbert Lutter. "Noninvasive Real Time Laser Doppler Flowmetry in Perfusion Regions and Larger Vessels", SPIE Proceedings vol. 3570 Biomedical Sensors, Fibers, and Optical Delivery Systems ISBN: 0-8194-3032-3 (1999) 244:254.

Kaluzynski, Krzysztof. "Minimum Variance Method in Spectral Analysis of Ultrasonic Doppler Blood Flow Velocity Signal", IEEE Engineering in Medicine & Biology Society 11th Annual International Conference, 0071 CH2770-6/89/0000-0071 (1989).

Oung, Harry and J.M. Reid. "The Analysis of Nonstationary Doppler Spectrum Using a Modified Wigner Distribution", Annual International Conference of the IEEE Engineering in Medicine and Biology Society 12:1 (1990) 460-461.

Bastos, Carlos A.C., Peter J. Fish, and Francisco Vaz. "Acceleration Effects in Doppler Ultrasound Signals from Pulsatile Flow", Proceedings 19th International Conference IEEE/EMBS Chicago, IL., 0-7803-42-3/97. (1997) 238-241.

Yeh, Chih-Kuang and Pai-Chi Li. "Doppler Angle Estimation Using the AR Spectrum Model", 2000 IEEE Ultrasonics Symposium 0-7803-6365-5/00, (2000) 1513-1516.

Marple, S. Lawrence. "Time-Frequency Signal Analysis: Issues and Alternative Methods", Proceedings of the IEEE 0-7803-5073-1/98, (1998) 329-332.

David, Jean-Yves, Steven A. Jones, and Don P. Gidddens. "Modern Spectral Analysis Techniques for Blood Flow Velocity and Spectral Measurements with Pulsed Doppler Ultrasound", IEEE Transactions on Biomedical Engineering, 38:6 (Jun. 1991) 589-596.

Aldis, Geoffrey K. And Rosemary S. Thompson. "Calculation of Doppler Spectral Power Density Functions", IEEE Transactions on Biomedical Engineering, 39:10 (Oct. 1992) 1022-1030.

Forsberg, Flemming. "194. On the Usefulness of Singular Value Decomposition—ARMA Models in Doppler Ultrasound", IEEE Transactions on Ultrasonics, Ferroelectrics, and Frequency Control, 38:5 (1991) 418-428.

Li, Pai-Chi, Chen Chong-Jing, and Che-Chou Shen. "Doppler Angle Estimation Using Correlation", IEEE Transations on on Ultrasonics, Ferroelectrics, and Frequency Control, 347:1 (2000) 188-196.

Ahn, Young Bok and Song Bai Park. Estimation of Mean Frequency and Variance of Ultrasonic Doppler Signal by Using Second-Order Autoregressive Model, IEEE Transactions on Ultrasonics, Ferroelectrics, and Frequency Control, 38:3 (1991) 172-182.

Palmer, Robert D., J.R. Cruz, and Dusan S. Zraic. "Enhanced Autoregressive Moving Average Spectral Estimation Applied to the Measurement of Doppler Spectral Width", IEEE Transactions on Geoscience and Remote Sensing, 29:3 (1991) 358-368.

Loupas, Thanasis and W. Norman McDicken. "Low-Order Complex AR Models for Mean and Maximum Frequency Estimation in Context of Doppler Color Flow Mapping", IEEE Transactions on Ultrasonics, Ferroelectrics, and Frequency Control, 37:6 (1990) 590-601.

Yeh, Chih-Kuang and Li, Pai-Chi. "Doppler angle estimation using AR modeling", IEEE Transactions on Ultrasonics, Ferroelectrics, and Frequency Control, 49:6 (2002) 683-692.

Bascom, Peter A.J. and Richard S.C. Cobbold. "Origin of the Doppler Ultrasound Spectrum from Blood", IEEE Transactions on Biomedical Engineering, 43:6 (1996) 562-571.

* cited by examiner

Example Spectral Density Function

Example Gaussian Pulse

Example Amplitude Function Made from 10 Piecewise Continuous Functions
(hollow dots are the knot points)

Example Amplitude Function Composed of Multiple Functions with Overlapping Domains
(the top curve is the sum of the curves beneath it)

Example Phase Angle with Doppler

Example Phase Angle with Doppler when Emitted Frequency Selected to Produce
Approximately Linear Phase Angle Response Example Phase Angle with Doppler when Emitted Frequency Selected to Produce Always Positive and Approximately Linear Phase Angle Response Example sin(Phase Angle) with Doppler when Emitted Frequency Selected to Produce Positive Phase Angle Response Close to Zero Phase Angle Example cos(Phase Angle) with Doppler when Emitted Frequency Selected to Produce Positive Phase Angle Response Close to Zero Phase Angle Example Phase Angle with Doppler using 2 MHz Emitted Signal Example cos(phase angle) with Doppler using 2 MHz Emitted Signal Example sin(phase angle) with Doppler with 2 MHz Emitted Signal Six Parameter Distribution for Velocity

FIG. 14

Quadratic Function Segment Expression for f(t) without Continuity $$f(t) = \left\{ \sum_{j=1}^{N} \left( \left( \frac{1}{2} \frac{-\sin(2\pi t L_j) L_j^2 + \sin(2\pi t H_j) H_j^2}{\pi t} - \frac{1}{4} \frac{\sin(2\pi t H_j) - \sin(2\pi t L_j)}{\pi^3 t^3} + \frac{1}{2} \frac{-\cos(2\pi t L_j) L_j + \cos(2\pi t H_j) H_j}{\pi^2 t^2} \right) x_j \right. \right.$$

$$+ \left( \frac{1}{2} \frac{-\sin(2\pi t L_j) L_j + \sin(2\pi t H_j) H_j}{\pi t} + \frac{1}{4} \frac{(\cos(2\pi t H_j) - \cos(2\pi t L_j))}{\pi^2 t^2} \right) y_j$$

$$\left. + \frac{1}{2} \frac{(\sin(2\pi t H_j) - \sin(2\pi t L_j)) z_j}{\pi t} \right) \right\} + \left\{ \sum_{j=1}^{N} \left( \left( \frac{1}{2} \frac{\cos(2\pi t L_j) L_j^2 - \cos(2\pi t H_j) H_j^2}{\pi t} - \frac{1}{4} \frac{-\cos(2\pi t H_j) + \cos(2\pi t L_j)}{\pi^3 t^3} \right) a_j \right. \right.$$

$$- \frac{1}{2} \frac{\sin(2\pi t H_j) L_j - \sin(2\pi t L_j)}{\pi^2 t^2}$$

$$+ \left( \frac{1}{2} \frac{\cos(2\pi t L_j) L_j - \cos(2\pi t H_j) H_j}{\pi t} - \frac{1}{4} \frac{-\sin(2\pi t H_j) + \sin(2\pi t L_j)}{\pi^2 t^2} \right) b_j + \frac{1}{2} \frac{(-\cos(2\pi t H_j) + \cos(2\pi t L_j)) c_j}{\pi t} \right) \right\}$$

FIG. 15
Parameters for Example

| | |
|---|---|
| Number of function segments: $N = 7$ | $M = 20$ |
| Lowest frequency in basis: $H_0 = 0.1996961309 \; 10^7$ | Starting time: $t_0 = 0.00006843506494$ |
| Frequency increment: $H_\delta = 2207.908286$ | Ending time: $t_M = 0.00007493194556$ |

Figure 16
Example $\|A\|$ Matrix $$\begin{bmatrix}
0.8203\,10^{10} & 0.6331\,10^{10} & 0.3611\,10^{10} & 0.1218\,10^{10} & 0.5626\,10^{8} & -0.4482\,10^{10} & -0.5209\,10^{10} & -0.4925\,10^{10} & -0.3361\,10^{10} & -0.1319\,10^{10} \\
0.1346\,10^{10} & 0.3307\,10^{10} & 0.4440\,10^{10} & 0.3724\,10^{10} & 0.1696\,10^{10} & 0.1309\,10^{11} & 0.1109\,10^{11} & 0.7411\,10^{10} & 0.3434\,10^{10} & 0.7954\,10^{9} \\
-0.1704\,10^{11} & -0.1562\,10^{11} & -0.1164\,10^{11} & -0.6280\,10^{10} & -0.1893\,10^{10} & -0.5179\,10^{10} & -0.1706\,10^{10} & 0.1658\,10^{10} & 0.2869\,10^{10} & 0.1717\,10^{10} \\
0.1481\,10^{11} & 0.9966\,10^{10} & 0.3906\,10^{10} & -0.2836\,10^{9} & -0.1120\,10^{10} & -0.1785\,10^{11} & -0.1792\,10^{11} & -0.1488\,10^{11} & -0.9045\,10^{10} & -0.3161\,10^{10} \\
0.1343\,10^{11} & 0.1588\,10^{11} & 0.1535\,10^{11} & 0.1065\,10^{11} & 0.4226\,10^{10} & 0.2574\,10^{11} & 0.2027\,10^{11} & 0.1179\,10^{11} & 0.4082\,10^{10} & 0.2339\,10^{9} \\
-0.3484\,10^{11} & -0.3000\,10^{11} & -0.2036\,10^{11} & -0.9561\,10^{10} & -0.2240\,10^{10} & 0.2920\,10^{10} & 0.8181\,10^{10} & 0.1159\,10^{11} & 0.9996\,10^{10} & 0.4623\,10^{10} \\
0.1249\,10^{11} & 0.4762\,10^{10} & -0.3243\,10^{10} & -0.6434\,10^{10} & -0.3971\,10^{10} & -0.3852\,10^{11} & -0.3579\,10^{11} & -0.2708\,10^{11} & -0.1479\,10^{11} & -0.4493\,10^{10} \\
0.3418\,10^{11} & 0.3478\,10^{11} & 0.2935\,10^{11} & 0.1809\,10^{11} & 0.6373\,10^{10} & 0.2942\,10^{11} & 0.2041\,10^{11} & 0.8411\,10^{10} & -0.2369\,10^{9} & -0.2168\,10^{10} \\
-0.4323\,10^{11} & -0.3471\,10^{11} & -0.2061\,10^{11} & -0.7312\,10^{10} & -0.4937\,10^{9} & 0.2158\,10^{11} & 0.2593\,10^{11} & 0.2562\,10^{11} & 0.1809\,10^{11} & 0.7252\,10^{10} \\
-0.3285\,10^{10} & -0.1078\,10^{11} & -0.1618\,10^{11} & -0.1437\,10^{11} & -0.6751\,10^{10} & -0.4967\,10^{11} & -0.4344\,10^{11} & -0.2996\,10^{11} & -0.1425\,10^{11} & -0.3377\,10^{10} \\
0.4665\,10^{11} & 0.4393\,10^{11} & 0.3375\,10^{11} & 0.1866\,10^{11} & 0.5713\,10^{10} & 0.1602\,10^{11} & 0.6875\,10^{10} & -0.3284\,10^{10} & -0.7717\,10^{10} & -0.4921\,10^{10} \\
-0.3126\,10^{11} & -0.2234\,10^{11} & -0.9637\,10^{10} & -0.9902\,10^{8} & 0.2245\,10^{10} & 0.3510\,10^{11} & 0.3615\,10^{11} & 0.3102\,10^{11} & 0.1938\,10^{11} & 0.6886\,10^{10} \\
-0.1860\,10^{11} & -0.2265\,10^{11} & -0.2290\,10^{11} & -0.1645\,10^{11} & -0.6670\,10^{10} & -0.3885\,10^{11} & -0.3181\,10^{11} & -0.1926\,10^{11} & -0.7002\,10^{10} & -0.5391\,10^{9} \\
0.3792\,10^{11} & 0.3368\,10^{11} & 0.2360\,10^{11} & 0.1138\,10^{11} & 0.2727\,10^{10} & -0.1891\,10^{10} & -0.7552\,10^{10} & -0.1208\,10^{11} & -0.1106\,10^{11} & -0.5284\,10^{10} \\
-0.1094\,10^{11} & -0.5185\,10^{10} & 0.1692\,10^{10} & 0.4949\,10^{10} & 0.3267\,10^{10} & 0.3027\,10^{11} & 0.2888\,10^{11} & 0.2253\,10^{11} & 0.1261\,10^{11} & 0.3892\,10^{10} \\
-0.1932\,10^{11} & -0.2012\,10^{11} & -0.1755\,10^{11} & -0.1112\,10^{11} & -0.3987\,10^{10} & -0.1775\,10^{11} & -0.1306\,10^{11} & -0.5880\,10^{10} & -0.2589\,10^{9} & 0.1244\,10^{10} \\
0.1869\,10^{11} & 0.1560\,10^{11} & 0.9637\,10^{10} & 0.3585\,10^{10} & 0.3077\,10^{9} & -0.8601\,10^{10} & -0.1060\,10^{11} & -0.1096\,10^{11} & -0.8017\,10^{10} & -0.3287\,10^{10} \\
0.5433\,10^{9} & 0.2813\,10^{10} & 0.4824\,10^{10} & 0.4561\,10^{10} & 0.2216\,10^{10} & 0.1551\,10^{11} & 0.1398\,10^{11} & 0.9954\,10^{10} & 0.4866\,10^{10} & 0.1180\,10^{10} \\
-0.1053\,10^{11} & -0.1016\,10^{11} & -0.8053\,10^{10} & -0.4566\,10^{10} & -0.1421\,10^{10} & -0.3976\,10^{10} & -0.2056\,10^{10} & 0.4279\,10^{9} & 0.1697\,10^{10} & 0.1162\,10^{10} \\
0.5391\,10^{10} & 0.4081\,10^{10} & 0.1913\,10^{10} & 0.1417\,10^{9} & -0.3689\,10^{9} & -0.5704\,10^{10} & -0.5995\,10^{10} & -0.5321\,10^{10} & -0.3419\,10^{10} & -0.1237\,10^{10}
\end{bmatrix}$$

FIG. 17
Example ||P|| Matrix

| | | | | | | | | | | | | | | | | |
|---|---|---|---|---|---|---|---|---|---|---|---|---|---|---|---|---|
| -0.1106 | -0.09701 | 0.03599 | 0.00232 | 0.08365 | -0.1066 | -0.01061 | 0.01016 | 0.04178 | 0.04867 | -0.1111 | 0.02669 | -0.01052 | 0.07140 | 0.003079 | -0.1052 | 0.05433 | -0.003459 | 0.1329 | -0.005895 |
| 0.2056 | 0.8055 | -0.2468 | 0.1065 | -0.6869 | 0.4025 | 0.2762 | -0.06595 | -0.06227 | -0.5585 | 0.5727 | 0.03943 | 0.08169 | -0.3012 | -0.3731 | 0.6851 | -0.1258 | 0.2557 | -0.8206 | -0.1547 |
| 0.6081 | -1.729 | 0.4506 | -0.6620 | 1.409 | -0.1543 | -0.3687 | 0.1087 | -0.2364 | 1.435 | -0.7179 | -0.4686 | -0.1750 | 0.2214 | 1.322 | -1.200 | -0.2094 | -0.5118 | 1.360 | 1.289 |
| -1.370 | 1.111 | -0.1783 | 1.043 | -0.8198 | -0.9007 | 0.9457 | -0.01928 | 0.7811 | -1.266 | -0.2567 | 0.8417 | 0.1200 | 0.4566 | -1.597 | 0.3979 | 0.8116 | 0.2872 | -0.3208 | -2.195 |
| 1.661 | 0.3813 | -0.2324 | -0.6092 | -0.4113 | 1.248 | -0.2773 | -0.08537 | -0.6674 | 0.1068 | 1.030 | -0.5518 | 0.02606 | -0.7798 | 0.6253 | 0.7160 | -0.7770 | 0.1579 | -0.9697 | 1.339 |
| 0.07551 | -0.1193 | 0.02930 | -0.05976 | 0.09443 | 0.01232 | -0.06878 | 0.007381 | -0.03401 | 0.1060 | -0.03256 | -0.04460 | -0.01117 | 0.0001873 | 0.1078 | -0.07319 | -0.02996 | -0.03331 | 0.007848 | 0.1205 |
| -0.6860 | 0.1697 | 0.0001696 | 0.3251 | -0.09710 | -0.4093 | 0.2499 | 0.005766 | 0.2822 | 0.1060 | -0.2368 | 0.2750 | 0.01433 | 0.3376 | -0.4413 | -0.04652 | 0.3074 | 0.02290 | 0.1145 | -0.7028 |
| 1.529 | 0.8468 | -0.3553 | -0.4500 | -0.8051 | 1.333 | -0.06138 | -0.1083 | -0.6130 | -0.2805 | -0.2800 | 1.259 | 0.08594 | -0.8711 | 0.2350 | 1.067 | -0.7480 | 0.3130 | -1.384 | 1.084 |
| -1.125 | -2.253 | 0.7237 | -0.05713 | 1.952 | -1.500 | -0.6310 | 0.1987 | 0.4118 | 1.427 | -1.873 | -0.4489 | -0.2248 | 1.082 | 0.7490 | -2.058 | 0.6072 | -0.7255 | 2.514 | -0.1087 |
| -0.1935 | 1.839 | -0.5196 | 0.5198 | -1.569 | 0.4897 | 0.8269 | -0.1272 | 0.1101 | -1.458 | 1.019 | 0.3411 | 0.1933 | -0.4497 | -1.198 | 1.438 | 0.01034 | 0.5740 | -1.683 | -0.9206 |

Example Envelope Function

Spectral Density Component Functions Used to Calculate Example f(t) Values

Example Signal and Locations of Measurement Points

Example Signal after Adjust for Gaussian Envelope and Locations of Measurement Points
(The period of this signal is much longer than the short segment shown.)

Example Calculated Results for G(f) and Actual G(f)
(The calculated result overlays the actual G(f).)

Example Calculated Results for F(f) and Actual F(f)
(The calculated result overlays the actual F(f).)

FIG: 24
Equations for Piecewise Continuous Equally Spaced Quadratic Function Segments The equation for the first $N-2$ columns of $\|A\|$ is (51)

$$A_{i,j} = \frac{1}{8}E(t)((-4N+4j+2)\cos(2\pi t(H_0+(N-1)H_\delta))+2\cos(2(H_0+jH_\delta)\pi t)+2(N-j)\cos(2\pi t(H_0+(N-2)H_\delta))-2\cos(2\pi t(H_0+(j-1)H_\delta))$$
$$+2(N-1-j)\cos(2(H_0+NH_\delta)\pi t))/(\pi^3 t^3)$$

The equation for the last $N-2$ columns of $\|A\|$ is (52)

$$A_{i,j+N-2} = \frac{1}{8}E(t)(2\sin(2\pi t(H_0+(j-1)H_\delta))+\sin(2\pi t(H_0+(N-2)H_\delta))(-2N+2j)-2(N-1-j)\sin(2(H_0+NH_\delta)\pi t)-2\sin(2(H_0+jH_\delta)\pi t)+(4N-4j-2)\sin(2\pi t(H_0+(N-1)H_\delta)))/(\pi^3 t^3)$$

The equations for calculating the $Nth$ and $N\text{-}1th$ terms of $|a|$ and $|x|$ from the first $N-2$ terms $$a_{N-1} = \sum_{p=1}^{N-2} a_p(p-N) \quad (43) \qquad a_N = -\left(\sum_{p=1}^{N-2} a_p(p-N+1)\right) \quad (44)$$

The equation for spectral density component functions (53)

$$d(f) = \left\{\sum_{j=1}^{N-1} \text{Heaviside}(f-H_0-(j-1)H_\delta)\text{Heaviside}(H_0+jH_\delta-f)\left[H_\delta\left(\sum_{p=1}^{j-1}(-(2p-1)H_\delta+2f-2H_0)a_p\right)+a_j(f-H_0-(j-1)H_\delta)^2\right]\right.$$
$$\left.+ \text{Heaviside}(f-H_0-(N-1)H_\delta)\text{Heaviside}(H_0-f+NH_\delta)\left(\sum_{j=1}^{N-2}(-a_j(H_0-f+NH_\delta)^2(j+1-N))\right)\right\}$$

The equation for calculating estimated functions of time (50)

$$g(t) = E(t)\left\{\sum_{j=1}^{N-2}\left[\frac{1}{8}\frac{(\sin(2\pi t(H_0+(N-2)H_\delta))(-2N+2j)-2(N-1-j)\sin(2\pi t(H_0+NH_\delta))+2\sin(2\pi t(H_0+jH_\delta))+(4N-4j-2)\sin(2\pi t(H_0+(N-1)H_\delta))+2\sin(2\pi t(H_0+(j-1)H_\delta)))x_j}{\pi^3 t^3}\right.\right.$$
$$\left.\left.+\frac{\frac{1}{8}(2(N-j)\cos(2\pi t(H_0+(N-2)H_\delta))+2\cos(2\pi t(H_0+jH_\delta))+2(N-1-j)\cos(2\pi t(H_0+NH_\delta))+(-4N+4j+2)\cos(2\pi t(H_0+(N-1)H_\delta))-2\cos(2\pi t(H_0+(j-1)H_\delta)))a_j}{\pi^3 t^3}\right]\right.$$

FIG: 25
Equations for Piecewise Continuous Equally Spaced Linear Function Segments The equation for the first $N-1$ columns of $\|A\|$ is $$A_{i,j} = \frac{1}{4} \frac{E(t)\left(\sin(2\pi t_i(H_0+(N-1)H_\delta)) - \sin(2\pi t_i(H_0 + N H_\delta))\pi t_i) - \sin(2\pi t_i(H_0+(j-1)H_\delta)) + \sin(2\pi(H_0+jH_\delta)t_i)\right)}{\pi^2 t_i^2}$$

The equation for the last $N-1$ columns of $\|A\|$ is $$A_{i,j+N-1} = \frac{1}{4}\frac{E(t)\left(\cos(2\pi t_i(H_0+(N-1)H_\delta)) - \cos(2(H_0+NH_\delta)\pi t_i) - \cos(2\pi t_i(H_0+(j-1)H_\delta)) + \cos(2\pi(H_0+jH_\delta)t_i)\right)}{\pi^2 t_i^2}$$

The equation for calculating the $N$th term of $|a|$ and $|x|$ from the first $N-1$ terms $$a_N = -\left(\sum_{p=1}^{N-1} a_p\right)$$

The equation for spectral density component functions $$d(f) = \left\{\sum_{j=1}^{N-1} \text{Heaviside}(f-H_0-jH_\delta+H_\delta)\,\text{Heaviside}(H_0+jH_\delta-f)\left(-H_\delta a_j j + H_\delta a_j + H_\delta\left(\sum_{p=1}^{j-1} a_p\right) + a_j f - a_j H_0\right) + \text{Heaviside}(f-H_0-NH_\delta+H_\delta)\,\text{Heaviside}(H_0+NH_\delta-f)\left(\sum_{j=1}^{N-1}(-(f-H_0-NH_\delta+H_\delta)a_j)\right) + \text{Heaviside}(f-H_0-NH_\delta+H_\delta)\,\text{Heaviside}(H_0+NH_\delta-f)\left(\sum_{p=1}^{N-1} H_\delta a_p\right)\right\}$$

The equation for calculating estimated functions of time $$g(t) = E(t)\left\{\frac{1}{4}\left|\sum_{j=1}^{N}\frac{(\sin(2\pi t(H_0+(N-1)H_\delta))\pi t) - \sin(2(H_0+NH_\delta)\pi t) - \sin(2\pi t(H_0+(j-1)H_\delta)) + \sin(2\pi(H_0+jH_\delta)t))a_j}{\pi^2 t^2}\right| + \frac{1}{4}\left|\sum_{j=1}^{N}\frac{(\cos(2\pi t(H_0+(N-1)H_\delta)) - \cos(2(H_0+NH_\delta)\pi t) - \cos(2\pi t(H_0+(j-1)H_\delta)) + \cos(2\pi(H_0+jH_\delta)t))x_j}{\pi^2 t^2}\right|\right\}$$

Three Frequency Function with Four Digitization Bins

Three Frequency Function with Four Digitization Bins and Least Squared Errors Estimate Three Frequency Function with Four Digitization Bins and
Least Absolute Value Errors Estimate Three Frequency Function with Four Digitization Bins and
Least Squared Errors and Least Absolute Value Errors Estimates

Actual and Estimated G(f) Calculated without Accounting for Digitization

Actual and Estimated F(f) Calculated without Accounting for Digitization

FIG. 32
Bounded Area Measure when Using Piecewise Continuous Quadratic Function Segments $$MAs_{1...N} = \left(\sum_{j=1}^{N-2}\left[3a_j^2 + 15\left(\sum_{q=1}^{j-1}(2j-2q-1)a_q\right)^2 + 30\left(\sum_{q=1}^{j-1}(2j-2q-1)a_q\right)\left(\sum_{q=1}^{j-1}a_q\right) + 10a_j\left(\sum_{q=1}^{j-1}(2j-2q-1)a_q\right) + 20\left(\sum_{q=1}^{j-1}a_q\right)^2 + 15a_j\left(\sum_{q=1}^{j-1}a_q\right)\right]\right)$$

$$+ 68\left(\sum_{q=1}^{N-2}a_q(q-N)\right)^2 + 15\left(\sum_{q=1}^{N-2}(3-2N+2q)a_q\right)^2 - 30\left(\sum_{q=1}^{N-2}(3-2N+2q)a_q\right)\left(\sum_{q=1}^{N-2}a_q\right) - 10\left(\sum_{q=1}^{N-2}(3-2N+2q)a_q\right)\left(\sum_{q=1}^{N-2}a_q(q-N)\right) + 40\left(\sum_{q=1}^{N-2}a_q\right)^2$$

$$+ 85\left(\sum_{q=1}^{N-2}a_q(q-N)\right)\left(\sum_{q=1}^{N-2}a_q\right) + 3\left(\sum_{q=1}^{N-2}a_q(q+1-N)\right)^2 + 15\left(\sum_{q=1}^{N-2}(1-2N+2q)a_q\right)^2 - 60\left(\sum_{q=1}^{N-2}(1-2N+2q)a_q\right)\left(\sum_{q=1}^{N-2}a_q(q-N)\right)$$

$$- 30\left(\sum_{q=1}^{N-2}(1-2N+2q)a_q\right)\left(\sum_{q=1}^{N-2}a_q(q+1-N)\right) + 10\left(\sum_{q=1}^{N-2}a_q\right)^2 - 25\left(\sum_{q=1}^{N-2}(1-2N+2q)a_q\right)\left(\sum_{q=1}^{N-2}a_q(q+1-N)\right)$$

$$- 15\left(\sum_{q=1}^{N-2}a_q(q+1-N)\right)\left(\sum_{q=1}^{N-2}a_q\right)$$

FIG. 33
Arc Length Measures for Spectral Density Component Functions Based on Piecewise Continuous Quadratic Function Segments $$M_{arc\_length, G(f)} = 5\left(\sum_{j=1}^{N-2} a_j\right)\left(\sum_{j=1}^{N-2} a_j(-N+j)\right) + 2\left(\sum_{j=1}^{N-2} a_j(-N+j)\right)^2 + 4\left(\sum_{j=1}^{N-2} a_j\right)^2 + \sum_{j=1}^{N-2}\left(3\left(\sum_{k=1}^{j} a_k\right)\left(\sum_{q=1}^{j-1} a_q\right) + a_j^2\right)$$

$$M_{arc\_length, F(f)} = 5\left(\sum_{j=1}^{N-2} x_j\right)\left(\sum_{j=1}^{N-2} x_j(-N+j)\right) + 2\left(\sum_{j=1}^{N-2} x_j(-N+j)\right)^2 + 4\left(\sum_{j=1}^{N-2} x_j\right)^2 + \sum_{j=1}^{N-2}\left(3\left(\sum_{k=1}^{j} x_k\right)\left(\sum_{q=1}^{j-1} x_q\right) + x_j^2\right)$$

FIG. 34
Bounded Area Measures for Spectral Density Component Functions Based on Piecewise Continuous Quadratic Function Segments $$M_{bounded\_area, G(f)} = \left\{ \sum_{j=1}^{N-2} \left[ 3a_j^2 + 15 \left( \sum_{q=1}^{j-1} (2j-2q-1)a_q \right)^2 + 30 \left( \sum_{q=1}^{j-1} (2j-2q-1)a_q \right)\left( \sum_{q=1}^{j-1} a_q \right) + 10 a_j \left( \sum_{q=1}^{j-1} (2j-2q-1)a_q \right) + 20 \left( \sum_{q=1}^{j-1} a_q \right)^2 + 15 a_j \left( \sum_{q=1}^{j-1} a_q \right) \right] \right.$$

$$+ 68 \left( \sum_{q=1}^{N-2} a_q (q-N) \right)^2 + 15 \left( \sum_{q=1}^{N-2} (3-2N+2q)a_q \right)^2 - 30 \left( \sum_{q=1}^{N-2} (3-2N+2q)a_q \right)\left( \sum_{q=1}^{N-2} a_q (q-N) \right) + 40 \left( \sum_{q=1}^{N-2} a_q \right)^2$$

$$+ 85 \left( \sum_{q=1}^{N-2} a_q (q-N) \right)^2 + 3 \left( \sum_{q=1}^{N-2} a_q \right)^2 + 15 \left( \sum_{q=1}^{N-2} a_q (q+1-N) \right)^2 - 60 \left( \sum_{q=1}^{N-2} (1-2N+2q)a_q \right)\left( \sum_{q=1}^{N-2} a_q (q-N) \right)$$

$$- 30 \left( \sum_{q=1}^{N-2} (1-2N+2q)a_q \right)\left( \sum_{q=1}^{N-2} a_q \right) + 10 \left( \sum_{q=1}^{N-2} (1-2N+2q)a_q \right)\left( \sum_{q=1}^{N-2} a_q (q+1-N) \right) - 25 \left( \sum_{q=1}^{N-2} a_q (q+1-N) \right)\left( \sum_{q=1}^{N-2} a_q \right)$$

$$- 15 \left( \sum_{q=1}^{N-2} a_q (q+1-N) \right)\left( \sum_{q=1}^{N-2} a_q \right) \right\}$$

$$M_{bounded\_area, F(f)} = \left\{ \sum_{j=1}^{N-2} \left[ 3x_j^2 + 15 \left( \sum_{q=1}^{j-1} (2j-2q-1)x_q \right)^2 + 30 \left( \sum_{q=1}^{j-1} (2j-2q-1)x_q \right)\left( \sum_{q=1}^{j-1} x_q \right) + 10 x_j \left( \sum_{q=1}^{j-1} (2j-2q-1)x_q \right) + 20 \left( \sum_{q=1}^{j-1} x_q \right)^2 + 15 x_j \left( \sum_{q=1}^{j-1} x_q \right) \right] \right.$$

$$+ 68 \left( \sum_{q=1}^{N-2} x_q (q-N) \right)^2 + 15 \left( \sum_{q=1}^{N-2} (3-2N+2q)x_q \right)^2 - 30 \left( \sum_{q=1}^{N-2} (3-2N+2q)x_q \right)\left( \sum_{q=1}^{N-2} x_q (q-N) \right) + 40 \left( \sum_{q=1}^{N-2} x_q \right)^2$$

$$+ 85 \left( \sum_{q=1}^{N-2} x_q (q-N) \right)^2 + 3 \left( \sum_{q=1}^{N-2} x_q \right)^2 + 15 \left( \sum_{q=1}^{N-2} x_q (q+1-N) \right)^2 - 60 \left( \sum_{q=1}^{N-2} (1-2N+2q)x_q \right)\left( \sum_{q=1}^{N-2} x_q (q-N) \right)$$

$$- 30 \left( \sum_{q=1}^{N-2} (1-2N+2q)x_q \right)\left( \sum_{q=1}^{N-2} x_q \right) + 10 \left( \sum_{q=1}^{N-2} x_q (q+1-N) \right)\left( \sum_{q=1}^{N-2} (1-2N+2q)x_q \right) - 25 \left( \sum_{q=1}^{N-2} x_q (q+1-N) \right)\left( \sum_{q=1}^{N-2} x_q \right)$$

$$- 15 \left( \sum_{q=1}^{N-2} x_q (q+1-N) \right)\left( \sum_{q=1}^{N-2} x_q \right) \right\}$$

FIG. 35
Quadratic Curvature Measures for Spectral Density Component Functions Based on Piecewise Continuous Quadratic Function Segments $$M_{curvature, G(f)} = \left(\sum_{j=1}^{N-2} a_j^2\right) + \left(\sum_{p=1}^{N-2} a_p(p-N)\right)^2 + \left(\sum_{p=1}^{N-2} a_p(p+1-N)\right)^2$$

$$M_{curvature, F(f)} = \left(\sum_{j=1}^{N-2} x_j^2\right) + \left(\sum_{p=1}^{N-2} x_p(p-N)\right)^2 + \left(\sum_{p=1}^{N-2} x_p(p+1-N)\right)^2$$

FIG. 36

Objective Function Combining Measure of Arc Length and Measure of Area for both G(f) and F(f)

$$ObjF = 15\left(\sum_{q=1}^{N-2}(1-2N+2q)a_q\right)^2$$

$$+\left(\sum_{j=1}^{N-2}\left[3a_j^2+15\left(\sum_{q=1}^{j-1}(2j-2q-1)a_q\right)^2+30\left(\sum_{q=1}^{j-1}(2j-2q-1)a_q\right)\left(\sum_{q=1}^{j-1}a_q\right)+10a_j\left(\sum_{q=1}^{j-1}(2j-2q-1)a_q\right)+15a_j\left(\sum_{q=1}^{j-1}a_q\right)\right]\right)$$

$$+68\left(\sum_{q=1}^{N-2}a_q(q-N)\right)^2+15\left(\sum_{q=1}^{N-2}(3-2N+2q)a_q\right)^2+3\left(\sum_{q=1}^{N-2}a_q\right)^2+40\left(\sum_{q=1}^{N-2}(3-2N+2q)a_q\right)\left(\sum_{q=1}^{N-2}a_q\right)$$

$$-10\left(\sum_{q=1}^{N-2}a_q(q-N)\right)\left(\sum_{q=1}^{N-2}a_q(q-N)\right)-60\left(\sum_{q=1}^{N-2}a_q(q-N)\right)-30\left(\sum_{q=1}^{N-2}(1-2N+2q)a_q\right)\left(\sum_{q=1}^{N-2}a_q(q-N)\right)$$

$$+10\left(\sum_{q=1}^{N-2}a_q(q+1-N)\right)\left(\sum_{j=1}^{N-2}\sum_{q=1}^{j-1}(1-2N+2q)a_q\right)-25\left(\sum_{q=1}^{N-2}a_q(q+1-N)\right)^2-15\left(\sum_{q=1}^{N-2}a_q(q+1-N)\right)\left(\sum_{q=1}^{N-2}a_q\right)+4\left(\sum_{j=1}^{N-2}a_j(-N+j)\right)^2+4\left(\sum_{j=1}^{N-2}a_j\right)^2$$

$$+\left(\sum_{j=1}^{N-2}\left[3\left(\sum_{k=1}^{j}a_k\right)^2+5\left(\sum_{q=1}^{N-2}(3-2N+2q)x_q\right)\left(\sum_{q=1}^{N-2}x_q\right)^2+\left(\sum_{j=1}^{N-2}x_j\right)^2+\left(\sum_{k=1}^{j}3\left(\sum_{q=1}^{N-2}x_q\right)x_q+x_j^2\right)\left(\sum_{q=1}^{N-2}x_q\right)\right]\right)$$

$$+5\left(\sum_{j=1}^{N-2}x_j(-N+j)\right)\left(\sum_{q=1}^{N-2}(3-2N+2q)x_q\right)-10\left(\sum_{q=1}^{N-2}x_q\right)+10\left(\sum_{q=1}^{N-2}(3-2N+2q)x_q\right)\left(\sum_{q=1}^{N-2}x_q(q+1-N)\right)+85\left(\sum_{q=1}^{N-2}x_q(q-N)\right)\left(\sum_{q=1}^{N-2}(1-2N+2q)x_q\right)$$

$$-60\left(\sum_{q=1}^{N-2}x_q(q-N)\right)\left(\sum_{q=1}^{N-2}(3-2N+2q)x_q\right)-30\left(\sum_{q=1}^{N-2}x_q(q-N)\right)^2$$

$$-25\left(\sum_{q=1}^{N-2}x_q(q+1-N)\right)^2+\left(\sum_{j=1}^{N-2}\left[3x_j^2+15\left(\sum_{q=1}^{j-1}(2j-2q-1)x_q\right)^2+30\left(\sum_{q=1}^{j-1}(2j-2q-1)x_q\right)\left(\sum_{q=1}^{j-1}x_q\right)+10x_j\left(\sum_{q=1}^{j-1}(2j-2q-1)x_q\right)+15x_j\left(\sum_{q=1}^{j-1}x_q\right)\right]\right)$$

$$+68\left(\sum_{q=1}^{N-2}x_q(q-N)\right)^2+15\left(\sum_{q=1}^{N-2}(3-2N+2q)x_q\right)^2+3\left(\sum_{q=1}^{N-2}x_q\right)^2+40\left(\sum_{q=1}^{N-2}(3-2N+2q)x_q\right)\left(\sum_{q=1}^{N-2}x_q\right)+15\left(\sum_{q=1}^{N-2}(1-2N+2q)x_q\right)$$

Double Sided Constraint Violation Value Function
(Digitization bin width = 1)

FIG. 38
Nonnegativity Constraint Value Function 1 (NCV1)

$$NCV1 = p^r \sum_{j=2}^{N-2} \left\{ \left[ \left( -q_j \left[ \sum_{q=1}^{j-1} a_q(-2q-1+2j) \right] + \left[ \sum_{q=1}^{j-1} a_q \right]^2 \right)^2 \right]^{\frac{1}{2}} - \frac{1}{2} \left[ \sum_{q=1}^{j-1} a_q \left[ \sum_{q=1}^{j-1} a_q \right]^2 \right]^{\frac{1}{2}} + \frac{1}{2} \left[ \left( 1 + \frac{\sum_{q=1}^{j-1} a_q}{q_j} \right) \left[ \sum_{q=1}^{j-1} a_q \right]^2 + \mu^p \right]^{\frac{1}{2}} - \frac{1}{2} \left[ \left( \frac{-q_j \left[ \sum_{q=1}^{j-1} a_q(-2q-1+2j) \right] + \left[ \sum_{q=1}^{j-1} a_q \right]^2}{q_j^2} \right)^2 + \mu^p \right]^{\frac{1}{2}} + \frac{1}{2} \left[ \sqrt{q_j^2 + \mu^p} \right]^{\frac{1}{2}} \right\}$$

$$+ \left\{ \left[ \left( \sum_{q=1}^{N-2} a_q(-2q-3+2N) \right) \left[ \sum_{q=1}^{N-2} a_q(q-N) \right] \right]^{\frac{1}{2}} - \frac{1}{2} \left[ \frac{\sum_{q=1}^{N-2} a_q}{\sum_{q=1}^{N-2} a_q(q-N)} \right]^{\frac{1}{2}} + \frac{1}{2} \left[ \left( 1 + \frac{\sum_{q=1}^{N-2} a_q}{\sum_{q=1}^{N-2} a_q(q-N)} \right)^2 + \mu^p \right]^{\frac{1}{2}} - \frac{1}{2} \left[ \left( \frac{\sum_{q=1}^{N-2} a_q(-2q-3+2N)}{\sum_{q=1}^{N-2} a_q(q-N)} \right) \left[ \sum_{q=1}^{N-2} a_q \right]^2 + \mu^p \right]^{\frac{1}{2}} \right\}$$

$$+ \left\{ \left[ \left( \sum_{q=1}^{N-2} a_q(q-N) \right)^2 \right]^{\frac{1}{2}} - \frac{1}{2} \left[ \sum_{q=1}^{N-2} a_q(q-N) \right]^{\frac{1}{2}} + \frac{1}{2} \left[ \left( \sum_{q=1}^{N-2} a_q(q-N) \right)^2 + \mu^p \right]^{\frac{1}{2}} \right\}$$

Note: Select value of r so that $p^r \equiv N^2$

FIG. 39
Nonnegativity Constraint Value Function 2 (NCV2)

$$NCV2 = P\left\{\sum_{j=2}^{N-2}\left\{\left[\left[-a_q\left(\sum_{q=1}^{j-1}a_q(-2q-1+2j)\right)\right]\left[\sum_{q=1}^{j-1}a_q\right]^2\right]^{-\frac{1}{2}}\left[\left[\sum_{q=1}^{j-1}a_q\right]^2 + \mu k^p\right]^{-\frac{1}{2}} + \left[\frac{\sum_{q=1}^{j-1}a_q}{a_j\sqrt{\mu}}\right]\left[1 + \frac{\sum_{q=1}^{j-1}a_q}{a_q^2}\right]^{-\frac{1}{2}}\left[\left[\sum_{q=1}^{j-1}a_q\right]^2 + k^p\right]^{-\frac{1}{2}} + \left[\frac{-a_q\left(\sum_{q=1}^{j-1}a_q(-2q-1+2j)\right)}{a_q^2}\right]\left[\left[\sum_{q=1}^{j-1}a_q\right]^2 + k^p\right]^{-\frac{1}{2}} + \left[\frac{1}{2}\sqrt{a_q^2 + \mu k^p}\right]^{-\frac{1}{2}}\right.$$

$$+ \left[\left[\sum_{q=1}^{N-2}a_q(q-N)\right]^2\left[\left[\sum_{q=1}^{N-2}a_q(q-N)\right]^2 + k^p\right]^{-\frac{1}{2}} + \left[\frac{\sum_{q=1}^{N-2}a_q}{\sum_{q=1}^{N-2}a_q(q-N)}\right]\left[1 + \frac{\sum_{q=1}^{N-2}a_q}{\sum_{q=1}^{N-2}a_q(q-N)}\right]^{-\frac{1}{2}} + \left[\left[\sum_{q=1}^{N-2}a_q(-2q-3+2N)\right]\left[\sum_{q=1}^{N-2}a_q(q-N)\right] + \left[\sum_{q=1}^{N-2}a_q\right]^2\right]^{-\frac{1}{2}} + k^p\mu$$

$$+ \left[\left[\sum_{q=1}^{N-2}a_q(-2q-3+2N)\right]\left[\sum_{q=1}^{N-2}a_q(q-N)\right] + \left[\sum_{q=1}^{N-2}a_q\right]^2\right]^{-\frac{1}{2}} \bigg/ \sqrt{\left[\sum_{q=1}^{N-2}a_q(q-N)\right]^2 + \mu k^p}\right\}$$

Note: When use NCV2 set exponent r=0

FIG. 40
Tapered Heaviside Gate Function Examples
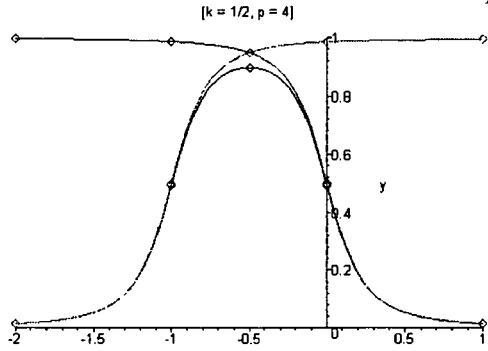
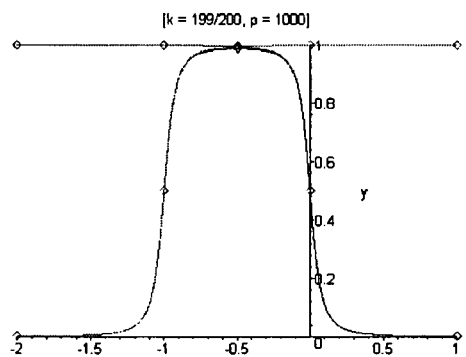
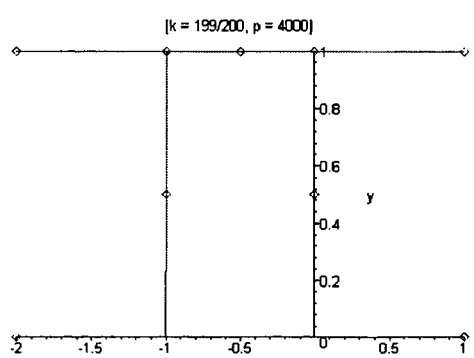

Tapered Heaviside Gate Function for Extreme Value of G(f) is Less than Zero

Function for sign of G[j](fext). [k = 1/2, p = 8]

Example G(f) Calculated Using NCV1 Nonnegativity Constraint Value Function

FIG. 43
Peak Count Constraint Value (PCV) Function $$PCV = H - \left\{\sum_{j=2}^{N-2}\left[\frac{1\, a_j}{2\mu^{\left(\frac{1}{2}\right)}\left(\frac{a_j^2}{\mu}+k^{(4p)}\right)^{\left(\frac{1}{2}\right)}}+\frac{1}{2}\right] - \left[\frac{1\left(\sum_{q=1}^{j-1}a_q\right)^2}{2\, a_j\left(\frac{\left(\sum_{q=1}^{j-1}a_q\right)^2}{a_j^2}+k^{(4p)}\right)^{\left(\frac{1}{2}\right)}}+\frac{1}{2}\right] - \left[\frac{1}{2}\left(1+\frac{\sum_{q=1}^{j-1}a_q}{a_j}\right)\left(\left(1+\frac{\sum_{q=1}^{j-1}a_q}{a_j}\right)^2+k^{(4p)}\right)^{\left(\frac{1}{2}\right)}+\frac{1}{2}\right]^2\right.$$

$$\left. - \left[\frac{1\left(\sum_{p=1}^{N-2}a_p(p-N)\right)^2}{2\mu^{\left(\frac{1}{2}\right)}\left(\frac{\left(\sum_{p=1}^{N-2}a_p(p-N)\right)^2}{\mu}+k^{(4p)}\right)^{\left(\frac{1}{2}\right)}}+\frac{1}{2}\right] - \left[\frac{1\left(\sum_{q=1}^{N-2}a_q\right)^2}{2\left(\sum_{p=1}^{N-2}a_p(p-N)\right)\left(\frac{\left(\sum_{q=1}^{N-2}a_q\right)^2}{\left(\sum_{p=1}^{N-2}a_p(p-N)\right)^2}+k^{(4p)}\right)^{\left(\frac{1}{2}\right)}}+\frac{1}{2}\right] - \left[\frac{1}{2}\left(1+\frac{\sum_{q=1}^{N-2}a_q}{\sum_{p=1}^{N-2}a_p(p-N)}\right)\left(\left(1+\frac{\sum_{q=1}^{N-2}a_q}{\sum_{p=1}^{N-2}a_p(p-N)}\right)^2+k^{(4p)}\right)^{\left(\frac{1}{2}\right)}+\frac{1}{2}\right]^2\right\}$$

FIG. 44 Basic Calculation Sequence
Page 1 of 3

| | |
|---|---|
| 1. Specify solution parameters<br>   A. Specify measurements<br>      a. Number of measurements (M)<br>      b. Time interval between measurements<br>   B. Specify basis frequencies<br>      a. Lower and upper frequency limits ($f_L$, $f_H$)<br>      b. Number of frequency intervals (N)<br>   C. Select Objective Function components (refer to FIGS. 33, 34, 35)<br>      a. Arc length measure for G(f), F(f)<br>      b. Bounded area measure for G(f), F(f)<br>      c. Quadratic curvature for G(f), F(f) |    D. Select type of nonnegativity constraint (refer to FIG. 38 and FIG. 39)<br>      a. Scaled by $G_j(f_{j,ext})^2$<br>      b. Scaled by $-G_j(f_{j,ext})$ Select peak count constraint (refer to FIG. 43)<br>      a. Select whether will use peak count constraints<br>      b. Select number of peaks for G(f), F(f)<br>   F. Specify properties of digitization bin constraints<br>      a. Sharpness of constraint penalty (final value of parameter w)<br>      b. Value of penalty during final calculations (final value of parameter p)<br>   G. Specify rate of change of nonnegativity constraints (parameter k)<br><br>   . . . proceed to precalculations |

FIG. 45 Basic Calculation Sequence
Page 2 of 3

2. Precalculations (before search for solution)
   A. Calculate matrix $\|A\|$ (Refer to FIG. 25)
   B. Calculate objective function (OF) expression and its Hessian (this will be a matrix of numbers)
   C. Calculate nonnegativity constraint value (NCV) function and its gradient and Hessian (these will be a vector and a matrix of expressions in terms of |a| and |x|).
   D. Calculate peak count constraint value (PCV) function and its gradient and Hessian (these will be a vector and a matrix of expressions in terms of |a| and |x|).
3. Initialize
   A. Select starting |a| and |x| – e.g., constant vectors with small values
   B. Create starting |d| by stacking |a| over |x|
   C. Calculate OF using starting |d| and calculate starting OF scale factor $\lambda$ ($\lambda = 10^{\wedge}$(order of magnitude of OF minus 2)
   D. Select starting value of parameter p, e.g., p=2.
   E. Calculate starting values for constraint value functions: digitization bin constraint violation value function (CVV), nonnegativity constraint value function (NCV), peak count constraint value function (PCV)
   F. Calculate value for constrained objective function (COF):
   $COF = OF/\lambda + CVV + NCV + PCV$ ... proceed to multidimensional Newton method search.

FIG. 46 Basic Calculation Sequence
Page 3 of 3

| | |
|---|---|
| 4. Multidimensional Newton Method Search (designate starting value of variables with subscript k, e.g., starting $\|d\|$ as $\|d_k\|$.)<br>  A. Using current value of p<br>    a. (This sequence calculates new $\|d\|$)<br>      Using $\|d_k\|$<br>      (1) Calculate gradient for OF<br>      (2) Calculate gradient and Hessian for CVV.<br>      (3) Calculate gradient and Hessian for NCV.<br>      (4) Calculate gradient and Hessian for PCV.<br>      (5) Sum gradients and sum Hessians and use these to calculate the change in $\|d\|$: $\|s\|$.<br>      (6) Calculate $\|d_{k+1}\|=\|d_k\| + \|s\|$<br>      (7) Calculate new OF, CVV, NCV, PCV and $COF_{k+1}$.<br>    b. (Backstep, if necessary)<br>      (1) If $COF_{k+1} < COF_k$ then goto step c.<br>      (2) Reduce $\|s\|$ by order of magnitude<br>      (3) Calculate $\|d_{k+1}\|=\|d_k\| + \|s\|$ |       (4) If $COF_{k+1} < COF_k$ then goto step c, otherwise got to step b.(2) and reduce $\|s\|$, unless $\|s\|$ has been reduced to a very small value, in which case goto to step d.<br>    c. (Get here when have lower COF) If significant change in $\|d_{k+1}\|$ from $\|d_k\|$ then<br>      (1) set $\|d_k\|=\|d_{k+1}\|$<br>      (2) go back to step 4.A.a otherwise go to step d.<br>    d. (Get here when stopped getting changes in $\|d_{k+1}\|$)<br>      If at final value of parameter p then go to step B, otherwise<br>      (1) Increase p, e.g., multiply current value of p by 3/2<br>      (2) Calculate OF using $\|d_k\|$ and the new p<br>      (3) Calculate new value for scale factor λ.<br>      (4) Go back to step 4.A.<br>  B. (Get here when have finished calculations with final value of p)<br><br>    ** Search complete ** |

Actual and Calculated G(f) from Digitized Data
M=50

Actual and Calculated F(f) from Digitized Data
M=50

Actual and Calculated Spectral Density Function from Digitized Data
M=50

Actual and Calculated G(f) from Digitized Data
M=200

Actual and Calculated F(f) from Digitized Data
M=200

Actual and Calculated Spectral Density Function from Digitized Data
M=200

Actual and Calculated Cumulative Spectral Density Function from Digitized Data
M=200

DIAGNOSTIC SIGNAL PROCESSING METHOD AND SYSTEM

RELATED APPLICATION INFORMATION

This application claims the benefit of U.S. Provisional Patent Application Ser. No. 60/426,348, filed on Nov. 14, 2002.

FIELD OF THE INVENTION

The present invention relates generally to signal processing applications and, in particular, to signal processing applications involving time-to-frequency domain transforms where it is useful to define a spectrum including frequency information for frequencies other than a fundamental frequency and harmonies thereof, or where it is useful to generate a spectrum based on a portion of the time-based signal representing less than a period of a signal component. The invention has particular application to methods wherein a received signal is decomposed or otherwise processed in a manner that provides information regarding properties of a material modulating or otherwise producing the received signal. The received signal may emanate from tissue interacting with an interrogating signal that was introduced into an organism and was modified from the interrogating signal by one or more influences of the organism's material, e.g., organs, tissue, fluids or other structure.

BACKGROUND OF THE INVENTION

Noninvasive diagnoses using interrogating signals are frequently employed to ascertain the condition of tissue and functional parameters of organs. Such interrogating signals may use, for example, electromagnetic or sonic, including ultrasonic, energy. One example is transmitting ultrasonic waves into an organism, such as a human being, and receiving a return signal that is a modified version of the transmitted interrogating signal, with the modifications caused by the properties of one or more tissue types. The received signal is measured and processed to evaluate the condition or properties of the tissue(s) or other material(s) with which the interrogating signal interacts. In particular, interrogating ultrasonic signals are often transmitted into an organism and the received signal is due to backscattering or echos of the interrogating signal by one or more tissue types. Even more particularly, an ultrasonic interrogating signal is often transmitted into a region of the organism where blood flow is expected and the received signal is a modified version of the interrogating signal wherein such modifications are due in whole or part to frequency shifts caused by Doppler effects caused by movement of tissues, including movement of blood. In this case it is desirable to measure and process the received signal in a manner such that the amount of Doppler frequency shift that occurs can be ascertained in order to estimate the various velocities of the moving tissue, particularly the velocities of the flowing blood.

Ultrasonic Doppler techniques typically entail using a hand-held probe that contains one or more transducers that are used to transmit the interrogating signal and to produce a response, typically in the form of a time-varying voltage, to the received signal. The interrogating ultrasonic signal typically has a frequency in the radio frequency (RF) range of about 0.5 million Hertz (0.5 MHz) to about 20 MHz, although other frequencies may be used. The interrogating signal may be sent continuously, in which case the method employed is termed "continuous wave" (CW) or the interrogating signal may be sent intermittently, usually on a periodic basis, in which case the method employed is termed "pulsed." When pulsed Doppler is used it is possible to interrogate tissue over a range of specified distances from the transducers by measuring the received signal only for a selected duration that occurs after a predetermined time delay after the pulse is sent. If the speed of sound for the intervening tissue is known then the time delay converts directly into a depth of tissue being interrogated. Interrogating a specified tissue depth often provides clinically valuable information that cannot be obtained if CW Doppler is used. CW Doppler systems are often simpler than pulsed Doppler systems, although they cannot provide information that is known to come from tissue associated with a specific time delay (and corresponding estimated tissue depth).

Regardless of whether the Doppler system is pulsed or continuous, the spectral content of the received signal is analyzed to assess how the tissue modified the interrogating signal. The spectral frequency content of the signal is a measure of the amplitudes of each of the constituent frequencies that, when combined, form the total signal. The spectral content is typically represented as either the amplitude of each of the frequencies or as the power of each of the frequencies. When the spectral content data are graphed the resulting graphs have a variety of names including spectrograms and spectral density functions. The term "spectral density function" (SD function) will be used as the general term below. When the frequency content of the interrogating signal is known it can be compared to the spectrum of the received signal and the differences between the spectra can be interpreted as arising from the velocity profiles of the tissues through which the signals passed. The velocity profiles can be back-calculated from spectral differences using established methods that are well known.

To date, a variety of methods have been used to estimate the spectral frequency content of the received signals. The main spectral analysis methods are traditionally classified as being either nonparametric or parametric methods.

The nonparametric methods are related to using Fourier series and they estimate the spectral content at equally spaced frequency points. The extant methods include Fourier and z-transform (including the Chirp z-transform). For brevity, all methods which employ assessing spectral content at equally spaced frequency points are referred to as Fourier methods.

Fourier methods, typically in the form of fast Fourier transforms (FFT), are well known and decompose a signal into frequencies that are integral multiples of a fundamental frequency. The integral multiple frequencies form an orthogonal basis in the frequency domain. This information can be used to approximate the signal as a trigonometric polynomial, as is well known. Fourier methods have been widely used to analyze the received signal because such methods have been refined to the point where they are fast and have well defined properties.

The other class of spectral analysis methods are parametric methods. Parametric methods use time-series analysis to estimate the parameters for a rational function model. The rational function can have either only poles, which is an autoregressive (AR) model, only zeros, which is a moving average (MA) model, or both poles and zeros, which is an autoregressive-moving average (ARMA) model. Included in these methods are maximum entropy methods (MEM). The number of model parameters used in a parametric method is termed the order of the model. The various methods that exist for calculating the values of the model parameters, such as the Burg algorithm and Durbin's first and second methods, are well known. An advantage of parametric methods is that they can produce reasonable spectral estimates using very few cycles or fractions of cycles of data.

SUMMARY OF THE INVENTION

It has been recognized that alternate spectral analysis methods including alternate time-to-frequency domain transforms may be beneficial for a variety of signal processing applications, including certain medical applications. In particular, in spite of the extensive use of Fourier methods, they suffer from significant deficiencies. Parametric methods also suffer significant deficiencies. With regard to Fourier methods, the most significant deficiency is that these methods produce spectral estimates for only a small number of discrete frequencies, even when it is expected or known that the real spectrum covers a continuous range of frequencies or that the spectrum may contain frequencies different from those that form the basis that is the output of the Fourier transform. For example, the signal may contain frequencies that are not an integral multiple of the fundamental frequency. When the basis is not correct, either because the underlying spectrum is continuous or because it contains frequencies other than those in the basis of the output of the Fourier transform, significant errors are produced. These errors manifest themselves as a spreading of the spectrum in which amplitude (or power) is spread out over frequencies that are not actually in the signal. Fourier methods approximate the actual frequency content of the signal by spreading amplitudes to frequencies away from the basis frequencies. Such spreading is a well-known problem with Fourier methods and is called spectral broadening. Spectral broadening cannot be eliminated, although various methods have been employed to reduce it such as those that rely on windows. These windowing methods are not relevant to the current invention other than their well known existence and extensive use confirms that spectral broadening is a significant problem caused by the discrete approximations that are inherent in Fourier methods. Spectral broadening will always occur when discrete frequencies are used to estimate the spectral content of signals that have spectra that are either continuous or composed of such a multitude of closely spaced frequencies that they are essentially continuous, such as the signals generated by Doppler shifting of an interrogating signal from blood flowing in an artery.

Another major problem of Fourier methods is that they cannot be used to examine all frequencies of interest. They can only include frequencies that are harmonics of the fundamental frequency used in the measurement. These problems, again, are well known and they limit the ability of Fourier methods to examine frequencies that are lower than the fundamental frequency used in the measurement. Furthermore, this limitation leads to the frequency resolution equaling the fundamental frequency. For example, to estimate the amplitudes of frequencies spaced 20 Hz apart the fundamental frequency must be 20 Hz or lower. Therefore, if an interrogating signal has a frequency of 2 MHz and the need exists to discriminate the received signal with a resolution of 20 Hz than at least 100,000 harmonics are in the basis. This large number of harmonics creates significant computational difficulties and is generally regarded as impractical for a variety of reasons, including the requirement to use many data points to perform such calculations.

The limitation that all basis frequencies for Fourier series are based on a fundamental frequency also causes other problems, such as when the received signal is not stationary (varies with an independent variable, such as time). This situation will exist, for example, when the received signal has its spectral content changing as the result of the interrogating signal interacting with blood flowing through an artery. The velocity profile changes in an artery as the blood pressure varies in response to the beating of the heart and the variations in the blood's velocity profile will lead to a nonstationary signal that has a time-varying SD function. If the SD function is to be measured over a short time interval, such as over 0.01 second, then the fundamental frequency for the Fourier analysis cannot provide a better frequency resolution than that which is associated with the measurement time interval. For example, a data sample with a period of 0.01 second will have a fundamental frequency of 100 Hz, which precludes calculating the spectral content of signals with a frequency resolution better than 100 Hz.

Parametric methods also suffer deficiencies that are significant for certain applications. In particular, these methods minimize the sum of the squared errors between the measured data and the values estimated by the model. As described later, measured data are necessarily digitized and this process introduces errors that produce a wide variety of equally valid models. Minimizing least squared errors does not account for the possibility of such alternative solutions.

Another shortcoming of parametric methods is their critical dependence on the order of the model chosen. For example, in the most common model, AR models, if too few poles are used then spectral peaks are not reliably detected. If too many poles are selected then false peaks are introduced. Proper model selection is nontrivial and requires a computationally intensive search process that involves calculating models using a range of orders and then selecting among them.

It has also been recognized that digitization errors can significantly affect spectral analyses in certain applications. The input analog signal is not used directly to calculate spectral density functions. First, the measured data are digitized and given discrete values. This process quantizes the data and introduces errors. These digitization errors (also called discretization errors and quantization errors) confound spectral analysis. Each digitized measurement is an estimate of the actual value and has an upper and lower error limit, within which any value is equally likely to occur. Even though any value within the error limits is equally likely to be the true value, the digitized value is conventionally established as the midpoint of the range between the lower and upper error limits. Any value within the range is equally likely, leading to an infinite number of possible values that can be used to calculate spectra. Thus an infinite number of candidate spectral density functions exist. Existing spectral analysis methods do not explicitly account for this range of possible solutions. These methods can be interpreted as using least squared errors or other minimum norm methods that attempt to minimize differences between predicted values and measured values. The structure of these problems makes them sensitive to such errors when they are solved using minimum norm methods, and in particular when solved using least squared errors methods and produce an ill-posed problem. These ill posed problems are well known and regularization techniques are used to calculate reasonable estimated solutions. Regularization methods, including Tikhonov regularization (sometimes called ridge regression or Phillips regularization) are used with least squared errors fits and augment the least squared errors model with an auxiliary function that is extremized (such as minimized). Regularization methods produce stable results, but trade off quality of the fitted solution (comparison of the predicted values to the measured data) with some measure of the regularization function. Making this tradeoff requires using a weighting factor, which is also called the regularization parameter, that trades off the weight given to fitting the data with the weight given to the regularization function.

Existing methods for solving ill-posed problems have several deficiencies. They require calculating the weighting factor, which is difficult and can have a significant effect on the results. They fail to explicitly recognize that a solution is only valid when all of the estimated values are within the digitization error bins of the measured values. This deficiency manifests itself in solutions that have estimated values that are outside of the digitization bin for one or more measured values, and, thus, are not correct. Another deficiency is that in practice the methods rely on using minimizing least squared errors, which tends to force estimated values toward the center of the digitization bins, thus not providing a monotonically convergent means for calculating viable solutions by adjusting the regularization parameter.

Therefore, significant deficiencies exist in the prior art regarding the spectral analysis of time-varying signals and signals when it is desired to obtain fine frequency resolution.

The present invention overcomes problems associated with determining spectral content from signals where the fundamental frequency of the signal being processed corresponds to a time period longer than what has been measured and/or the underlying spectrum is, at least over a range of interest, continuous or substantially continuous (occasionally hereinafter collectively referenced as "substantially continuous"). The present invention further enables spectral analysis where the signal is nonstationary and where the signal has digitization errors.

More specifically, the present invention is directed to a method and apparatus ("utility") involving a time-to-frequency domain transform to define a substantially continuous spectrum or other spectrum including non-zero values at irregularly spaced frequency intervals. The invention thus allows for spectral estimates for more than a small number of discrete frequencies thereby enabling a more accurate representation of certain real spectra and reducing or eliminating spectral broadening. The invention also allows for examination of a greater range of frequencies of interest and provides frequency resolutions that are not limited to a fundamental frequency. In this regard, the invention allows for determination of a spectrum based on analysis of a portion of the time-based signal that is shorter than a full period of a component of the time-based signal. Moreover, the present invention allows for enhanced analysis of received signals that are not stationary, i.e., that vary with an independent variable such as time. Therefore, the invention has particular advantages with respect to medical contexts where the received signal has a changing spectral content as a result of interaction of an interrogating signal with moving physiological material such as blood flowing through an artery. The invention also enables reduction in digitization or quantization errors associated with analog-to-digital conversion.

According to one aspect of the present invention, a utility is provided for processing an input signal, such as a medical diagnostic signal, to obtain a spectrum that includes non-zero values at irregularly spaced intervals. An associated process involves receiving time-based information corresponding to one or more predetermined time intervals of a time-based signal, performing a transform on the time-based information to obtain a frequency spectrum including non-zero values at irregularly spaced intervals, and operating a processor in a signal processing environment for using the transform to provide an output based on the time-based signal. The spectrum includes at least one pair of successive points (i.e. non-zero values) that has a different frequency spacing than at least one other set of successive points. Preferably, the spectrum includes a set of non-zero values including a first non-zero value at a first frequency and a second non-zero value at a second frequency greater than the first frequency where the second frequency is a non-integer multiple of each frequency of the set of frequencies other than the second frequency.

According to another aspect of the present invention, a utility is provided for processing an input signal, such as a medical diagnostic signal, so as to generate a spectrum based on information corresponding to a short time interval of the input signal. A corresponding method includes the steps of receiving time-based information corresponding to one or more defined time intervals of the time-based signal, where the time-based signal includes a component having a period that is longer than the time interval, performing a transform on the time-based information to obtain a frequency spectrum for the time-based signal, and operating a signal processor in a signal processing environment for using the transform to provide an output based on a time-based signal. This process can be used to obtain a frequency spectrum where the received time-based information corresponds to a time interval that is less than half of the period of the signal component.

According to a further aspect of the present invention, a utility is provided for processing an input signal to obtain a substantially continuous spectrum. An associated method includes the steps of receiving time-based information corresponding to one or more defined time intervals of a time-based signal, performing a transform on the time-based information to obtain a frequency spectrum for the time-based signal where the spectrum defines a substantially continuous function across a frequency range that has non-zero values for a majority of frequencies in the range, and operating a processor in a signal processing environment for using the transform to provide an output based on the time-based signal. Such a substantially continuous spectrum can more accurately characterize the real spectrum under analysis, thereby avoiding spectral broadening and other shortcomings of certain prior art processes.

According to a still further aspect of the present invention, a utility is provided for processing an input signal so as to account for a digitization or quantization error associated with analog to digital conversion. An associated method includes the steps of receiving time-based information corresponding to one or more defined time intervals of a time-based signal, where the time-based signal is an analog signal and the time-based information is digital information, performing a transform on the time-based information to obtain a frequency spectrum for the time-based signal, where the step of performing a transform involves accounting for a digitization error associated with a difference between the analog time-based signal and the digital time-based information, and operating a processor in a signal processing environment for using the transform to provide an output based on the time-based signal. The invention thus allows for accurate definition of a spectrum based on the input signal for certain cases where accurately defining such a spectrum may be difficult or impossible due to digitization error.

In accordance with another aspect of the present invention, a utility is provided for use in connection with converting a signal from an analog form to a digital form. The utility involves receiving an analog signal, defining a number of digitization ranges or bins, and assigning a specific value within a bin to a sample related to the analog signal based on a mathematical model where the specific value can vary relative to the boundaries of the bin. Preferably, the mathematical model determines the specific value by solving a constrained optimization problem involving an objective function having one or more constraints. For example, such constraints may relate to one or more limit values of a bin, a nonnegativity constraint, and a peak count within the bin. For example, the objective function may be constrained to be convex and positive within the bin range with slopes determined by predefined parameters at or near the bin limits. The constraints may be implemented as penalty or barrier functions, for example, Heaviside functions. In one implementation such a function approximates a Heaviside function and is tapered at an area corresponding to a constraint value (e.g., a bin limit value) such that the function is free from singularities (undefined function values) at that area.

In one implementation, the invention is used to determine dimension-related information regarding a flow channel of a physiological fluid based on analysis of a signal modulated based on interaction with the fluid of the flow stream. A corresponding system includes a detector for receiving a signal from the fluid and providing an analog electronic signal based on the received signal, an analog-to-digital convertor for providing a digital signal based on the analog electronic signal, a processing means (processor) for first processing the digital signal to obtain spectrum information corresponding to a frequency spectrum including non-zero values that are not at regularly spaced frequencies, and a second processing of the spectrum information to obtain dimension-related information for the flow channel. The dimension-related information may be, for example, a channel dimension or a volumetric flow rate of the fluid.

BRIEF DESCRIPTION OF THE FIGURES

For a more complete understanding of the present invention and further advantages thereof, reference is now made to the following Detailed Description taken in conjunction with the figures as described below.

DETAILED DESCRIPTION

The interrogating signal emitted from an energy emitter, such as a transducer, can take on many forms and EQ. 1 is a general representation of an interrogating signal with frequency f.

$$f(t) = E(t)\sin(2\pi ft) \tag{1}$$

E(t) is a function that describes how the amplitude varies with time. For example, if the emitted signal is a pulse then E(t) can be a function that includes a phase shift term that will periodically repeat with period τ. An example of a signal that has such a form is a Gaussian pulse. The amplitude of a Gaussian pulse will vary with time as defined by EQ. 2

$$E(t) = \frac{1}{2} \frac{\sqrt{2} \, e^{\left(-1/2 \frac{(t-\tau)^2 f^2}{b^2}\right)}}{\sqrt{\pi}} \tag{2}$$

Figure 1:
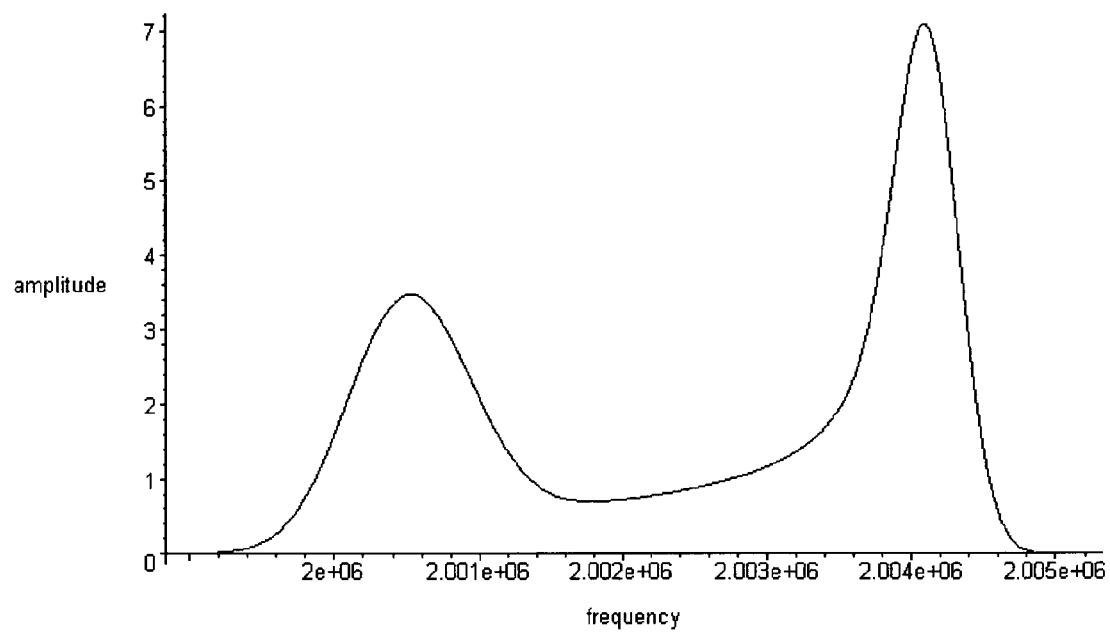
FIG. 1 Example Spectral Density Function
FIG. 2 Illustrates an example Gaussian pulse
FIG. 3 Example Amplitude Function Made from 10 Piecewise Continuous Functions
FIG. 4 Example Amplitude Function Composed of Multiple Functions with Overlapping Domains
FIG. 5 Example Phase Angle with Doppler
FIG. 6 Example Phase Angle with Doppler when Emitted Frequency Selected to Produce Approximately Linear Phase Angle Response
FIG. 7 Example Phase Angle with Doppler when Emitted Frequency Selected to Produce Always Positive and Approximately Linear Phase Angle Response
FIG. 8 Example sin(Phase Angle) with Doppler when Emitted Frequency Selected to Produce Positive Phase Angle Response Close to Zero Phase Angle
FIG. 9 Example cos(Phase Angle) with Doppler when Emitted Frequency Selected to Produce Positive Phase Angle Response Close to Zero Phase Angle
FIG. 10 Example Phase Angle with Doppler Using 2 MHz Emitted Signal
FIG. 11 Example cos(phase angle) with Doppler Using 2 MHz Emitted Signal
FIG. 12 Example sin(phase angle) with Doppler with 2 MHz Emitted Signal
FIG. 13 Six Parameter Distribution for Velocity
FIG. 14 Quadratic Function Segment Expression for f(t) without Continuity
FIG. 15 Parameters for Example
FIG. 16 Example ||A|| Matrix
FIG. 17 Example ||P|| Matrix
FIG. 18 Example Envelope Function
FIG. 19 Spectral Density Component Functions: Used to Calculate Example f(t) values
FIG. 20 Example Signal and Locations of Measurement Points
FIG. 21 Example Signal after Adjust for Gaussian Envelope and Locations of Measurement Points
FIG. 22 Example Calculated Results for G(f) and Actual G(f)
FIG. 23 Example Calculated Results for F(f) and Actual F(f)
FIG. 24 Equations for piecewise Continuous Equally Spaced Quadratic Function Segments
FIG. 25 Equations for Piecewise Continuous Equally Space Linear Function Segments
FIG. 26 Three Frequency Function with Four Digitization Bins
FIG. 27 Three Frequency Function with Four Digitization Bins and Least Squared Errors Estimate
FIG. 28 Three Frequency Function with Four Digitization Bins and Least Absolute Value Errors Estimate
FIG. 29 Three Frequency Function with Four Digitization Bins Least Squared Errors and Least Absolute Value Errors Estimates
FIG. 30 Actual and Estimated G(f) Calculated without Accounting for Digitization
FIG. 31 Actual and Estimated F(f) Calculated without Accounting for Digitization
FIG. 32 Bounded Area Measure when Using Piecewise Continuous Quadratic Function Segments
FIG. 33 Arc Length Measures for Spectral Density Component Functions Based on Piecewise Continuous Quadratic Function Segments
FIG. 34 Bounded Area Measures for Spectral Density Component Functions Based on Piecewise Continuous Quadratic Function Segments
FIG. 35 Quadratic Curvature Measures for Spectral Density Component Functions Based on Piecewise Continuous Quadratic Function Segments
FIG. 36 Objective Function Combining Measure of Arc Length and Measure of Area for both G(f) and F(f)
FIG. 37 Double Sided Constraint Violation Value Function
FIG. 38 Nonnegativity Constraint Value Function 1 (NCV1)
FIG. 39 Nonnegativity Constraint Value Function 2 (NCV2)
FIG. 40 Tapered Heaviside Gate Function Examples
FIG. 41 Tapered Heaviside Gate Function for Extreme Value of G(f) Less than Zero
FIG. 42 Example G(f) Calculated Using NCV 1 Nonnegativity Constraint Value *Function*
FIG. 43 Peak Count Constraint Value (PCV) Function
FIG. 44 Basic Calculation Sequence (Page 1 of 3)
FIG. 45 Basic Calculation Sequence (Page 2 of 3)
FIG. 46 Basic Calculation Sequence (Page 3 of 3)
FIG. 47 Actual and Calculated G(f) from Digitized Data (M=50)
FIG. 48 Actual and Calculated F(f) from Digitized Data (M=50)
FIG. 49 Actual and Calculated Spectral Density Function from Digitized Data (M=50)
FIG. 50 Actual and Calculated G(f) from Digitized Data (M=200)
FIG. 51 Actual and Calculated F(f) from Digitized Data (M=200)
FIG. 52 Actual and Calculated Spectral Density Function from Digitized Data (M=200)
Figure 2:
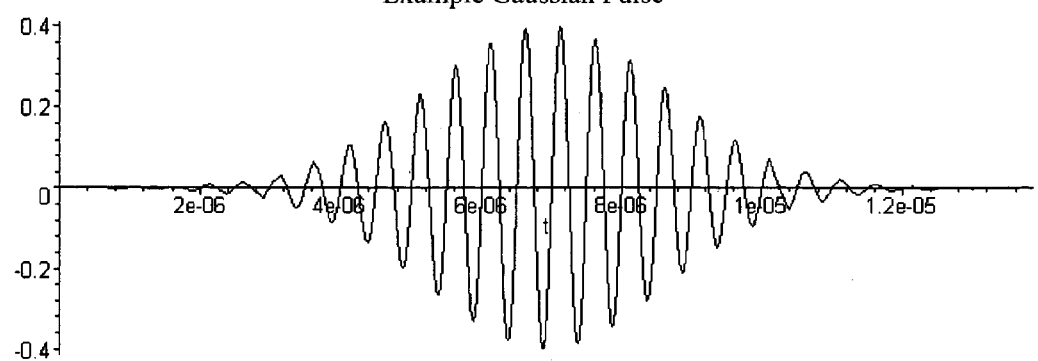

A Gaussian pulse will vary with time as defined by EQ. 3 and a single Gaussian pulse is illustrated in FIG. 2.

$$f(t) = \frac{1}{2} \frac{\sqrt{2} \, e^{\left(-1/2 \frac{(t-\tau)^2 f^2}{b^2}\right)} \sin(2\pi ft)}{\sqrt{\pi}} \tag{3}$$

These equations can be used with either pulsed or continuous wave systems. In the context of ultrasound medical analysis, the pulsed wave has the advantage of allowing selection of the tissue depth to interrogate, which can reduce errors caused by Doppler shifts caused by blood deeper than the region of interest, such as the ascending aorta. The pulsed wave approach leads to pulses that have a transient response, and this needs to be dealt with, possibly by waiting for the transient to pass out of range before collecting data. Another approach could be to model the transient explicitly as a pure tone that has changing amplitude or as a pure tone that has multiple amplitudes that phase shift with time. Using a continuous wave avoids the transient response issues and leads to a pure tone being used to interrogate the tissue. The continuous wave approach, however, has the confounding factor of receiving Doppler-shifted signals from regions other than the selected depth of the ascending aorta, or whatever other region is of particular interest. Depth dependent signals could be inferred from signals that are created from different emitted frequencies (these would need to be much different, such as 1 MHz and 3 MHz) such that attenuation effects are substantially different. The signal strength differences could be matched against spectra to start getting depth-related data. Higher frequencies attenuate more rapidly than lower ones so using higher frequencies reduces the interference from deeper tissues, but at the expense of reducing the signal from the region of interest.

As described earlier, the interrogating signal can be used to energize tissue. The resulting backscattered signal can be sensed and analyzed to determine useful properties of the tissue that backscattered the signal. Such a signal can comprise, for example, the received signal that echos back from a multitude of reflectors or backscatterers moving at one or more velocities that have been insonified by an ultrasonic interrogating signal. Among the purposes for which the present invention can be used is determining the SD functions of backscattered signals from interrogating signals that have either constant or time-varying amplitudes, including time varying signals that include one or more pulses, repeating sets of pulses, or any other amplitude function that varies with an independent variable. As discussed above, time is an example of such an independent variable.

For illustrative purposes, the following description and derivations will use as an example signals such as those that may occur when ultrasonic signals are used to interrogate tissues in a living organism. This illustration is not limiting in that the present invention does not require using interrogating signals or a response from such a signal. The measured data used by the present invention may be acquired using any suitable means that eventually produces two or more digitized data, including transducers followed by subsequent processing or data input or read from one or more sources of data that may have been previously stored, such as tables or graphs stored as hard copy or using electronic, magnetic, or optical means.

Let A(t,f) be the SD function (in this case the function is the same as an amplitude density function). The general form of the signal for which the SD function is to be obtained is EQ. 4.

$$g(t) = \int_{f_L}^{f_H} A(t, f)\sin(2\pi ft + \phi(f))df \tag{4}$$

As described in more detail below, the present invention determines SD functions for processes with two or more independent variables, such as signals that vary with time, g(t), when the SD function depends on at least one independent variable, f that has one or more nonzero values over one or more parts of the interval $[f_L, f_H]$, where $f_L$ and $f_H$ are the lower and upper limits off EQ. 4 defines an amplitude function, A (t, f), that varies based on the values of two independent variables, t and f. For this example, the variable t represents time and the variable f represents frequency. The A (t, f) function can be separated into functions of f and of t.

$$A(t,f) = E(t)B(f) \tag{5}$$

When EQ. 5 is substituted into EQ. 4 the result is a general expression for the time varying signal g(t) for which the SD function B(f) is sought.

$$g(t) = \int_{f_L}^{f_H} E(t)B(f)\sin(2\pi ft + \phi(f))df \tag{6}$$

EQ. 6 can be rearranged to become EQ. 7

$$g(t) = \int_{f_L}^{f_H} E(t)B(f)(\sin(2\pi ft)\cos(\phi(f)) + \cos(2\pi ft)\sin(\phi(f)))df \tag{7}$$

The following terms are defined for coefficients.

$$F(f) = B(f)\sin(\phi(f)) \tag{8}$$

$$G(f) = B(f)\cos(\phi(f)) \tag{9}$$

Substituting these equations for the coefficients into EQ. 7 leads to EQ. 10

$$g(t) = E(t) \int_{f_L}^{f_H} F(f)\cos(2\pi ft) + G(f)\sin(2\pi ft) df \qquad (10)$$

Distributing the integral over the sum of the sine and cosine terms leads to EQ. 11.

$$g(t) = E(t)\left( \int_{f_L}^{f_H} F(f)\cos(2\pi ft) df + \int_{f_L}^{f_H} G(f)\sin(2\pi ft) df \right) \qquad (11)$$

Define spectral density component functions (SDC functions) as functions from which the SD function can be calculated. F(f) and G(f) are SDC functions. As is well known, F(f) and G(f) can be used to calculate the spectral density function B(f) using EQ. 12.

$$B(f) = \sqrt{F(f)^2 + G(f)^2} \qquad (12)$$

The amplitude functions can also be used to calculate the phase shift for each frequency using EQ. 13.

$$\phi(f) = \arctan\left(\frac{G(f)}{F(f)}\right) \qquad (13)$$

SD functions and SDC functions both characterize how the amplitude of a function varies with respect to an independent variable and are collectively referred to as amplitude functions. For example, F(f) characterizes how the amplitude of F(f)cos(2πft) varies with frequency. Either the SD function itself or SDC functions are to be estimated using the means described below.

The SD function or the SDC functions, such as F(f) and G(f), may be represented using various functions. The functions used to represent amplitude functions will generally have parameters that, when selected correctly, will lead to useful estimated values that are calculated for g(t). Amplitude functions may be represented by any functional form for which parameters can be determined that produce estimated values for g(t) that differ from the actual values of g(t) in a manner that meets predetermined objectives. An example of such a predetermined objective is having the errors between the measured values and estimated values of g(t) being small enough that the estimated values for g(t) provide useful approximations of the actual values of g(t). Useful values for g(t) occur when the parameters specified for the functions that represent the SDC functions can be used to calculate the SD function of g(t).

One aspect of the present invention involves structure and methodology for using values of g(t) and E(t), either based on measurements, simulations, or other suitable means, to determine the specific values of the parameters that characterize the SD function or one or more SDC functions when such amplitude functions are composed of one or more substantially continuous functions or when such amplitude functions use values for one or more independent variables, such as frequency, that lead to non-orthogonal basis functions constituting g(t). Using continuous functions to represent one or more amplitude functions over at least part of the domain of an independent variable (such as time) is particularly advantageous when a multitude of signals with various frequencies combine to produce a composite signal that is the measured signal g(t). Such a composite signal occurs, for example, when an interrogating signal backscatters from the multitude of particles traveling over a wide range of velocities as they are being carried in a flowing fluid. An example is the signal produced when an interrogating ultrasonic signal backscatters from the blood cells traveling through a living organism's aorta.

In contrast to the present invention, Fourier methods represent the amplitude functions using discrete values of frequencies that are selected as integer multiples of a fundamental frequency. The frequencies used in Fourier methods are carefully selected such that the resulting basis functions are both orthogonal and normal (orthonormal). As described earlier, using discrete frequencies, particularly when they are restricted to being harmonics' of a fundamental frequency, to approximate continuous functions leads to significant inaccuracies, such as spectral broadening. The present invention improves upon Fourier methods by using frequencies that can be selected substantially without limitation as to which frequencies are selected and also by allowing the use of continuous functions to represent continuous amplitude functions.

Figure 3:
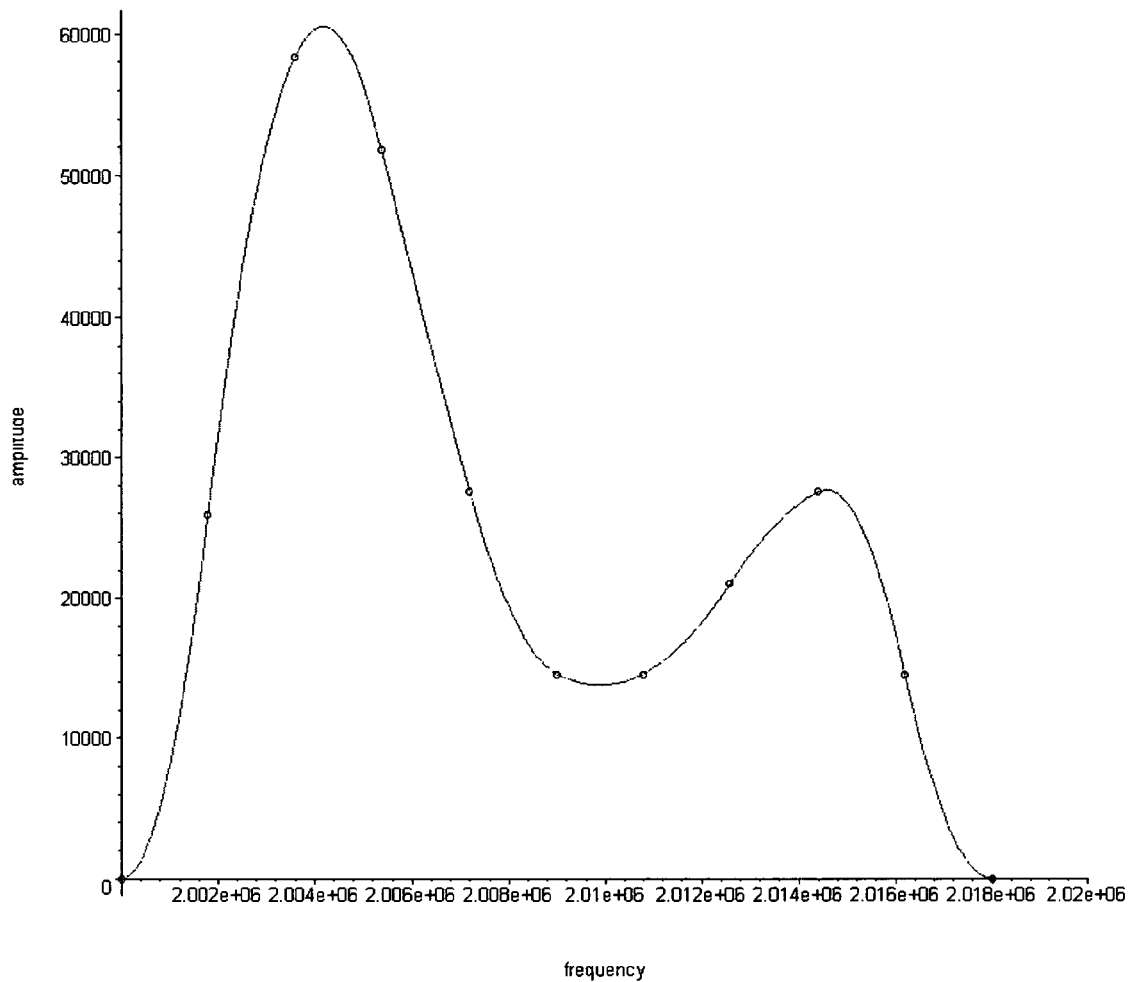
Figure 4:
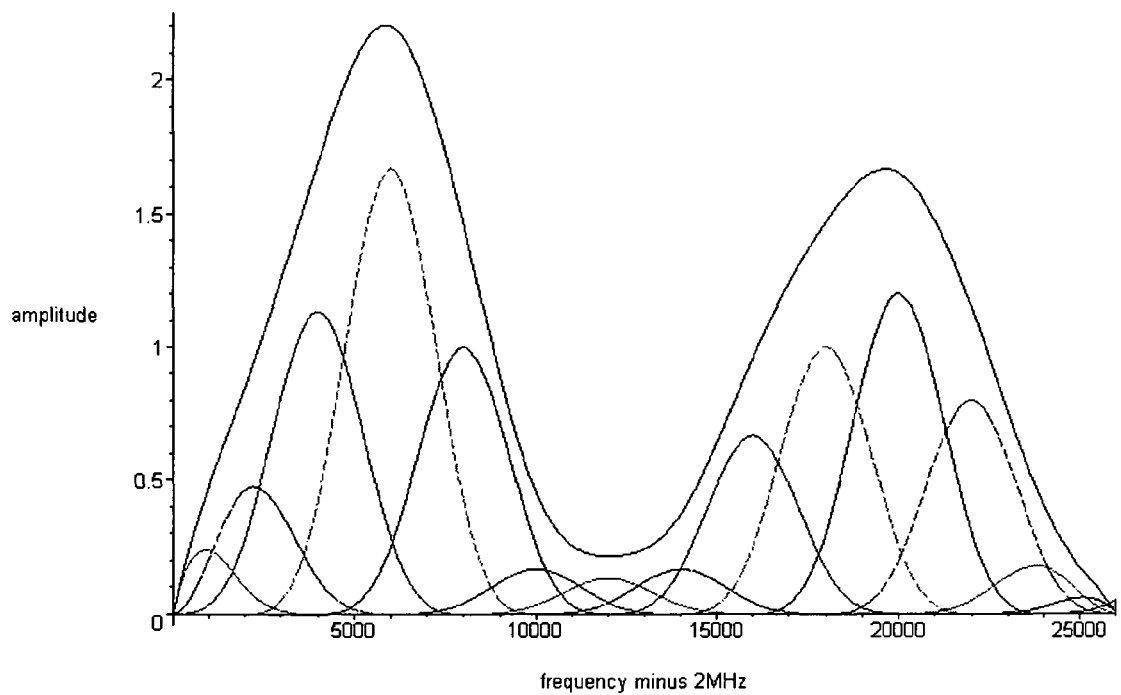

In the present invention, one or more functions are selected to represent the SD or SDC functions. The function used to represent an SDC, such as F(f), may be zero. The functions used to represent the amplitude functions may be discrete, such as one or more vectors of discrete frequencies starting at any frequency of interest and spaced at any, possibly varying and nonuniform, frequencies from each other (in contrast to the evenly spaced harmonic frequencies using in Fourier methods). The functions representing amplitude functions in the present invention can be orthogonal or non-orthogonal. The functions representing amplitude functions can be either normal or not normal. The function or functions used to represent amplitude functions may be one or more continuous, not continuous, or piecewise continuous functions. The functions representing amplitude functions may have one or more intersecting, including overlapping, domains. An overlapping domain between two or more functions is an interval where the domains of two or more functions intersect at more than one value. FIG. 3 illustrates an example where multiple piecewise continuous functions that intersect at only their endpoints represent an amplitude function. FIG. 4 illustrates an example where multiple functions with overlapping domains model an amplitude function. One aspect of the present invention is that functions representing the amplitude functions may use one or more of the following functions: splines, B-splines, polynomials of order 1 or greater, trigonometric functions, trigonometric polynomials, exponential functions, hyperbolic functions, Heaviside functions, functions that approximate Heaviside functions (discussed in detail below), or any another functions that can be used to construct one or more bases that span one or more predetermined vector spaces that can approximate or define a discrete, non-continuous, continuous, or piecewise continuous function. For example, the piecewise continuous segments illustrated in FIG. 3 are composed of quadratic polynomials and Heaviside functions. As another example, FIG. 4 illustrates how B-splines can combine to represent an amplitude function.

FIG. 4 also illustrates another aspect of the present invention that provides for computational flexibility. The independent and dependent variables can be offset (as illustrated in FIG. 4 where the frequency axis is offset by 2 MHz) or scaled to facilitate calculating the parameters of the functions that represent amplitude functions.

Using piecewise continuous functions or functions with overlapping domains is of particular interest because parameters for function segments defined over discrete intervals can be efficiently determined using the present invention. The union of the function segments can represent complicated amplitude functions. FIG. 3 is a graphical example of a piecewise continuous function. The points where the individual function segments of the piecewise continuous function intersect are knot points and these are illustrated by the hollow dots in FIG. 3.

Another aspect of the present invention involves structure and methodology employing a calculation module that uses one or more objective measures to determine the values of the parameters in the functions that represent the amplitude functions or SD function. One example of such an objective measure is using goodness of fit. Other examples of objective measures are minimizing the length of the amplitude functions, SD function, or SDC functions, minimizing the squared area or absolute value of the area under the amplitude functions, SD function, or SDC functions, and minimizing one or more measures of the slopes or changes in slopes of the amplitude functions, SD function, or SDC functions.

One example of an objective measure using goodness of fit is minimizing, or approximately minimizing, the sum of the squared errors between measured values of g(t) and those predicted using amplitude functions. Another example of an objective measure of goodness of fit is minimizing, or approximately minimizing, the sum of squared errors when the values of one or more of the parameters in one or more of the amplitude functions or the SD function are constrained to have values with predetermined properties. Such predetermined properties may include that the parameters are allowed to only have particular values, such as being non-negative, or that the parameters have a particular relationship, such as the mathematical combination of two or more of the parameters (such as one or more of their sum, difference, product, or quotient,) always be positive or that the mathematical combination always falls within a certain range, such as being approximately equal to zero. Another example of an objective measure of goodness of fit is minimizing, or approximately minimizing, the sum of the absolute values of errors, including the possibility that the values of one or more of the parameters in one or more of the amplitude functions or the SD function are constrained to have values with predetermined properties. As before, such properties include having one or more parameters being restricted to particular values, such as being non-negative, or that the parameters have a particular relationship, such as the sum of two or more parameters always be non-negative or that they approximately equal zero. These aspects of the invention are covered in more detail below.

Referring to EQ. 11, in accordance with a further aspect of the present invention, optimized results can be obtained by setting the values for $f_L$ and $f_H$ respectively low enough and high enough that they cover the full range of frequencies that constitute the spectrum of g(t). The values for $f_L$ and $f_H$ may be determined concurrently with determining the values of the parameters for the functions representing the SDC functions, such as G(f) and F(f), or they may be selected prior to determining the parameters for the functions representing G(f) and F(f). Selecting $f_L$ and $f_H$ ahead of time is often possible. For example, the conditions that produce g(t) are generally known. A predetermined lowest frequency may be based on the frequency of an interrogating signal interacting with one or more moving media. For example, the lowest frequency can be predetermined based on the frequency of the interrogating signal and the lowest frequency expected from the moving media after including factors such as measurement errors or noise that can affect the frequencies produced by the interaction of the interrogating signals with the moving media.

Another aspect of the invention involves using single continuous functions that span the entire domain of frequencies as amplitude functions or as SD functions. An example of such a function is EQ. 14. This equation characterizes the amplitude functions that occur during laminar fluid flow with measurement noise. This equation would become B(f) in EQ. 8 and EQ. 9.

$$x(f) = \frac{1}{2} \frac{(1-F)e^{\left(-\frac{1}{2}\left(\frac{c(-f+f_e)}{f+f_e}+\mu_s\right)^2 / \sigma_s^2\right)} \sqrt{2}}{\sqrt{\pi}\,\sigma_s} + F\int_{f_e}^{\frac{(c+a)f_e}{c-a}} \frac{\left(1 + \frac{c(-x+f_e)}{(x+f_e)a}\right)^{(2\frac{1}{k}-1)} e^{\left(-2\frac{c^2 f_e^2(-f+x)^2}{(f+f_e)^2(x+f_e)^2 \sigma^2}\right)} \sqrt{2}}{\sqrt{\pi}\,\sigma k a}\,dx \qquad (14)$$

The emitted frequency sent out as the interrogating signal is $f_e$ and the tissues move at various velocities to produce the reflected frequencies, f. The amount of tissue at each velocity produces the relative amplitudes. The parameters are:

1. F the fraction of the insonified region that has flowing liquid.
2. k: the shape exponent for the flow region
3. $\sigma_s$: the standard deviation for the velocity in the slow/nonflowing region's reflectors.
4. $f_e$: the frequency of the interrogating signal.
5. a: the maximum value for velocity that is achieved at the time that a measurement is made.
6. $\mu_s$: the mean velocity of the slow moving/nonflowing region's reflectors.
7. $\sigma$: the standard deviation of the measurement error associated with the flowing fluid.
8. c: the speed of sound.

A further aspect of the present invention involves using such a single continuous amplitude function in combination with a function that represents the phase shift, $\phi(f)$ see, e.g., EQ. 8 and EQ. 9, to produce single continuous functions that represent amplitude functions that span the entire domain of frequencies. An additional aspect of the present invention involves using such a single continuous amplitude function, e.g., in combination with functions that represent the sin($\phi(f)$) and cos($\phi(f)$) in EQ. 8 and EQ. 9 to produce single SDC functions that span the entire domain of frequencies. A further aspect of the present invention relates to representing $\phi(f)$, sin($\phi(f)$, or cos($\phi(f)$) using either constants or polynomials with degree of 1 or greater. A further aspect of the present invention involves selecting the frequency of the interrogating signal used with Doppler measurements of velocities such that $\phi(f)$, sin($\phi(f)$), or cos($\phi(f)$) may be represented using either constants or a linear function.

A further aspect of the present invention involves characterizing the phase shift when using Doppler measurements of fluid flows using EQ. 15 to represent phase angle.

$$\phi = -\arctan\left(\frac{1}{2} \frac{\begin{array}{c} 4f\pi\sin\left(\frac{fD\pi}{c}\right)\cos\left(\frac{fD\pi}{c}\right) - \\ 2f^x cb\cos\left(\frac{fD\pi}{c}\right)^2 + f^x cb + f^x e^{(bf^x D)}bc \\ cbf^x\sin\left(\frac{fD\pi}{c}\right)\cos\left(\frac{fD\pi}{c}\right) - f\pi e^{(bf^x D)} \end{array}}{\begin{array}{c} 2f\pi\cos\left(\frac{fD\pi}{c}\right)^2 - f\pi + \end{array}}\right) \quad (15)$$

where
  φ=phase angle in radians
  f=frequency in Hz
  D depth of region from which Doppler-shifted signals are being generated
  c=speed of signal, such as speed of sound
  x=attenuation exponent
  b=attenuation constant For the case where x=1 EQ. 15 simplifies to become EQ. 16

$$\phi = \arctan\left(\frac{-2\pi\sin\left(2\frac{fD\pi}{c}\right) + cb\cos\left(2\frac{fD\pi}{c}\right) - e^{(bfD)}bc}{2\pi\cos\left(2\frac{fD\pi}{c}\right) + cb\sin\left(2\frac{fD\pi}{c}\right) - 2\pi e^{(bfD)}}\right) \quad (16)$$

The attenuation constant, b, can be calculated from the attenuation factor using EQ. 17

$$b = 0.5000000000 \; 10^{-7} \beta \ln(10) \quad (17)$$

where β is the attenuation factor in dB.

Figure 5:
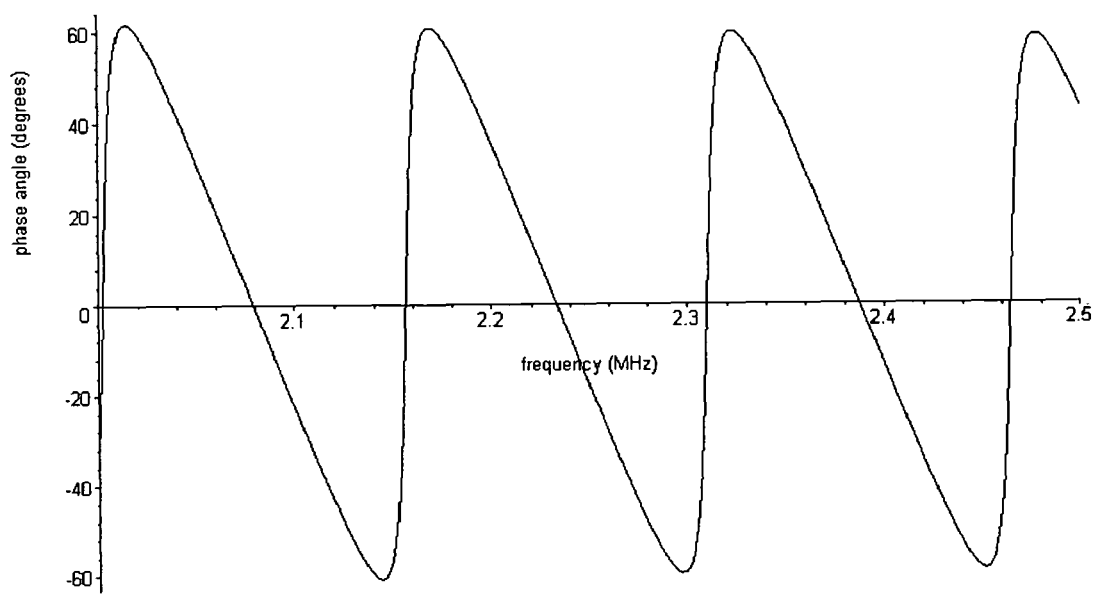
Figure 6:
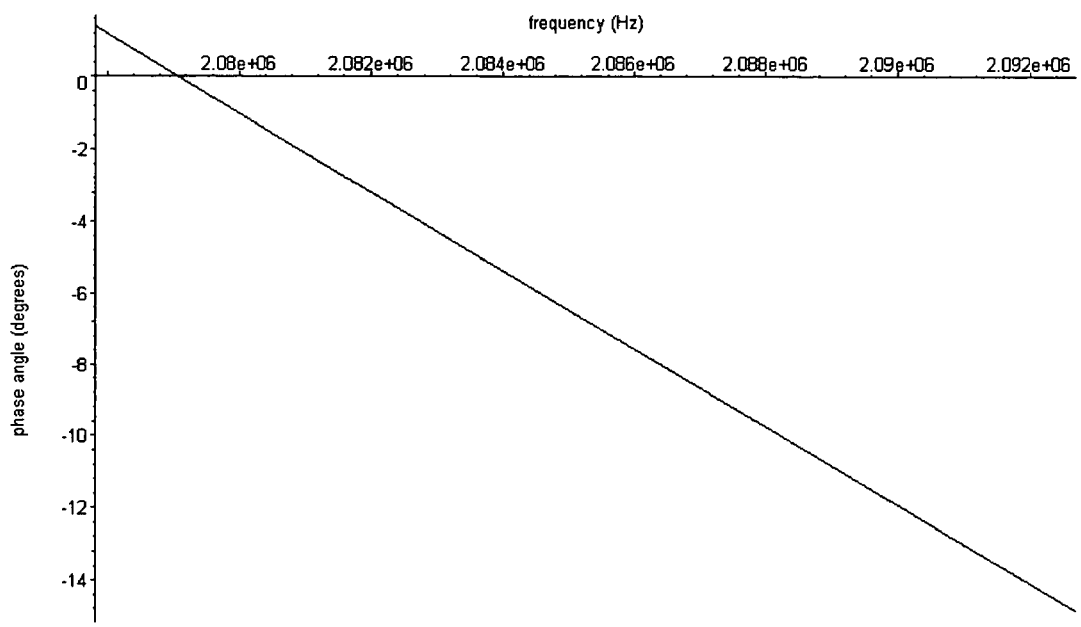

FIG. 5 illustrates how the phase angle can change with frequency. As is known, selecting the emitted frequency determines the frequencies of the returned signal. As previously mentioned, one aspect of the present invention involves selecting the emitted frequency such that the returned signals are confined to an approximately linear region of the phase angle response. For example, in FIG. 5 selecting an emitted frequency that leads to return frequencies around 2.079 MHz would be in a region where phase angle varies close to linearly with frequency, whereas selecting an emitted frequency that leads to return frequencies about 2.17 MHz would be in a region where phase angle does not vary linearly with frequency. More specifically, if 2.078 MHz is selected as the emitted frequency and blood flow in the ascending aorta of an adult human is being measured using an interrogating signal beamed down the axis of the aorta, then frequencies in the range of approximately 2.078 to 2.093 MHz will be returned. FIG. 6 illustrates an example phase angle response over this frequency range. In this example, selecting 2.078 MHz leads to phase angle responses that may be modeled as a linear function.

FIG. 5 illustrates that half of the phase angle response will be over frequencies that lead to positive phase angles. Selecting an emitted frequency such that the phase angle response is always positive is beneficial. When the phase angles are always positive the amplitude response function F(f) of EQ. 1 will always be positive. If the phase angle becomes negative the sin(φ(f)) term will be negative, leading to negative values over at least part of the range of F(f). Having only positive phase angles avoids this condition. Calculating correct values for F(f) and G(f) is made easier when it is known that F(f) and G(f) are always positive. Selecting the emitted frequency for Doppler velocity measurements such that the phase angle response is always positive is included in accordance with another aspect of the present invention.

Figure 7:
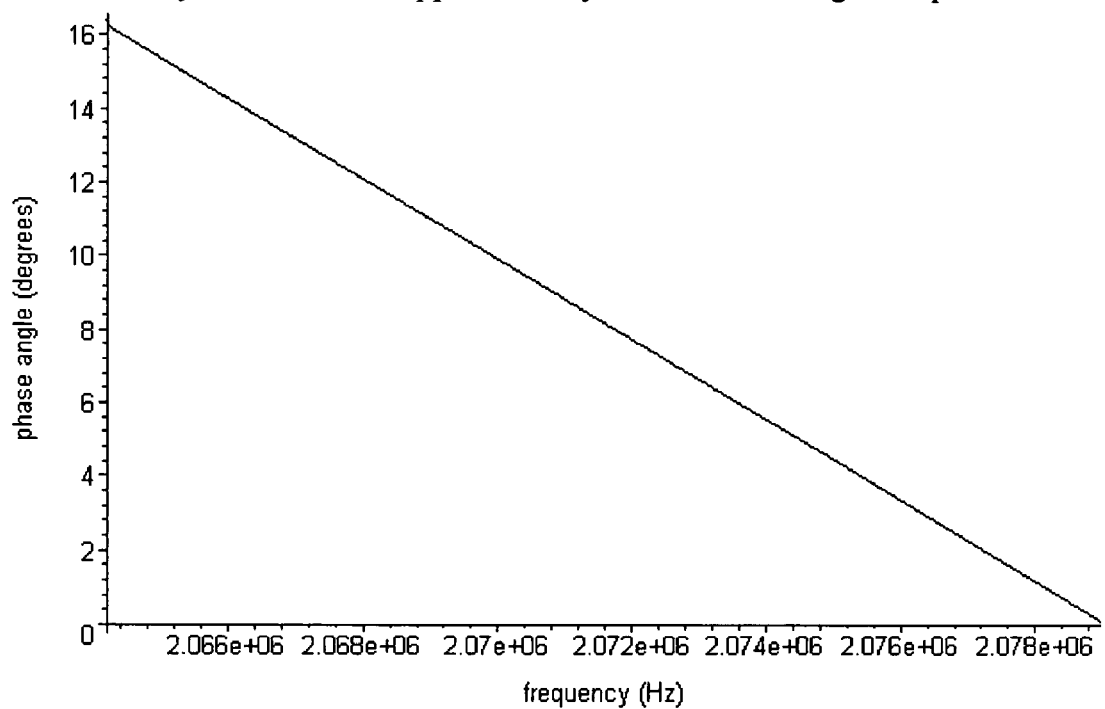

Another aspect of the present invention involves selecting the emitted frequency so that the phase angle response is always positive and in a region where the phase response is approximately linear. FIG. 7 illustrates an example in accordance with this aspect of the present invention.

A further aspect of the present invention involves selection of the emitted frequency so that at least a portion of the phase angle response is close to zero.

Figure 8:
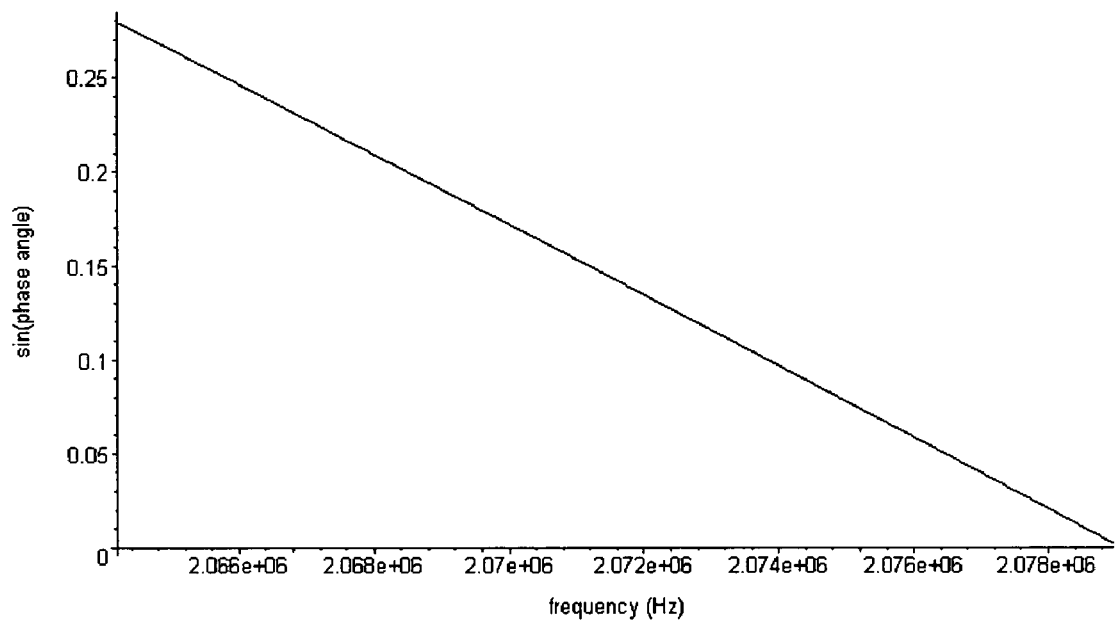
Figure 9:
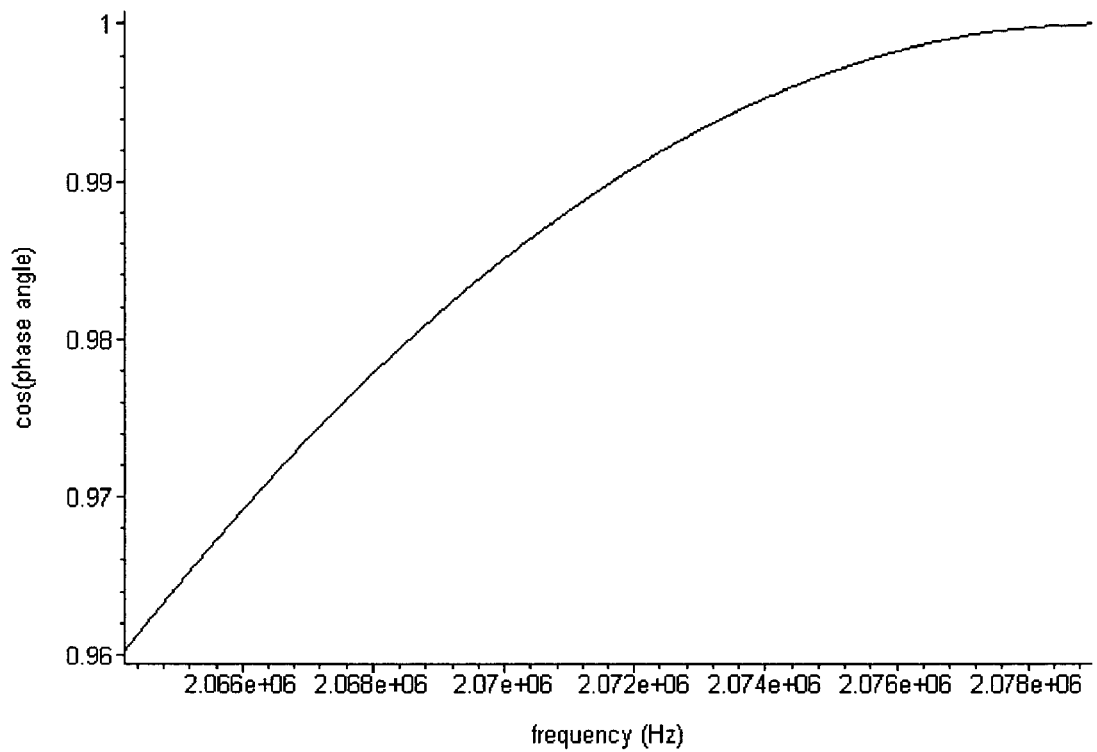

FIG. 8 and FIG. 9 illustrate how thus selecting the emitted frequency yields sin(φ(f)) and cos(φ(f)) functions that can be approximated. sin(φ(f)) can be approximated in many cases using a linear function. The range of cos(φ(f)) is small. Depending upon the precision needed it may be approximated as a constant (such as 0.98 in this example), as a linear function, or as a higher order polynomial. A linear approximation would pick up most of the variation and be adequate for many applications.

Figure 10:
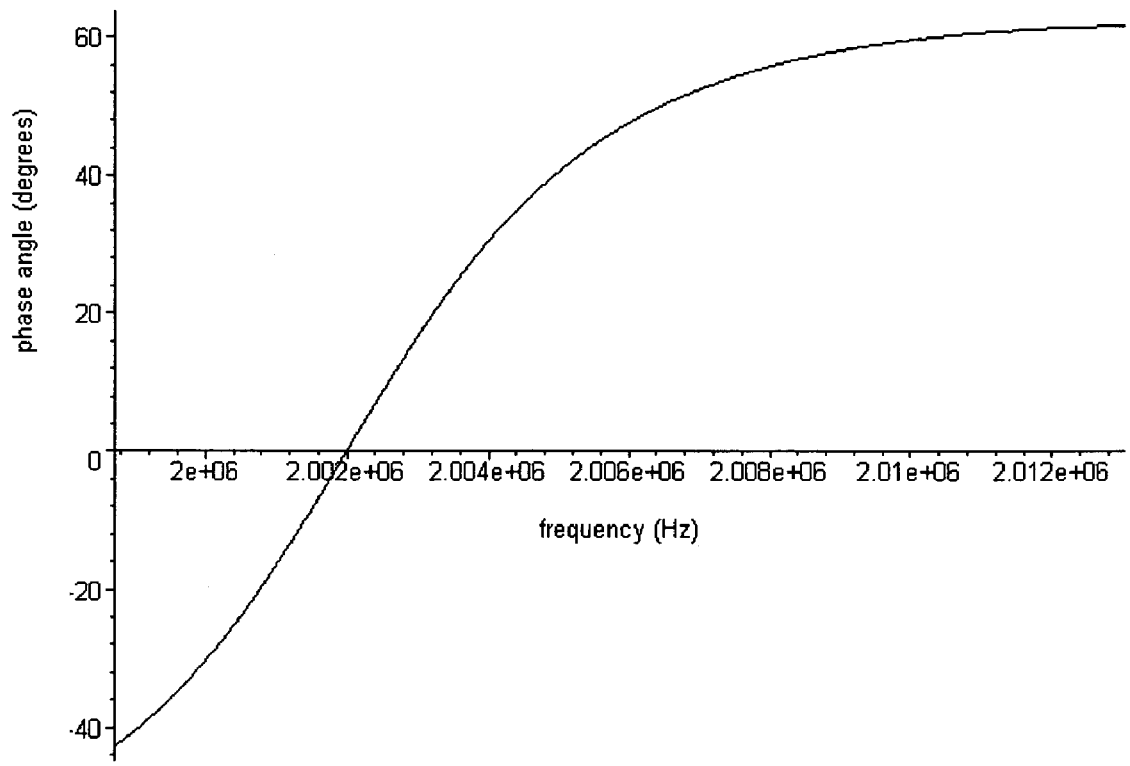
Figure 11:
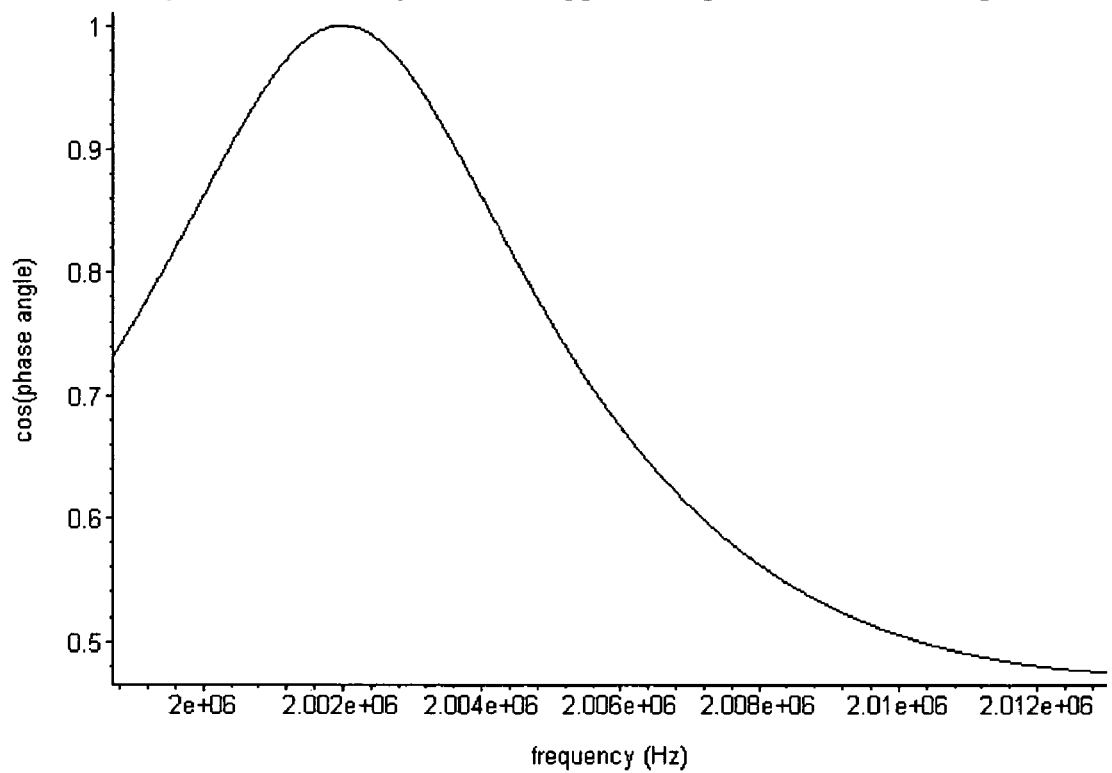
Figure 12:
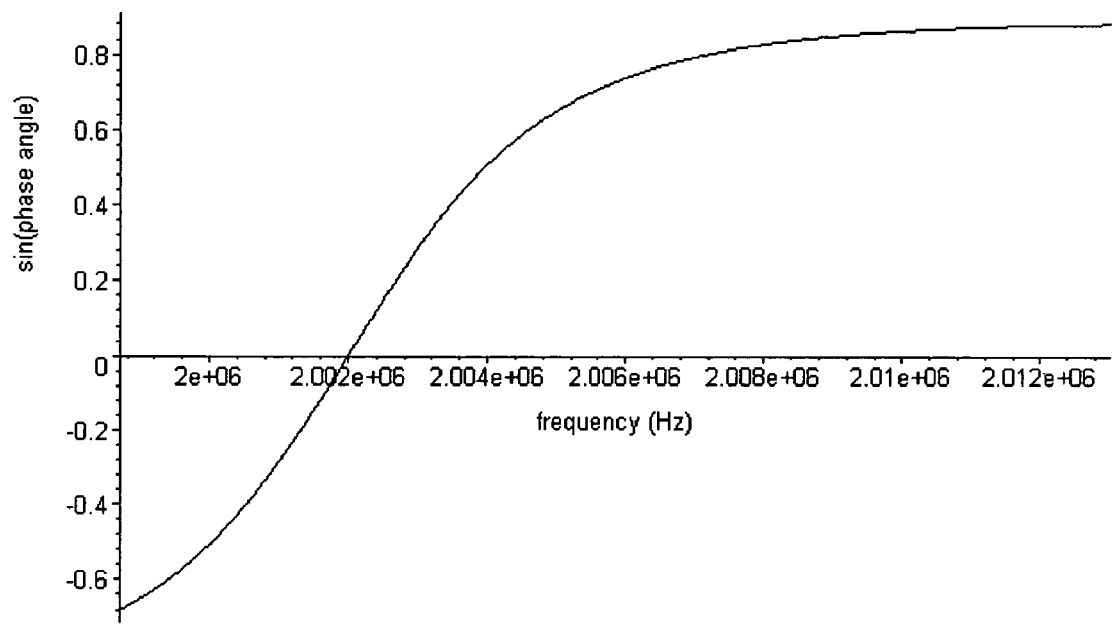
Figure 13:
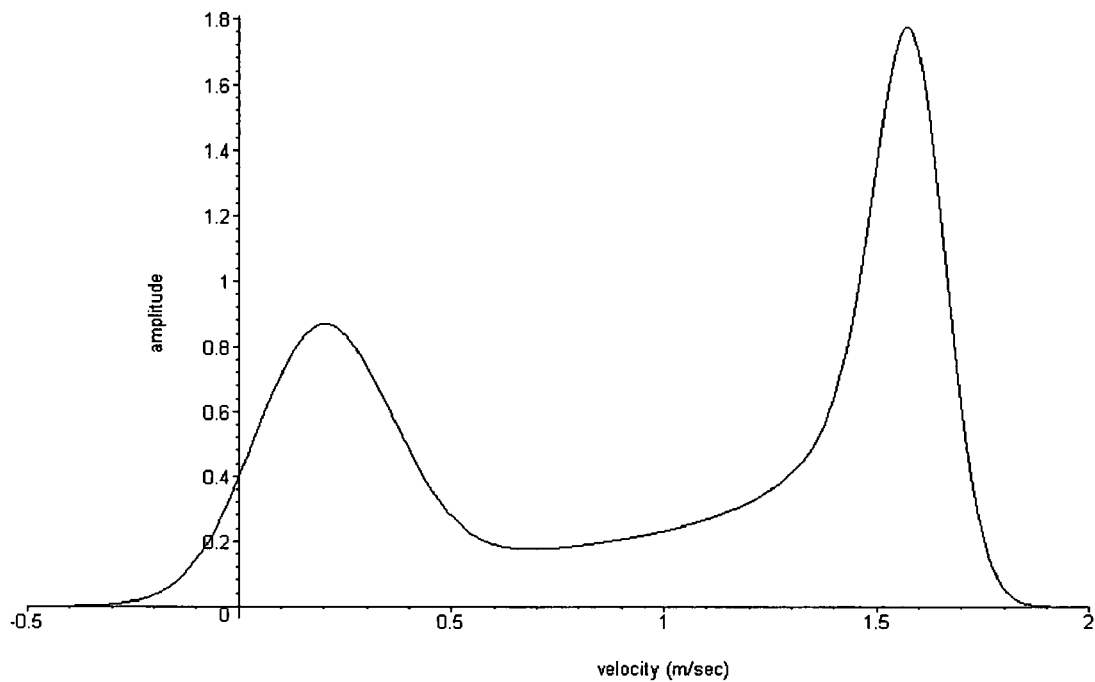

Compare the results illustrated in FIGS. 7, 8 and 9 with what happens if the emitted frequency is not selected according to this aspect of the present invention. FIGS. 10, 11, and 12 illustrate the results from using an emitted frequency of 2 MHz for the conditions of this example. The linear response and small domains that occurred when the emitted frequency was selected in accordance with this aspect of the present patent are not present in FIGS. 10, 11, and 12.

Figure 18:
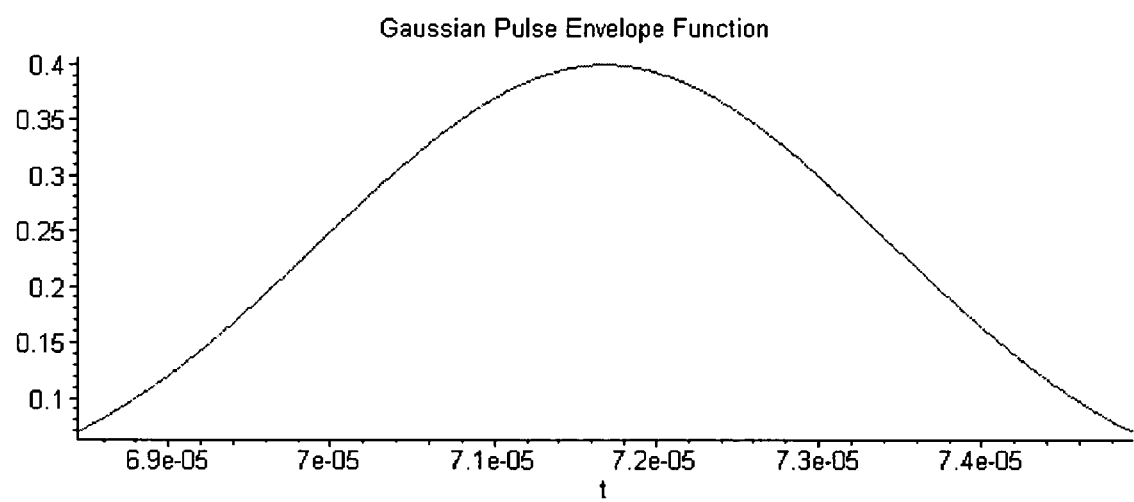
Figure 19:
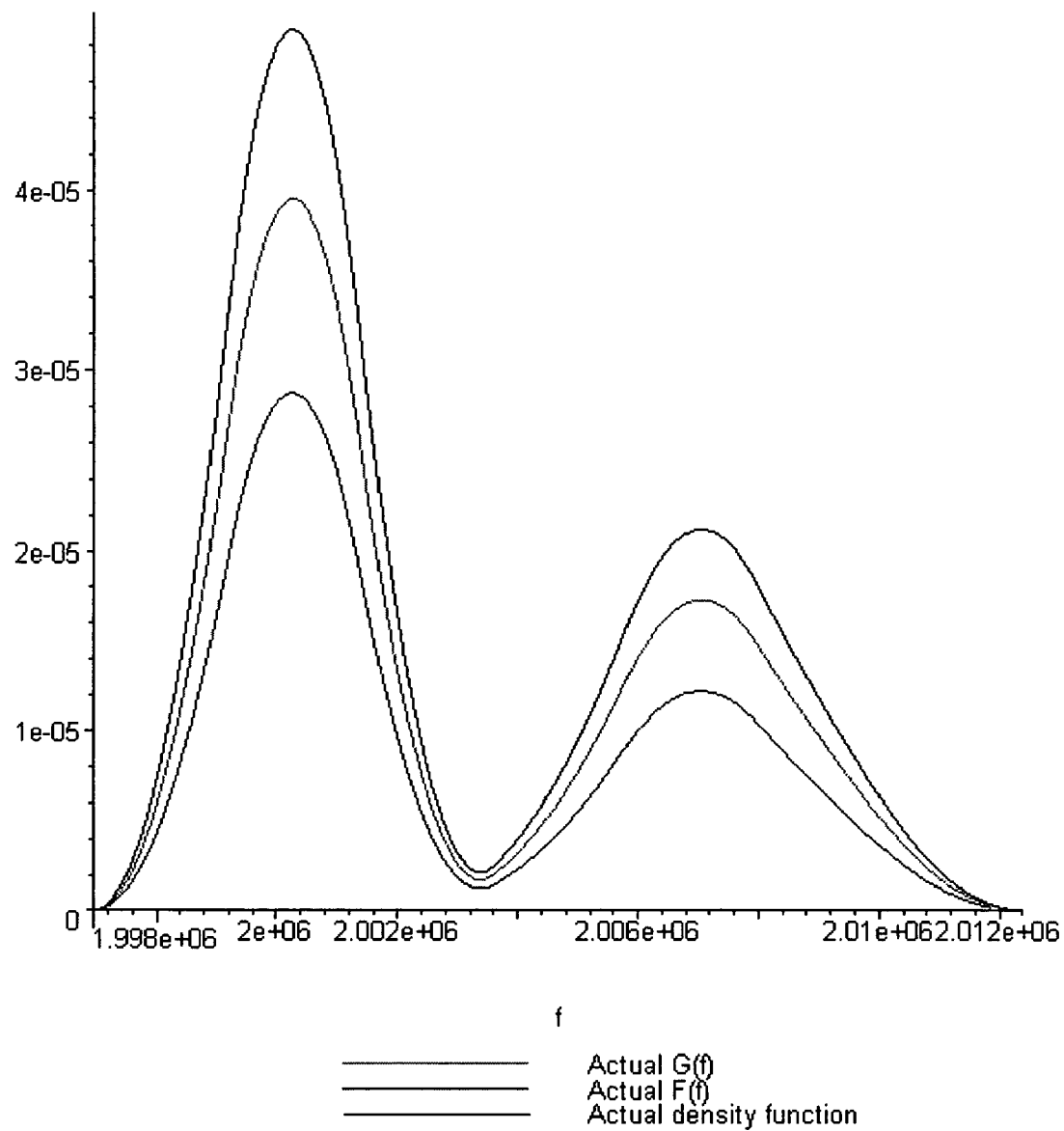

When the frequency distribution of a spectral distribution has been produced in a manner that relates frequency to a calculated variable then the distribution of the calculated variable can be determined. For example, if the frequency distribution has been obtained using Doppler then the velocity at any frequency can be calculated using EQ. 18. The frequency data or data for a calculated variable can be used to calculate the values of one or more parameters that characterize a distribution. Such distributions are particularly useful when the methods of the present invention are used to calculate continuous distributions. Such a distribution could be, for example a Gaussian distribution that is characterized by its mean and standard deviation. EQ. 19 is an example of a more complicated distribution that has six parameters. FIG. 18 is an example of such a distribution when the calculated parameter is velocity.

$$v = -\frac{c(-f + f_e)}{f + f_e} \quad (18)$$

$$x(v) = \frac{1}{2}\frac{(1-F)e^{\left(-\frac{1}{2}\frac{(-v+\mu_s)^2}{\sigma_s^2}\right)}\sqrt{2}}{\sqrt{\pi}\,\sigma_s} + F\int_0^a \frac{\left(1-\frac{x}{a}\right)^{\left(2\frac{1}{k}-1\right)}e^{\left(-\frac{1}{2}\frac{(v-x)^2}{\sigma^2}\right)}\sqrt{2}}{\sqrt{\pi}\,\sigma ka}dx \quad (19)$$

Other aspects of the present invention involve structure and methodology for determining the parameters of an SD function, or the SDC functions, from signals that have been distorted by digitization errors. When signals are measured and converted from analog to digital form the analog values are converted to numeric (digital) values with a limited precision. Such limited precision leads to numeric values that approximate the actual values of the signal and differences between the actual values and the approximate values are errors caused by the digitization process. In particular, the present invention includes structure and methodology for calculating SD functions, or the functions that can be used to determine the SD functions, when using digitized data by constraining the calculated functions so that they have predetermined properties. Such predetermined properties can include having at least one, and typically the majority or approximately all, of the values of g(t) estimated using the calculated functions falling within the ranges determined by the digitization process. Such predetermined properties can also include requiring SD functions, or the functions that can be used to determine the SD functions, having predetermined properties related to their geometries or of the parameters that define the functions. For example, such methodology includes having functions that are the minimum measures of slopes or rates of changes in slopes, the lengths, or squared areas enclosed by the functions. Another example is having functions that maximize, or minimize, the magnitudes of one or more of the parameters that characterize the functions. Another example is having functions that minimize measures of length and squared areas enclosed by functions and that maximize the magnitudes of one or more of the parameters that characterize the functions. These aspects of the invention are described more completely later.

To illustrate the aspect of the present invention that characterizes amplitude functions using multiple functions, consider the following description of a general process for estimating amplitude functions. Amplitude functions, such as those of EQ. 8 and EQ. 9, can be approximated arbitrarily closely as the sum of other functions. The following expressions define the approximations of G(f) and F(f) as the sums of N piecewise functions.

$$G(f) = \sum_{j=1}^{N} G_j(f) \tag{19}$$

$$F(f) = \sum_{j=1}^{N} F_j(f) \tag{20}$$

The N piecewise functions defined over each of N intervals will collectively span the domain of f that is of interest. N functions exist for G(f) and N functions exist for F(f), and they may or may not have overlapping domains. Each of the G(f) and F(f) will be defined over a domain of f with lower and upper limits. For the case of using piecewise continuous functions the union of the domains will be continuous and the individual domains will not overlap except at the points of intersection.

Substituting EQs. 19 and 20 into EQ. 11 and distributing cosine and sine terms over the sums leads to EQ. 21.

$$g(t) = E(t)\left(\int_{f_L}^{f_H} \sum_{j=1}^{N} F_j(f)\cos(2\pi ft)df + \int_{f_L}^{f_H} \sum_{j=1}^{N} G_j(f)\sin(2\pi ft)df\right) \tag{21}$$

Changing the integral of the sum to a sum of integrals leads to EQ. 22.

$$g(t) = \tag{22}$$
$$E(t)\left(\left(\sum_{j=1}^{N} \int_{f_L}^{f_H} F_j(f)\cos(2\pi ft)df\right) + \left(\sum_{j=1}^{N} \int_{f_L}^{f_H} G_j(f)\sin(2\pi ft)df\right)\right)$$

Each of the piecewise functions is defined over part of the domain of f. Indexing the limits of integration for each of the integrals in the sums leads to EQ. 23.

$$g(t) = E(t) \tag{23}$$
$$\left(\left(\sum_{j=1}^{N} \int_{f_{L_j}}^{f_{H_j}} F_j(f)\cos(2\pi ft)df\right) + \left(\sum_{j=1}^{N} \int_{f_{L_j}}^{f_{H_j}} G_j(f)\sin(2\pi ft)df\right)\right)$$

E(t) is the envelope of the interrogating signal. If the signal being analyzed has not been modulated by an interrogating function then setting the envelope function E(t)=1 will decompose the received signal without removing the effects of the interrogating signal. If E(t) is not constant then methodology in accordance with the present invention can separate the effects of E(t) while decomposing the received signal into, for example, SD or SDC functions.

g(t) is the received signal and measured values for it are known. Dividing both sides of EQ. 23 by E(t) produces EQ. 24.

$$\frac{g(t)}{E(t)} = \tag{24}$$
$$\left(\sum_{j=1}^{N} \int_{f_{L_j}}^{f_{H_j}} F_j(f)\cos(2\pi ft)df\right) + \left(\sum_{j=1}^{N} \int_{f_{L_j}}^{f_{H_j}} G_j(f)\sin(2\pi ft)df\right)$$

Measured values from g(t) are the data used to calculate F(f) and G(f).

Use the following substitutions in EQ. 24:

$$\frac{g(t)}{E(t)} = f(t) \tag{25}$$

$$f_{H_j} = H_j \tag{26}$$

$$f_{L_j} = L_j \tag{27}$$

and obtain EQ. 28.

$$f(t) = \left(\sum_{j=1}^{N} \int_{L_j}^{H_j} F_j(f)\cos(2\pi ft)df\right) + \left(\sum_{j=1}^{N} \int_{L_j}^{H_j} G_j(f)\sin(2\pi ft)df\right) \tag{28}$$

As stated earlier, the piecewise continuous functions may be polynomials, such as linear or quadratic functions. Each of the function segments will have its coefficients, such as the slope and intercept for linear functions. For illustration of the principles of the present invention, the following example uses quadratic functions and derives expressions that may be used to solve for the coefficients that specify each of the quadratic function segments.

Let the following expressions specify the piecewise quadratic function segments:

$$G_j(f) = a_j f^2 + b_j f + c_j \tag{29}$$

$$F_j(f) = x_j f^2 + y_j f + z_j \tag{30}$$

Substituting these expressions into EQ. 28 leads to EQ. 31.

$$f(t) = \left(\sum_{j=1}^{N} \int_{L_j}^{H_j} (x_j f^2 + y_j f + z_j)\cos(2\pi ft) df\right) + \left(\sum_{j=1}^{N} \int_{L_j}^{H_j} (a_j f^2 + b_j f + c_j)\sin(2\pi ft) df\right) \quad (31)$$

This equation is linear in the coefficients $x_j$, $y_j$, $z_j$, $a_j$, $b_j$, and $c_j$, and the integrals have analytical solutions. FIG. 14 has the analytical solution. This equation is a general expression. No restrictions have been placed on the interval limits $[L_j, H_j]$ so they do not need to be continuous and they could overlap. Therefore, the function segments could be discontinuous. No constraint has been placed on the slopes of function segments matching if function segments are continuous. The current formulation, without constraints, is broadly applicable.

The unknowns to be solved for are the coefficients $x_j$, $y_j$, $z_j$, $a_j$, $b_j$, and $c_j$ for $j=1 \ldots N$. Represent these unknowns as the vector $|d|$. Once values have been estimated for $|d|$ then estimated values for $f(t)$ can be calculated using EQ. 31. The values of $|d|$ can be solved for using one or more objective criteria, such as the estimated values for $f(t)$ having the least sum of squared errors compared to the measured values for $f(t)$. EQ. 31 is linear in $x_j$, $y_j$, $z_j$, $a_j$, $b_j$, and $c_j$ so minimum norm methods, such as least squared errors, may be employed to solve for the unknowns. The number of frequency intervals and the lower and upper frequencies for each function segment are values that are selected, and thus, are known. Similarly the times when the measurements are taken are known. These values are inserted into the equation in FIG. 14 and the result is a set of coefficients that multiply each of the $x_j$, $y_j$, $z_j$, $a_j$, $b_j$, and $c_j$. This set of coefficients forms a rectangular matrix $|A|$. Designate the vector of measured values of $f(t)$ as $|f|$. The resulting matrix equation is EQ. 32.

$$\|A\| |d| = |f| \quad (32)$$

Matrix solution methods known to those skilled in the art can be used to solve for $|d|$, which contains the values for $x_j$, $y_j$, $z_j$, $a_j$, $b_j$, and $c_j$. One such method is using the Moore-Penrose generalized inverse of $\|A\|$. Designating $\|P\|$ as the Moore-Penrose generalized inverse of $\|A\|$ leads to EQ. 33. Singular value decomposition is another method that can be used.

$$\|P\| |f| = |d| \quad (33)$$

For the situation where the measurement times and frequency intervals are predetermined and reused multiple times only one matrix inverse needs to be calculated, which offers considerable economy of calculation. The matrix $\|A\|$ is based on the predetermined $[L_j, H_j]$ and predetermined measurement times and is calculated in advance. The Moore-Penrose generalized inverse, $\|P\|$, is also calculated in advance and stored for later use, such as in the nonvolatile memory of a computation means such as using a hard disk or other magnetic media or on a CD ROM or other optical storage media, or nonvolatile RAM or other electronic storage media. After $\|A\|$ and $\|P\|$ have been calculated and stored the values for $\|P\|$ can be retrieved and used to calculate $|d|$ whenever such calculations are desired for a vector of measured values of $f(t)$, $|f|$ using EQ. 33, which leads immediately to values for the coefficients $x_j$, $y_j$, $z_j$, $a_j$, $b_j$, and $c_j$.

As described below, the formulation becomes substantially simpler when the lower and upper bounds for each interval, $[L_j, H_j]$ all have the same width, but they do not need to have the same width or be equally spaced. No restrictions are placed on the measurement times being equally spaced. The flexibility available for selecting the bounds for each interval and the measurement times allows selecting nonuniform intervals, such as using Chebyshev points or expanded Chebyshev points.

Methods other than the least sum of squared errors can be used to calculate the values of the unknown coefficients. For example, the least sum of absolute value of errors (LAV) or nonnegative least squares (NNLS) can be used. As is known to those skilled in the art, LAV can be implemented such that constraints are placed on the values of the variables, as is also the case with NNLS. Such constraints are particularly useful when linear function segments are used because these readily lend themselves to constraints that prevent one or more of SDC functions, such as G(f), from having any negative values.

For the case where spectra are continuous, such as the Doppler spectra from flowing blood, the jth function segment needs to connect to function segment j−1. Requiring continuity means that the endpoint of the (j−1)th function segment must be the starting point for the jth function segment, which leads to the lower bound of the jth segment being equal to the upper bound of the (j−1)th segment. Therefore, EQ. 34 holds for piecewise continuous functions.

$$L_j H_{j-1} \quad (34)$$

As demonstrated below, this restriction means that the value for $c_j$ is determined by the values of $a_{j-1}$, $b_{j-1}$, $c_{-1}$ and $H_j$. Therefore, $c_j$ is not an independent variable when the quadratic function segments are piecewise continuous.

Spectra from processes such as flowing blood are smooth. Smooth transitions between quadratic function segments requires that the slope at the end of the (j−1)th segment match the slope of the jth segment. As will be shown below, this constraint removes the set of $b_j$ from being independent variables.

The following discussion uses as examples the $a_j$, $b_j$, $c_j$, and the same discussion also applies to the $x_j$, $y_j$, $z_j$. Include an offset for the frequency at the beginning of the interval over which a function is being used. The equation for the jth function segment that goes through a specific point is derived as follows. Designate the specific point for the lowest frequency and the amplitude at the lowest frequency by using the ordered pair $(L_j, \beta_j)$. $\beta_j$ is the beginning amplitude for the jth function segment. The jth function segment has its own coefficients $a_j$, $b_j$, and intercept $c_j$.

The starting point for the jth function segment has the same coordinates as the endpoint for the (j−1)th function segment. Designate the endpoint for the (j−1)th function segment as $(H_{j-1}, e_{j-1})$. $e_{j-1}$ is the ending amplitude for the (j−1)th function segment. The starting point for the jth function segment is the endpoint of the j−1th function segment. The following equation gives the amplitudes for the jth function segment of the SDC function when using piecewise continuous quadratic functions to represent the SDC function.

$$G_j = a_j(f - H_{j-1})^2 + b_j(f - H_{j-1}) + c_j \quad (35)$$

However, $c_j = e_{j-1}$ so $$G_j a_j(f - H_{j-1})^2 + b_j(f - H_{j-1}) + e_{j-1} \quad (36)$$

For the special case when j=1 the starting point has an amplitude of 0 at the frequency $f_{lb}$, where $f_{lb}$ is defined earlier. Clearly, a recurrence exists that gives the $e_k$. The basic equation is:

$$e_j = a_j(H_j H_{j-1}) + b_j(H_j - H_{j-1}) + e_{j-1} \quad (37)$$

This equation gives the logical result that the height of the endpoint of the jth function segment is the sum of the heights of all of the preceding endpoints plus the change in height that occurs during frequency interval j. Using the preceding equations to eliminate $c_j$ from EQ. 35 leads to EQ. 38.

$$G_j = a_j(f - H_{j-1})^2 + b_j(f - H_{j-1}) + \left(\sum_{p=1}^{j-1}((H_p - H_{p-1})^2 a_p + (H_p - H_{p-1})b_p)\right) \tag{38}$$

These equations that tie the endpoints together establish continuity between the piecewise functions. The piecewise functions are now piecewise continuous. The values for the $H_j$ are known because they are selected a priori. In this set of equations the only free variables are the first N−1 $b_j$ and the N $a_j$.

Constrain the slopes of the j−1th and the jth segments to match where the segments joint. This constraint leads to the starting slope of the jth function segment being equal to the parameter $b_j$. The $b_j$ for each segment depends only upon the values for the coefficients for the previous function segments. The end result is that each $b_j$ depends only on the previous values of the $a_j$. The equation for $b_j$ is $$b_j = 2\left(\sum_{q=2}^{j}(H_{q-1} - H_{q-2})a_{q-1}\right) \tag{39}$$

For the first function segment the initial slope is zero because it starts tangent to the f-axis. Therefore, $b_1=0$. This situation becomes clear by examining the case where j=1.

$$G_1 = a_1(f-H_0)^2 \tag{40}$$

Using EQ. 39 to eliminate b from EQ. 38 leads to EQ. 41. This equation is the general expression for the jth function segment for piecewise continuous quadratic function segments.

$$G_j = \left(\sum_{p=1}^{j-1}(H_p - H_{p-1})(-H_{p-1} + 2f - H_p)a_p\right) + a_j(f - H_{j-1})^2 \tag{41}$$

The endpoint of the final function segment is at frequency $H_N$. The SD function needs to be zero at this point and the slope also needs to be zero. These requirements also require the SDC functions, such as G(f), to have zero amplitude and slope at $H_N$. Two boundary conditions exist at $H_N$, but only one free variable, $a_{N-1}$, remains, therefore need to remove another degree of freedom. Set the equations for the boundary conditions that equate the slope and amplitude at the end of the Nth segment equal to each other (they both equal 0) and it becomes clear that $a_{N-1}$ is not a free variable, either. Therefore, when have N function segments only N−2 values of |a| need to be found.

The equations become considerably simpler is equally spaced function segments are used. Assume that each of the function segments covers a frequency interval of equal width. Select a value for the lowest basis frequency, $H_0$, and then index by $H_\delta$ up from it for other frequencies in the basis.

With equally spaced frequency intervals have $$H_{q-1} - H_{q-2} = H_\delta \tag{41}$$

And the general expression for the jth quadratic function segment becomes EQ. 42.

$$G_j = H_\delta\left(\sum_{p=1}^{j-1}(-(2p-1)H_\delta + 2f - 2H_0)a_p\right) + a_j(f - H_0 - (j-1)H_\delta)^2 \tag{42}$$

The unknown variables are the $a_j$. Represent these variables as the vector |a|. When impose continuity and matching slopes at the knotpoints where the function segments join the values for the (N−1)th and Nth values of |a| stop being independent variables. The expressions for these variables are $$a_{N-1} = \sum_{p=1}^{N-2} a_p(p - N) \tag{43}$$

$$a_N = -\left(\sum_{p=1}^{N-2} a_p(p - N + 1)\right) \tag{44}$$

The equations that give $a_{N-1}$ and $a_N$ confirm that the last two coefficients are completely specified by the first N−2 coefficients and, thus, are not independent variables. These values lead to the last two function segments working together to make the final amplitude of G(f) become zero and with zero slope with smooth transitions at the knotpoints of the final two function segments.

Expressions for the (N−1)th and Nth function segments in terms of the first N−2 elements of |a| are $$G_{N-1} = \sum_{j=1}^{N-2}(H_\delta(-(2j-1)H_\delta + 2f - 2H_0)a_j + (-H_0 - (N-2)H_\delta + f)^2 a_j(j-N)) \tag{45}$$

$$G_N = \sum_{j=1}^{N-2}(-a_j(-f + NH_\delta + H_0)^2(j - N + 1)) \tag{46}$$

Similar relationships exist for F(f), $F_j$ and |d|, including $$F_j(f) = \tag{47}$$

$$H_\delta\left(\sum_{p=1}^{j-1}(-(2p-1)H_\delta + 2f - 2H_0)x_p\right) + (-H_0 - (j-1)H_\delta + f)^2 x_j$$

$$F_{N-1} = \sum_{j=1}^{N-2}(H_\delta(-(2j-1)H_\delta + 2f - 2H_0)x_j + (-H_0 - (N-2)H_\delta + f)^2 x_j(j-N)) \tag{48}$$

$$F_N = \sum_{j=1}^{N-2}(-x_j(-f + NH_\delta + H_0)^2(j - N + 1)) \tag{49}$$

Substituting the preceding equations into EQ. 22 and integrating and substituting to remove the N−1th and Nth $a_j$ and $x_j$ leads to EQ. 50. This equation is the final equation for the function that approximates g(t) when using equally spaced quadratic function segments that are piecewise continuous and constrained so that the slopes at the knotpoints are equal and that slopes and values at the beginning and end of the SD function are zero. EQ. 50 is a general $$g(t) = E(t) \sum_{j=1}^{N-2} \left\{ \frac{1}{8} \frac{\begin{pmatrix} (\sin(2\pi t(H_0 + (N-2)H_\delta))(-2N+2j) - \\ 2(N-1-j)\sin(2\pi t(H_0 + NH_\delta)) - \\ 2\sin(2\pi t(H_0 + jH_\delta)) + (4N-4j-2) \\ \sin(2\pi t(H_0 + (N-1)H_\delta)) + \\ 2\sin(2\pi t(H_0 + (j-1)H_\delta)))x_j \end{pmatrix}}{\pi^3 t^3} + \right.$$

$$\left. \frac{\frac{1}{8}\begin{pmatrix} (2(N-j)\cos(2\pi t(H_0 + (N-2)H_\delta)) + \\ 2\cos(2\pi t(H_0 + jH_\delta)) + 2(N-1-j)\cos \\ (2\pi t(H_0 + NH_\delta)) + (-4N+4j+2) \\ \cos(2\pi t(H_0 + (N-1)H_\delta)) - \\ 2\cos(2\pi t(H_0 + (j-1)H_\delta)))a_j \end{pmatrix}}{\pi^3 t^3} \right\} \quad (50)$$

formula for calculating g(t) that is linear in the variables $x_j$ and $a_j$.

The times when measurements are made are known, as are the starting basis frequency, $H_0$ and the width of each frequency interval, $H_\delta$. After these substitutions are made the result is a set of equations consisting of coefficients on the unknown N−2 unknown variables $a_j$ and the N−2 unknown variables $x_j$. The coefficients can be extracted and put in a rectangular matrix $\|A\|$. $\|A\|$ will have M rows and 2(N−2) columns where:

M=number of measurements, with the measurements being $t_i$, i=1 ... M

N=number of function segments (which is the same as the number of basis frequencies).

Set $\|A\|$ so that the first N−2 columns contain the coefficients for $a_j$ and the last N−2 columns contain the coefficients for the $x_j$. The equation for the first N−2 columns of $\|A\|$ is EQ. 51. The equation for the last N−2 columns of $\|A\|$ is EQ. 52. These equations assume that the envelope function is known, which is often the case, such as if the interrogating function is a $$A_{i,j} = \frac{1}{8}E(t_i)(2\cos(2\pi(H_0 + jH_\delta)t_i) - \qquad (51)$$
$$2\cos(2\pi(H_0 + (j-1)H_\delta)t_i) +$$
$$2(N-j-1)\cos(2\pi t_i(H_0 + NH_\delta)) +$$
$$2(N-j)\cos(2\pi t_i(H_0 + (N-2)H_\delta)) +$$
$$(-4N+4j+2)\cos(2\pi t_i(H_0 + (N-1)H_\delta)))/(\pi^3 t_i^3)$$

$$A_{i,j+N-2} = \frac{1}{8}E(t_i)(-2(N-j-1)\sin(2\pi t_i(H_0 + NH_\delta)) - \qquad (52)$$
$$2\sin(2\pi(H_0 + jH_\delta)t_i) + \sin(2\pi t_i(H_0 +$$
$$(N-2)H_\delta))(-2N+2j) +$$
$$(4N-4j-2)\sin(2\pi t_i(H_0 + (N-1)H_\delta)) +$$
$$2\sin(2\pi(H_0 + (j-1)H_\delta)t_i))/(\pi^3 t_i^3)$$

continuous sine or has other known characteristics. If the signal being analyzed has not been modulated by an interrogating function then set the envelope function E(t)=1 and the method will decompose the complete signal and not attempt to remove the effects of the interrogating signal.

Designate the values of the (currently unknown) N−2 values of $a_j$ as |a| and designate the (currently unknown) N−2 values of $x_j$ as |x|. Designate the vector |d| as being |a| stacked over |x|, thus |d| contains the unknown variables $a_j$, j=1 ... N−2 followed by the unknown variables $x_j$, j= ... N−2. The values |d| can be solved as described earlier, using, for example, the Moore-Penrose generalized inverse.

Figure 20:
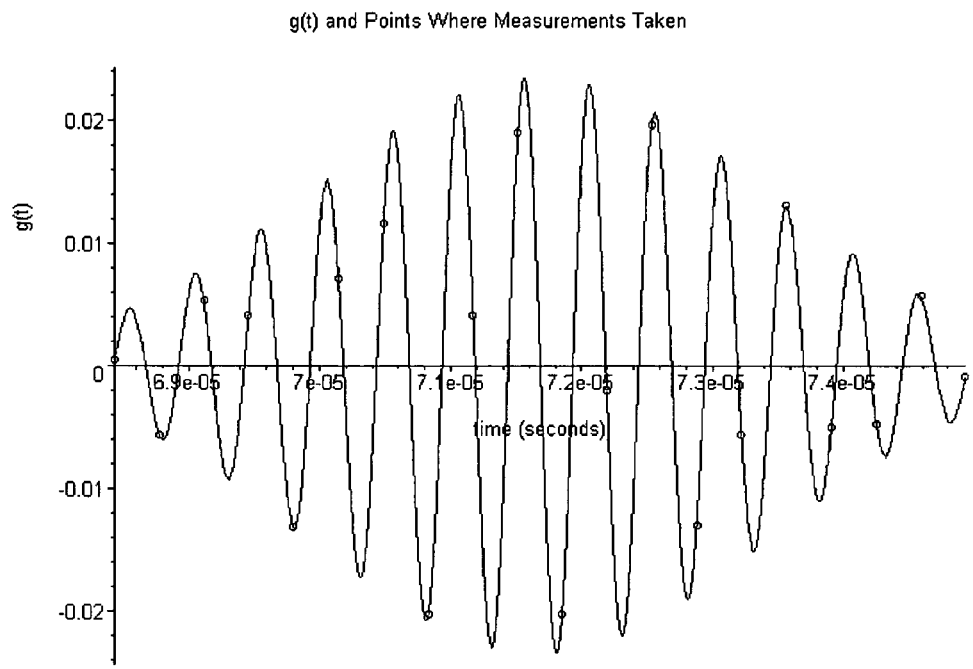
Figure 21:
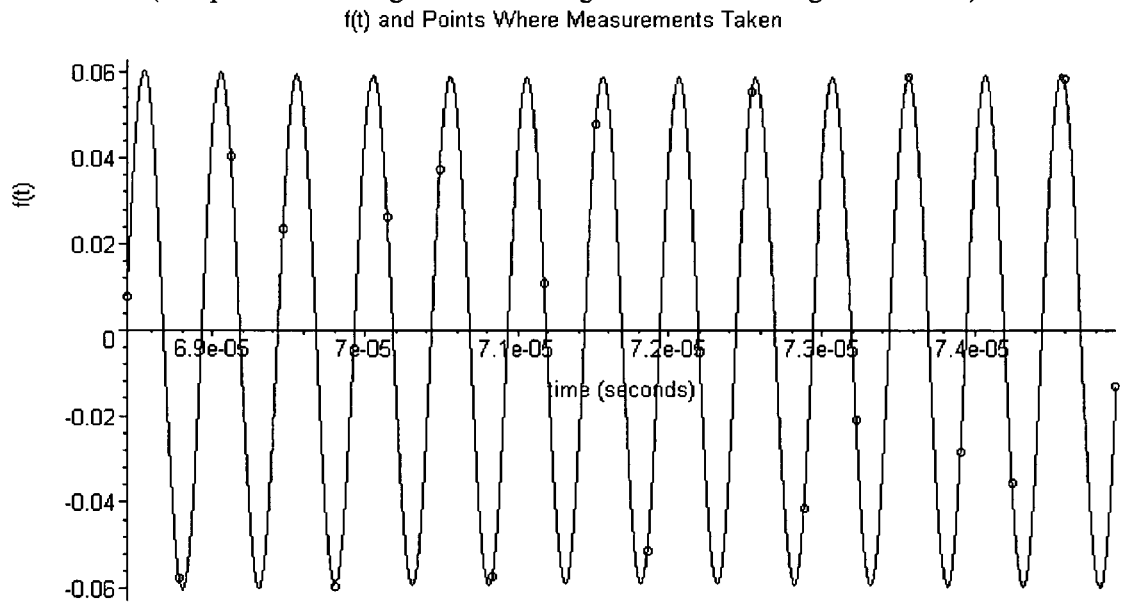

FIG. 15 through FIG. 23 illustrate the method just described using an example. The example uses a small number of measurements, 20, and seven quadratic function segments. FIG. 15 lists the parameters used to calculate the $\|A\|$ matrix shown in FIG. 16. The Moore-Penrose generalized inverse of $\|A\|$ is shown in FIG. 17. Only $\|P\|$ is needed to calculate the values of |d| from measured values of f(t). The 20 values of g(t) used in the example were calculated using the G(f) and F(f) shown in FIG. 19. A successful calculation will produce estimated G(f) and F(f) close to those shown in FIG. 19. FIG. 18 illustrates the envelope function used to generate the g(t). g(t) is illustrated in FIG. 20 along with the points where measurement values were taken. FIG. 21 illustrates what g(t) looks like after removing the effects of the envelope function. Contrary to the appearance of FIG. 21, this function has a period much longer than what is shown in the figure. The apparent periodicity of the signal at 2 MHz is caused by the narrow range of the spectrum that underlies g(t) and f(t).

Figure 22:
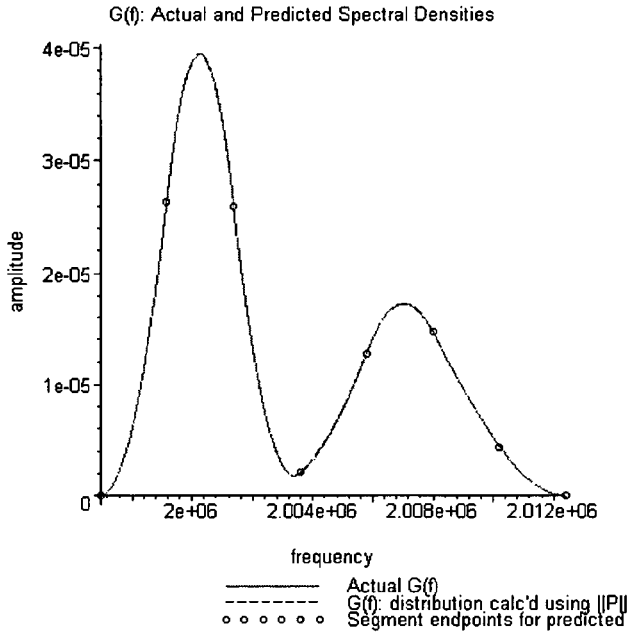
Figure 23:
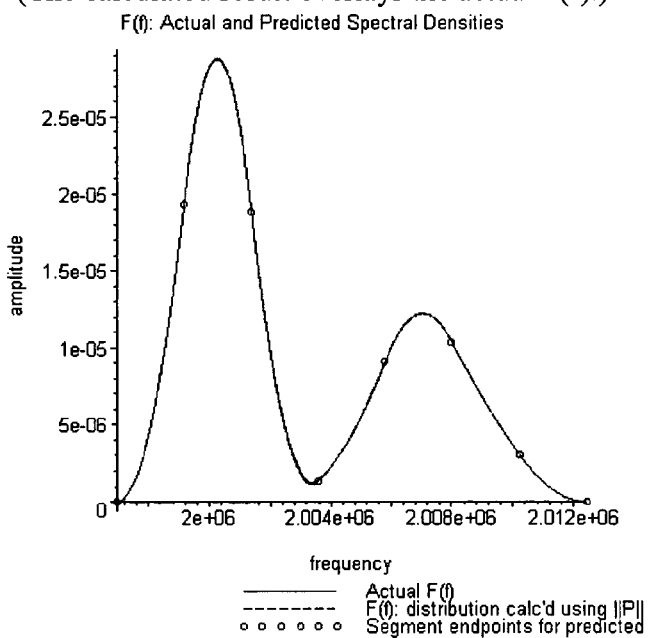

The values of |a| and |x| were calculated by multiplying $\|P\|$ times the vector of measured values of g(t). The resulting estimated SDC functions, G(f) and F(f), are shown in FIG. 22 and FIG. 23 along with the actual G(f) and F(f). Each figure shows only one line because the estimated values are so close to the actual function values. With the estimated SDC functions matching the actual SDC functions it is tautological that the estimated SD function will match the actual SD function.

This example illustrates some key features of the subject invention that distinguish it from other methodology inventions. (1) When using precalculated $\|P\|$ the calculations of the spectra involve a small number of multiplications and additions, which means that the calculations are not memory intensive and can be fast. The calculations do use numbers that can be close to the same size to the precision of the calculations can require on the order of 15 or more digits of precision. (2) The example discriminated the spectrum using a relatively small number of measurements. (3) The size of $\|P\|$ increases linearly with the number of measurements, therefore if use precalculated $\|P\|$ the computational cost of using more measurements increases only linearly. (4) The size of $\|P\|$ increases linearly with number of measurements, therefore if use precalculated $\|P\|$ the computational cost of using more basis frequencies (function segments) increases linearly. (5) Amplitude, SD, and SDC functions are calculated directly using rational functions, including using rational real-valued functions and rational real-valued continuous functions.

The solution method illustrated using linear algebra has practical limits for the number of basis frequencies that can be used. The basis frequencies being used are, by design, not producing orthogonal basis functions. Therefore, $\|A\|$ becomes increasingly singular as more basis frequencies are added, which tends to make the problem increasingly ill-posed when digitization errors exist in |f|. However, other variations in accordance with the present invention are described below that remove the problem of $\|A\|$ becoming increasingly singular.

When using uniformly spaced piecewise continuous quadratic function segments the SDC functions can be calculated using EQ. 53. EQ. 53 uses $a_j$ and will calculate G(f). Substituting $x_j$ into EQ. 53 will lead to calculating F(f). EQ. 53 was used to calculate the distributions in FIG. 22 and FIG. 23.

$$d(f) = \left(\sum_{j=1}^{N-1} \text{Heaviside}(f - H_0 - (j-1)H_\delta)\right) \quad (53)$$

Heaviside$(H_0 + jH_\delta - f)$ $$\left(H_\delta\left(\sum_{p=1}^{j-1}(-(2p-1)H_\delta + 2f - 2H_0)a_p\right) + \right.$$

$$a_j(f - H_0 - (j-1)H_\delta)^2)) +$$

Heaviside$(f - H_0 - (N-1)H_\delta)$

Heaviside$(H_0 - f + NH_\delta)$ $$\left(\sum_{j=1}^{N-2}(-a_j(H_0 - f + NH_\delta)^2(j+1-N))\right)$$

The equations needed for using equally spaced piecewise continuous quadratic function segments are summarized in FIG. 24. As stated earlier, functions other than quadratic functions may be used. FIG. 25 summarizes the equations needed for using equally spaced piecewise continuous function segments. The functions listed in these figures are examples of using the general method of the present invention and demonstrate its general use. As stated earlier, the functions do not need to be equally spaced, continuous, or polynomials. The basis functions used in FIG. 4 are B-splines. Among the other functions that can be used are those containing trigonometric and exponential functions.

Figure 26:
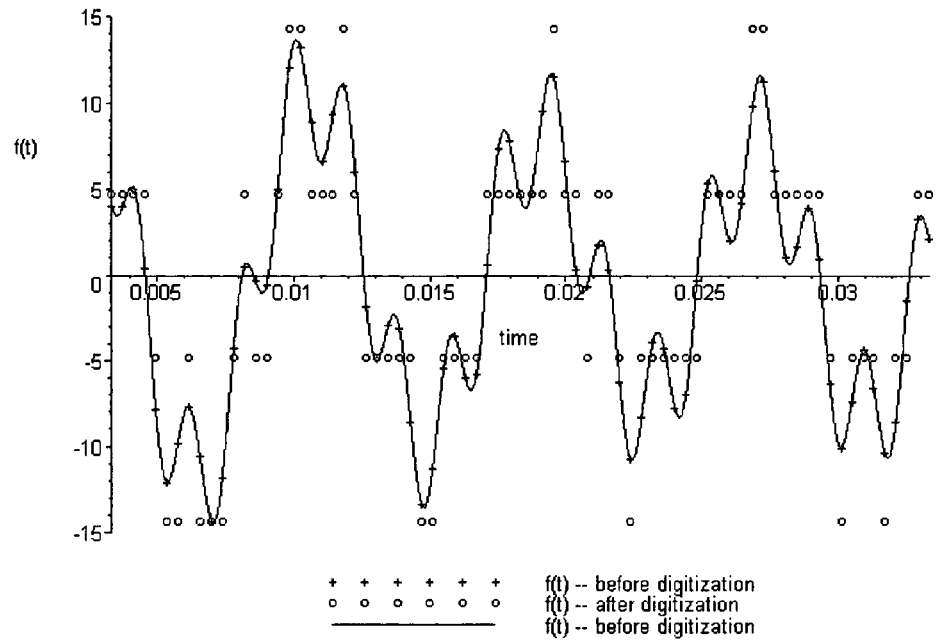

Measured values are necessarily digitized to some precision. Digitization introduces errors because the actual values of the function are not known. Instead, the values available have been moved to the centers of regions bounded by the measurement precision limits. These regions are discrete regions into which measurements are placed during the digitization process. These regions into which measurements are placed are the digitization bins. This shifting of actual values to digitization bins is illustrated in FIG. 26 for the case where the number of digitization bins is four. The solid line is part of the plot of a function consisting of three discrete frequencies. The crosses are the actual values at selected measurement times. The circles are the digitized values that occur when have four digitization bins. SD functions are necessarily calculated from data that have been digitized. The digitized data are an approximation of the actual function values, yet the desired SD functions are those that produced the actual functions. The present invention includes a means for using digitized data to estimate actual SD functions.

Figure 27:
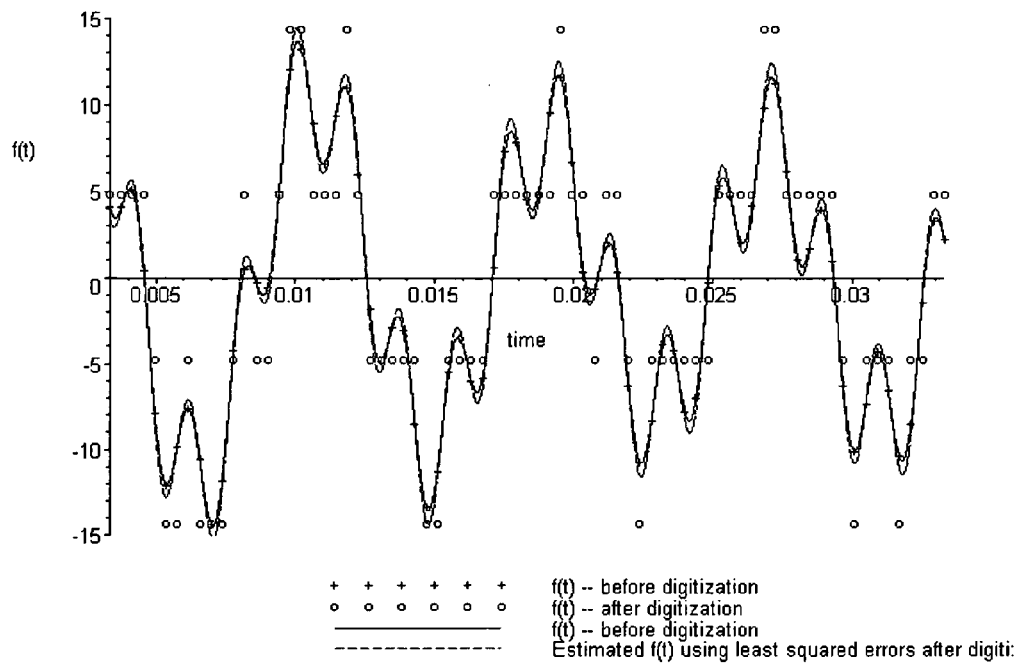
Figure 28:
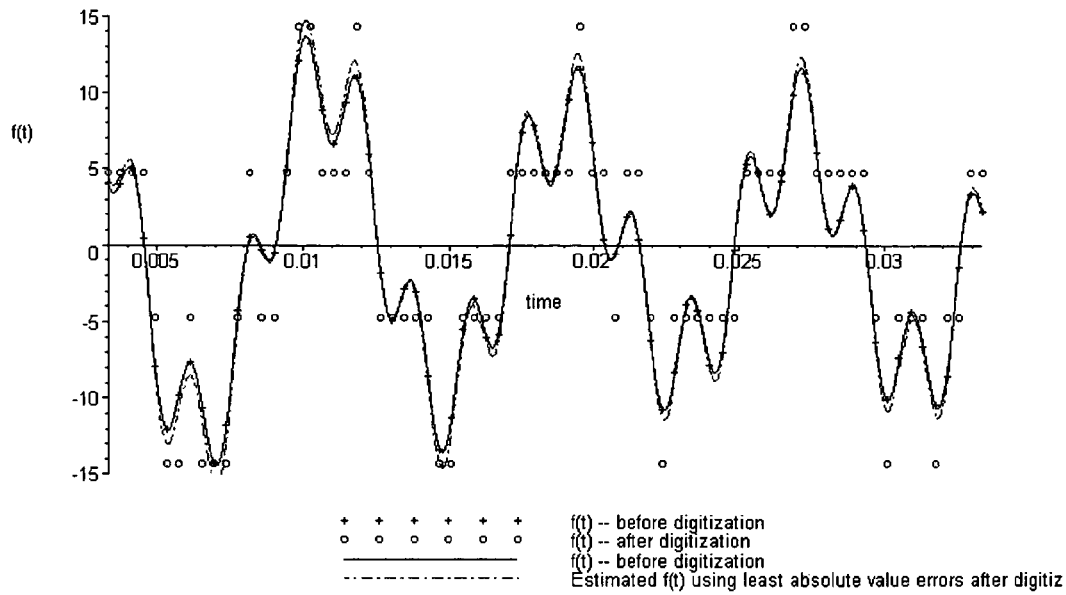
Figure 29:
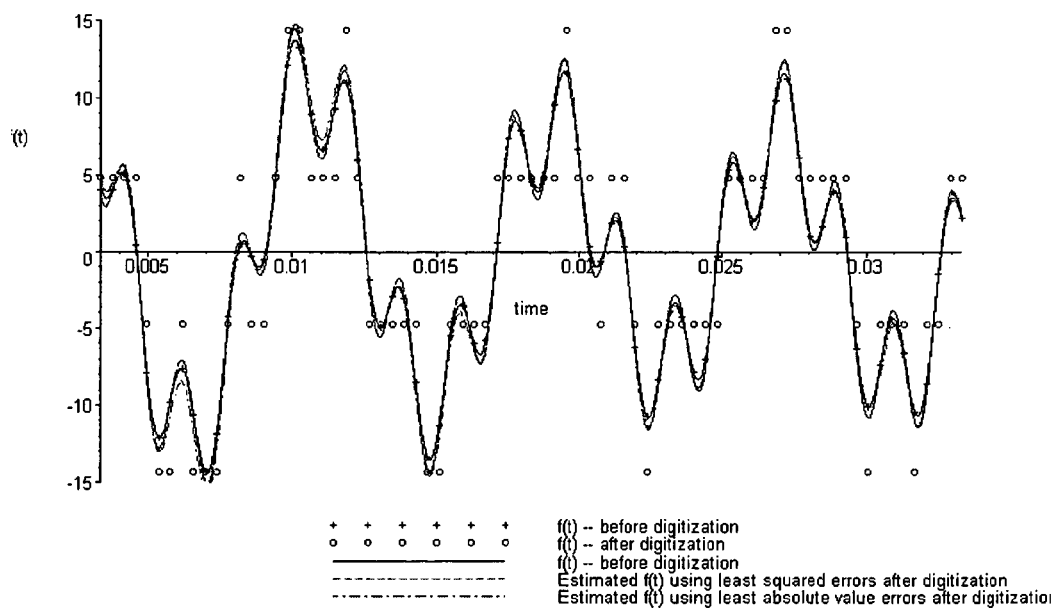

The method described above will generate SD functions that accurately estimate the measured values of f(t) that have been digitized. The reproduced values are the digitized values of f(t) and the SD functions are those bounded by the lower and upper basis frequencies. When using digitized data the estimated SD functions for the digitized f(t) become increasingly close to the spectra for the actual (nondigitized) f(t) as the precision of the digitization process increases. As the precision of the digitization process increases the measurement error decreases and the problem becomes less ill-posed. The method described above will accurately estimate SD functions for the special case where the frequencies of the function are known, even when the amount of digitization error is extreme. This ability is illustrated in FIG. 27 through FIG. 29. These three figures show the actual function values and the estimated function values when coefficients are calculated by minimizing the sum of least squared errors, FIG. 27, and by minimizing the sum of least absolute value errors, FIG. 28. FIG. 29 shows the results of both least squared errors and least absolute value errors along with the actual and digitized function data. The estimated results shown were calculated using the digitized data from the four digitization bins illustrated.

Typically, the frequencies that compose the function of interest are not known and an approach different than minimizing some objective measure of goodness of fit between estimated and measured (digitized) values is needed. The digitization process causes the measured values of f(t) to be moved from the real (and unknown values) to values that correspond to the centers of the bins bounded by the lower and upper thresholds specified by the number of bins into which data may be placed and the lowest and highest values of the total measurement range. The main consequence of the digitization process is that the measured values have almost always been shifted to values that are either higher of lower than the actual values. These shifts tend to introduce spurious frequencies into the measured data. The spectral decomposition methods that use objective measures to minimize differences between digitized values and estimated values calculates SD functions for the data presented to it (the digitized data), not the actual function of interest. Unless steps are taken in addition to those already presented, when the data have been sufficiently corrupted by the digitization process the resulting spectra no longer portray the spectra of the nondigitized data.

Figure 30:
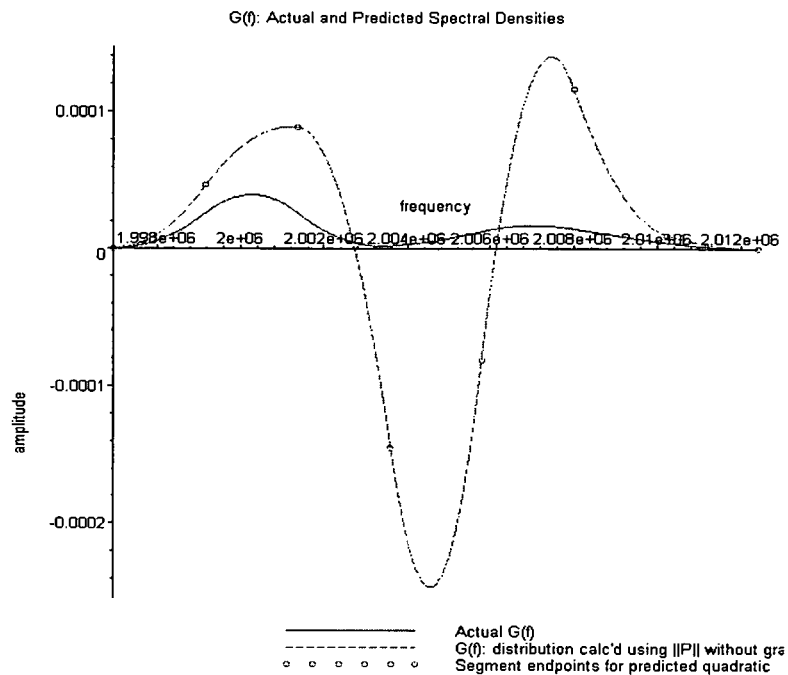
Figure 31:
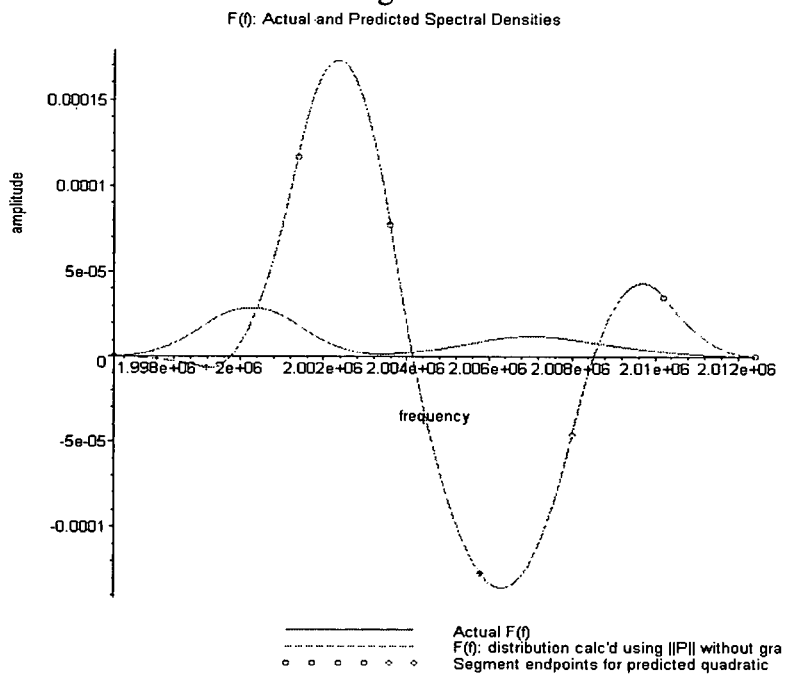

An example of calculated G(f) and F(f) with digitization errors when no steps are taken to account for digitization are shown in FIG. 30 and FIG. 31. Except that they are based on digitized rather than actual values of f(t), these figures are based on the same data and used the same $\|P\|$ as FIG. 22 and FIG. 23. The spectra for the digitized data can be used to calculate estimated values for the measured digitized data and the estimated values are the same as the actual digitized values, confirming that the calculations divined the correct spectra for the digitized data, while also confirming that spectra of the digitized data do not represent the spectra of the underlying function that was digitized.

Dithering the digitized data will improve the results, but dithering alone is often inadequate. Other steps are often necessary when processing data that have been digitized.

Increasing the number of digitization bins will improve the results. However cost and availability of suitable electronic components can limit the amount of such increases that are practical. Other steps besides increasing the number of digitization bins are often necessary.

One aspect of the present invention involves estimating SD and SDC functions in the presence of digitization errors by using error absorbing functions. Digitization causes more abrupt changes in the measured values of f(t) than actually occur. These abrupt changes manifest themselves in the frequency domain as the introduction of frequencies that do not exist in the actual f(t). Error absorbing functions are functions that are active outside of the frequencies that exist for the actual f(t) and that account to at least some extent for the spurious frequencies added by digitization. One example of an error absorbing function is including one or more SDC or SD functions to the basis and selecting the frequencies for the additional functions so that they are outside of the interval for the actual f(t). For example, the starting frequency for the absorbing functions can be a multiple, such as two more, of the highest basis frequency expected for the actual f(t). When the error absorbing function is set up using the same functional form as those used for the SDC or SD functions then the same objective measures may be used to calculate solutions, such as minimizing the sum of least squared errors or LAV. Error absorbing functions can be used in conjunction with other methods such as dithering.

Another aspect of the present invention involves estimating SD and SDC functions in the presence of digitization errors by using SD or SDC functions that have one or more properties that can be adjusted using an objective measure, such as by minimizing or maximizing the properties. The properties being adjusted may have a useful geometric interpretation, but such interpretations are not required. The adjustment of the properties may be subject to one or more constraints. Following are some examples of this aspect of the present invention. This aspect is particularly useful when the number of digitization bins is small enough to produce erroneous results and dithering does not produce correct results.

The SDC functions calculated using data significantly corrupted by digitization, as illustrated by FIG. 30 and FIG. 31, are known to be incorrect because G(f) is not always nonnegative. G(f) must be strictly nonnegative because it is based on the cosine of the phase angle, and the cosine function is an even function. Therefore, one aspect of the present invention is to calculate SD functions by constraining the calculated results so that one or more SDC functions or the SD function are strictly nonnegative.

For example, when G(f) is modeled using uniformly spaced piecewise continuous quadratic segments EQ. 54 is the general expression for the constraints for the $a_j$ that prevent G(f) from being negative anywhere. Only j=2...N−1 for a total of N−2 constraints are needed the area and shape of the SDC function. The heights of peaks and valleys of functions and the number of such features are also geometric properties.

Curvature is a geometric property. Curvature is any combination of one or more functions that are first and higher derivatives of SD, SDC, or amplitude functions. One type of curvature when using piecewise continuous quadratic function segments is the squared magnitudes of the vectors of the coefficients |a| and |x|. This measure of curvature is called the quadratic curvature and it is the sum of the squared second derivatives of the quadratic function (segments.

Similarity is another geometric property. Similarity is any combination of one or more functions of the parameters that characterize two or more SDC functions such that the parameters of a first and second SDC function are related. For example, the squared differences between parameters that define G(f) and F(f) is a similarity. If G(f) and F(f) are characterized using piecewise continuous quadratic function segments described earlier then the sum of squared differences between corresponding elements of |a| and |x| is another function using similarity. The geometric interpretation is that the similarity property relates to similar shapes, slopes, or changes in slopes between two or more SDC functions.

Another aspect of the present invention involves calculating one or more SDC functions or SD functions while adjusting one or more measures of geometric properties. For example, in accordance with this aspect of the present invention, the arc length of one or more of the SDC functions or the SD functions can be calculated so that the arc length measure meets one or more objective measures, such as being minimized. Similarly, in accordance with this aspect of the present invention, one or more SDC functions or SD functions can be $$\text{Heaviside}(a_j)\text{Heaviside}\left(-\frac{1}{2}\frac{\sum_{q=1}^{j-1}(2a_q)}{a_j}\right)\text{Heaviside}\left(-\frac{1}{2}\frac{\sum_{q=1}^{j-1}(2a_q)}{a_j}+1\right)\left(-2\left(\sum_{p=1}^{j-1}a_p p\right)a_j - \left(\sum_{p=1}^{j-1}a_p\right)a_j - \left(\sum_{p=1}^{j-1}a_p\right)^2 + 2j\left(\sum_{p=1}^{j-1}a_p\right)a_j\right) \Big/ a_j \leq 0 \quad (54)$$

$$-\left(\sum_{p=1}^{j}a_p\right) \leq 0 \quad (55)$$

because if these constraints are met then the first and last function segments are also forced to be nonnegative. EQ. 54 accounts for the minimum values of a function needing to be located within the interval for which the function segment is defined for its contribution to G(f). If G(f) is modeled as linear segments then the nonnegativity constraints for G(f) are expressed by EQ. 55.

SD and SDC functions have geometric properties. Geometric properties are properties that are affected by measures such as size, dimension, length, area, shape, and curvature. For example, the SDC functions depicted in FIG. 30 and FIG. 31 for the digitized f(t) have much larger amplitudes for the ones for the actual f(t). Similarly, the areas bounded between G(f) and F(f) and the frequency axis are much larger for the case with digitized data compared to nondigitized data. The bounded area of a spectral component function, G(f) or F(f), is the total area between the frequency axis and the curve above the frequency axis added to the absolute value of the area between the frequency axis and the curve below the axis. Bounded area is a geometric property because it is affected by calculated while adjusting one or more measures of the bounded area of one or more of the SDC functions or the SD function so that the area measure meets one or more objective measures, such as being minimized. Similarly, in accordance with this aspect of the present invention, one or more SDC functions or SDC functions can be calculated while adjusting one or more measures of the bounded area of one or more of the SD functions or the SD function so that curvature meets one or more objective measures, such as being minimized.

Calculating SDC or SD functions while adjusting geometric properties can be accomplished using various techniques. One technique is to minimize the measure of the geometric property, such as to minimize a measure of arc length, bounded area, or curvature of the function. When G(f) is based on evenly spaced continuous quadratic function segments one expression for a measure of the total are length is EQ. 56. The same equation calculates a measure of the total arc length for F(f) when $x_j$ are substituted for $a_j$.

$$\frac{3}{4}\frac{\sum_{j=1}^{N}m_j(f)}{H_\delta^3} = 5\left(\sum_{j=1}^{N-2}a_j\right)\left(\sum_{j=1}^{N-2}a_j(-N+j)\right) + \qquad (56)$$
$$2\left(\sum_{j=1}^{N-2}a_j(-N+j)\right)^2 + 4\left(\sum_{j=1}^{N-2}a_j\right)^2 +$$
$$\left(\sum_{j=1}^{N-2}\left(3\left(\sum_{k=1}^{j}a_k\right)\left(\sum_{q=1}^{j-1}a_q\right)+a_j^2\right)\right)$$

EQ. 56 is based on the square of the total arc length and it has had constant terms, such as the frequency increment, $H_\delta$, removed from the right hand side. Therefore, it represents a measure of the total arc length of an SDC function, rather than being the total arc length. These forms are independent of the frequencies being used in the basis. For example, for the case where N=5 the following expression is the measure of the total arc length of G(f).

$$\frac{3}{4}\frac{\begin{array}{l}m_1(f)+m_2(f)+m_3(f)+\\ m_4(f)+m_5(f)\end{array}}{H_\delta^3} = 5(a_1+a_2+a_3)(-4a_1-3a_2-2a_3) + \qquad (56)$$
$$2(-4a_1-3a_2-2a_3)^2 +$$
$$4(a_1+a_2+a_3)^2 + a_1^2 +$$
$$3(a_1+a_2)a_1+a_2^2 +$$
$$3(a_1+a_2+a_3)(a_1+a_2)+a_3^2$$

EQ. 56 is minimized when its gradient is calculated with respect to each of the coefficients, the $a_j$, and set equal to zero. EQ. 56 is quadratic in the coefficients, therefore the gradient with respect to each coefficient will be linear in the $a_j$. For example, when N=5 the gradient is EQ. 57. Identical expressions exist for F(f), except that they use the variable x instead of a.

$$[46a_1+30a_2+13a_3=0,\ 30a_1+22a_2+10a_3=0,\ 13a_1+10a_2+6a_3=0] \qquad (57)$$

The gradient equations are linear, therefore, they can be included as additional rows in the linear regression matrices used earlier, or in other calculation methods, such as LAV. The values used in the additional rows of ||A|| are the Hessian of the measure of the arc length measure. For example, if N=5 then the additional rows for the columns that multiply the vector |a| are $$\begin{bmatrix}46 & 30 & 13\\ 30 & 22 & 10\\ 13 & 10 & 6\end{bmatrix} \qquad (58)$$

The additional rows in the vector |f| will have some (nonnegative) values based on the underlying structure of the G(f) or F(f), or the additional rows in |f| can be set equal to zero to calculate values for |a| and |x| that minimize the squared errors between the estimated |f| and the measured |f| while simultaneously reducing the total arc length of G(f) and F(f). The number of gradient rows is limited by the number of quadratic function segments selected to model G(f) and F(f).

The number of gradient rows will necessarily be much smaller than the number of rows based on measured data. The contribution from the gradient rows can be scaled by multiplying each row by the a constant.

The example above used arc length as the geometric property. Other geometric properties can be used, such as bounded area, curvature and similarity. The measures of these properties also produce quadratic expressions that yield Hessian matrices with constant terms.

When SDC functions are calculated using least squared errors and rows for arc length measures or other geometric properties with quadratic measures are included and set equal to zero the resulting SDC functions possess the general shape of the nondigitized SDC functions, however the curves are much flatter than the actual SDC functions. As more function segments are included the general outline of the actual functions tend to become more apparent, but the results remain approximate. These approximate results are quickly calculated because the ||P|| matrix can be calculated in advance and stored for later use. These approximate results are useful starting points for more refined calculations of SDC and SD functions.

The values for parameters that characterize SDC and SD functions can be calculated from the gradient equations, such as the equations for the gradients of the arc length measures presented above. When the parameters, such as |a| and |x| when using equally spaced continuous quadratic function segments, are calculated using gradient equations the SDC functions tend to change systematically, which is beneficial when improved SDC and SD functions are being calculated from starting values of parameters.

In general, the values for the gradient terms for G(f) and F(f) that would be used in |f| are not known and the result is estimated spectral component functions that have amplitudes that are too small and too flattened. However, the results can be used as starting points for additional steps that can be taken to improve the results.

As described earlier, other geometric properties of SDC and SD functions can be used besides measures of arc length. The bounded area of SDC and SD functions is one such geometric property. FIG. 32 is an expression for a measure of bounded area of G(f) when piecewise continuous equally spaced quadratic functions are used as the basis functions. These expressions are based on the squared area between G(f) and the frequency axis and are quadratic. EQ. 59 is an example when N=5.

$$MAs_{1\ldots5}=251a_3a_1+158a_3a_2+33a_3^2+673a_1^2+738a_2a_1+217a_2^2 \qquad (59)$$

The gradient term is linear in terms of |a| and can be included in a least squared errors calculation as was done for the arc length measure, or in other calculation methods, such as LAV. The additional rows for the ||A|| matrix are the Hessian of the arc length measure. For example, when N=5 the Hessian is $$\begin{bmatrix}1346 & 738 & 251\\ 738 & 434 & 158\\ 251 & 158 & 66\end{bmatrix} \qquad (60)$$

Similar equations for F(f) exist for the measure of area expressions and are the same as the ones for G(f) except that a is replaced by x.

Nonnegativity and measures of arc length and bounded area are two examples of characteristics of SDC and SD functions that can be used to constrain the results of calculations. Other characteristics besides these can be used, such as those that are based on slopes, number of modes, relationships between mode peaks or valleys, curvature, similarity and other geometric properties.

The digitization process provides digitized values for f(t), but the actual values for f(t) can be anywhere within the digitization bin within which a digitized value falls. The probability distribution for the values within a bin is uniform: all values are equally likely to be correct. Consequently, no reason exists to prefer one value over any other. One aspect of the present invention is to calculate SDC and SD functions by constraining the calculated results to produce calculated estimates of f(t) that are within predetermined limits of digitized values. A particularly useful set of limits are the lower and upper limits for each of the digitization bins. This approach contrasts with standard least squares estimates, such as those of parametric methods, which minimize squared errors between actual and estimates, but do not constrain predicted results to be within predetermined boundaries based on the precision of the digitization process. Fourier analysis methods fit data to functions in a least squared errors sense, such as Fourier series fitting data to trigonometric polynomials in a least squares sense, in contrast to the aspect of the present invention that requires results to be within limits, but does not bias the results to come close to any particular value within the limits.

The measured values for f(t) have been digitized and the actual (nondigitized) values are not known. However, each of the digitized values for f(t) have known lower and upper limits. Each of the digitized values is a member of a digitization bin that has well defined lower and upper limits and any estimated value for a particular value of f(t) must be between the lower and upper constraint values. When all of the constraints for each of measured values of f(t) are considered collectively a set of digitization bin constraints exists.

The digitization bin constraints and the nonnegativity constraints can be combined with the general objective of minimizing one or measures of geometric properties, such as arc length, bounded area, curvature or similarity. Assuming that equally spaced piecewise continuous quadratic function segments are being used to model the spectral component functions then the equations in FIG. 33, FIG. 34, and FIG. 35 can be combined into objective functions to be minimized by using individual expressions or adding expressions together. All of the expressions in FIG. 33, FIG. 34, and FIG. 35 are convex in $a_j$ and $x_j$, therefore a unique global minimum exists for each of them and the local minimum is also the global minimum. These expressions may be combined into a single objective function to be minimized, such as the expression for the objective function in FIG. 36. This expression is also convex in $a_j$ and $x_j$ because the sum of convex functions is also a convex function.

Another aspect of the present invention involves calculating spectral densities from digitized data by minimizing or maximizing one or more functions that are continuous over at least part of the frequency domain. A further aspect involves, for such minimization or maximization, using one or more convex functions (when minimizing) or one or more concave functions (when maximizing) as objective functions in calculating SDC or SD functions. Using convex functions as objective functions for calculating SDC or SD functions is particularly beneficial when digitization errors exist in the measured values of f(t). Convex functions, unlike nonconvex functions, have unique global minimum values that are also the local minima for the functions. These properties make finding the minimum values of convex functions much easier than finding the minimum values of nonconvex functions.

Instead of minimizing functions that define properties of G(f) or F(f) it is possible to maximize functions. When maximizing functions it is beneficial to use concave functions because they have unique global and local maxima that are the same.

Another aspect of the present invention involves calculating SDC and SD functions by minimizing or maximizing one or more objective functions subject to constraints. Such constraints include using digitization bin constraints or nonnegativity constraints or using both digitization bin and nonnegativity constraints. Using digitization bin constraints is particularly advantageous. For example, if the objective is to minimize the arc length measure of G(f) and no digitization bin constraints exist then the shortest length is a straight line extending between the lowest and highest basis frequencies along the frequency axis. When digitization bin constraints are included then one or more of G(f) and F(f) must be nonzero if one or more of the values of f(t) are nonzero.

Two digitization bin constraints exist for each measurement: each estimated value must be larger than the corresponding minimum value for the bin and the each estimated value must be no larger than the corresponding maximum value allows for the bin. As the number of measurements increases the possible shapes and dimensions that G(f) and F(f) can have become increasingly restricted.

Convergence to the G(f) and F(f) that approximate the actual G(f) and F(f) for the nondigitized f(t) is often facilitated by identifying the actual lower and upper frequency limits, $f_L$ and $f_H$. The search for these limits may be started by starting with limits known to be wider than the actual limits and searching for the |a| and |x| that meet the digitization bin constraints and that minimize the objective function. Such a search is often facilitated by included nonnegativity constraints that prevent G(f) from having values less than zero.

The number of peaks for G(f) and F(f) may be know a priori, or they may be determined during initial calculations when nonnegativity constraints are used. If the number of peaks in G(f) are known to equal the number of peaks in F(f) then the number of peaks for F(f) can be determined using initial calculations. The method of the present invention quickly converges to solutions that correctly identify the number of peaks in G(f). When the number of peaks in F(f) is known then constraints that force F(f) to have a set number of peaks can be included. Such constraints can also be used to force G(f) to have a specified number of peaks. Similarly, constraints can be imposed to force a specified number of valleys to exist in G(f), F(f), or both of these functions.

In general, numerical methods must be employed to find the constrained minimum or maximum values of the objective functions. The nonnegativity constraints can be formulated as convex or monotonic functions. The constraints on the number of peaks or valleys of G(f) and F(f) can be formulated as convex or monotonic functions. The digitization bin constraints can be formulated as convex or monotonic functions. The objective function can be formulated as a quadratic function, as was done above. Therefore, the problem to be solved is a convex programming problem. Many methods, including quadratic programming, penalty function, barrier function, and those based on Lagrangian methods, exist and are well known. Penalty and barrier function methods are particularly well suited to solving the problems associated with estimating SD functions using the methods of the present invention.

The functional form of the envelope function E(t) in EQ. 23 may be known, although the values of the parameters may not be known. For example, a Gaussian pulse may used (EQ. 2) but the exact values of its parameters may not be known. The parameters of the envelope function can be quantified as the parameters for the SD or SDC functions are quantified.

The following description uses a specific medical device application for illustrative purposes. As will be appreciated, the present invention may also be readily employed in applications beyond the specific medical device application described, such use with living organisms other than humans or being used in applications other than medical. As will also be appreciated, the present invention may take on configurations other than those described and illustrated. For example, the means used for calculations may combine or separate functional units in configurations other than those described. As another example, the sequence of calculations may be done differently than those described. As another example, the independent variable may be a quantity other than frequency.

The general approach of the preferred embodiment consists of two steps:
(1) set up the problem and
(2) solve the problem The present invention contains novel and useful means for both of these steps.

The preferred embodiment minimizes a constrained objective function defined as:

$$COF = \frac{OF}{\lambda} + CVV + NCV + PCV \quad (61)$$

Where $$OF = |d| \|O\| |d|$$

Note: this is an algebraically equivalent form of the objective function comprised of the measures of the geometric properties of G(f) and F(f)
where
Q=½ of the Hessian of the objective function.
λ=the scale factor that makes $$\frac{|d| \|Q\| |d|}{\lambda}$$

have a suitable scale. λ is calculated using the latest estimate for |d|. To start by forcing the solution toward meeting all constraints the contribution of OF to the value of COF can be reduced by using a value of λ that makes $$\frac{|d| \|Q\| |d|}{\lambda}$$

have a value that is smaller than the magnitudes of CVV, NCV and PCV until the values of CVV, NCV, and PCV have started to diminish because constraints are being met. More preferred is using a value of λ as being two orders of magnitude larger than $|d|^T \|Q\| |d|$.

A preferred implementation sets up the OF using a plurality of functions that when combined using one or more mathematical operations, including, for example, the operations of addition, subtraction, multiplication, and division, produces a combined function that spans a predefined frequency range such that one or more combined functions approximate the SDC functions. Even more preferred is for the functions comprising a combined function to be polynomials. Still more preferred is to use real valued piecewise continuous functions. Yet more preferred is to use real valued piecewise continuous functions that are equally spaced along the frequency axis. Finally, even more preferred is to use piecewise continuous real valued quadratic functions that are evenly spaced along the frequency axis that have first derivatives with matching values at the points of intersection.

For measuring the spectra from blood flowing in an artery digitization errors will be significant, therefore a preferred implementation solves for the SDC functions by setting up and solving a constrained optimization problem. Preferably, the objective function will minimize or maximize one or more functions that are measures of geometric properties of one or more SDC functions, G(f) and F(f), or functions that are derived from G(f) and F(f), such as the SD function and the phase angle. G(f) and F(f) are based on the cosine and sine of the phase angle, respectively, and the amplitude of the SD function. The preferred objective function (OF) will be convex. Even more preferred is that OF is quadratic in |a| and |x|.

A preferred implementation sets up the problem so that it includes one or more digitization bin constraints and may include one or more nonnegativity constraints and may include one or more peak count constraints for G(f) or F(f). A preferred implementation sets up the constraints as penalty functions or barrier functions.

Figure 37:
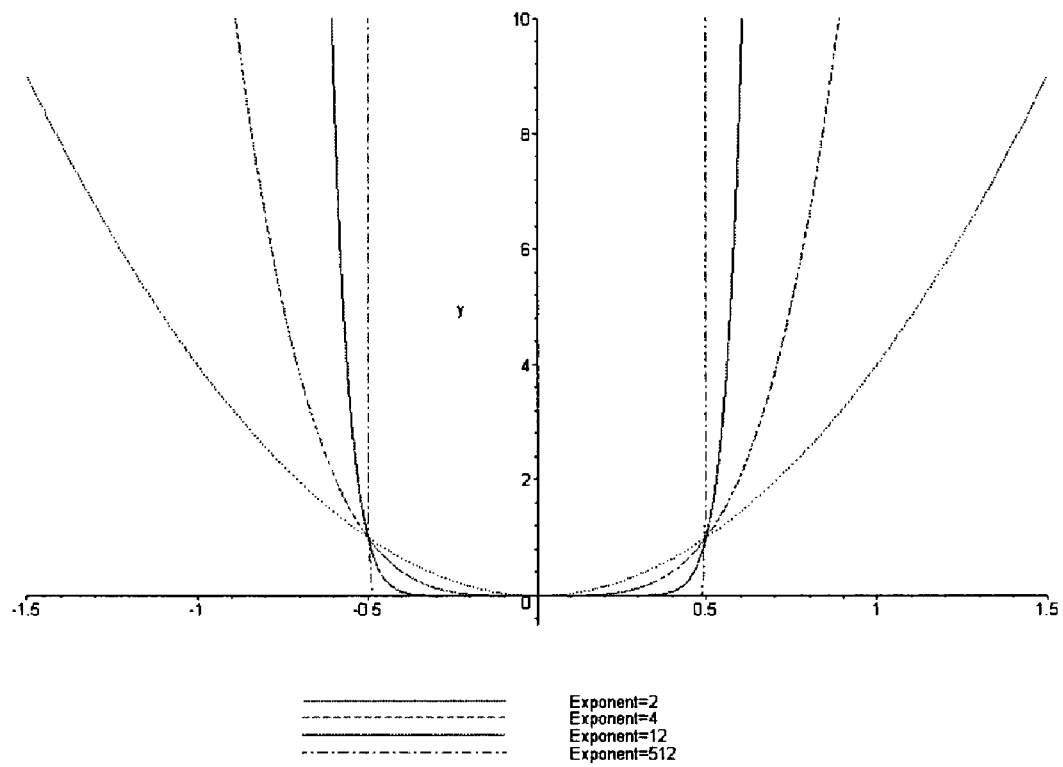

Particularly useful for the present invention is to formulate the digitization bin constraints as penalty functions that have small values when constraints are met and ever increasing values as deviations from the constraint limits increase. The digitization bin constraints require that the estimated values of f(t) fall within both lower and upper limits, therefore the digitization bin constraint value function has two sides that slope down toward the digitization bin boundaries. Such functions are double sided constraint boundary functions. Of even greater use are doubled sided constraint boundary functions that have slopes that can be adjusted as the search for the solution progresses. One such double-sided constraint boundary function is $$b(x) = \left(\frac{2}{w}\right)^p x^p \quad (62)$$

where x=deviation of estimated value for f(x) from the midpoint of the digitization bin
p is a positive, even, integer As p increases the digitization bin constraint violation value function becomes steeper, as illustrated in FIG. 37. For the preferred embodiment the value of the exponent p increases during the solution search process from a small value (e.g., p=2) to a large value (e.g., p=large value). As p increases the digitization bin constraint value function starts with sides with small slopes (e.g., p=2) and the slopes increase as then p increases until b(x) has a very small value at the constraint boundary because the sides have steep slopes (e.g., p has a large value). Typically, the final value of p will be large: much greater than 100, and better yet have values larger than 1,000. Still better, is to have final values of p approximately equal to or larger than 10,000. This function, in the limit of p=∞, is a step function at the constraint boundary, w.

The digitization process causes the actual value of |f| to almost certainly differ from the true value, but the digitized value is at the center of if the corresponding digitization bin and this information leads to M additional constraints. Extending the preferred CVV function to each of the measurements is now described. Let M the number of measurements.

|f| is the vector of measured values. |f| is a column vector with M values.

Let CVV=digitization bin constraint violation value. The preferred embodiment of the expression to calculate this value is:

$$CVV = \sum_{i=1}^{M} B_i |A_i|^T |d| \qquad (63)$$

where $$B_i(Beta[i]) = \left(\frac{2}{w}\right)^p (|A_i|^T|d| - f_i)^p$$

This expression is a double sided constraint violation value function.

$|A_i|$ is the ith row of the matrix $\|A\|$.

$|A_i|^T|d|$ is the estimated value of the ith measurement and $|A_i|^T|d|-f_i$ is the difference between the estimated value and the measured value of the ith measurement.

p is an even, positive, integer. If p=2 then there is a least squares fit. As p increases the constraint violation value function becomes steeper and its corners move closer to the digitization bin constraint values of $$f_i - \frac{w}{2} \text{ and } f_i + \frac{w}{2}.$$

The preferred embodiment specifies two ways to calculate NCV using one of two similar, but still different, functions. Refer to FIGS. 38 and 39. These functions are based on the general function form of $$NCV = p^r G_j(f_{j,ext})^2 fg_1 fg_2 fg_3 \qquad (64)$$

where $fg_1$=gate function that tends toward 1 when the extreme value for $G_j$ is on the frequency interval where $G_j$ is active and otherwise tends toward 0.

$fg_2$=gate function that tends toward 1 when $G_j(f_{j,ext})<0$ and that otherwise tends toward 0.

$fg_3$=another gate function that tends toward 1 when $G_j(f_{j,ext})<0$ and that otherwise tends toward 0.

$f=f_{j,ext}$, the normalized frequency at which the extreme value for the jth function segment occurs. The extreme value for $G_j$ occurs when f is between −1 and 0.

The preferred embodiment for $fg_1$ is based on setting up two functions that are multiplied together.

1) When $f_{j,ext}<0$: Set up a function that is 1 when the argument is less than 0 and otherwise is 0.

2) When $f_{j,ext}>-1$: Set up a function that is 1 when the argument is greater than −1 and otherwise is 0.

$$fg_{1,1} = -\frac{f}{2(f^2 + k_p)^{\left(\frac{1}{2}\right)}} + \frac{1}{2} \qquad (65)$$

$$fg_{1,2} = -\frac{1(1+f)}{2((1+f)^2 + k_p)^{\left(\frac{1}{2}\right)}} + \frac{1}{2} \qquad (66)$$

The product of the two functions covers $-1<f_{j,ext}<0$.

$$fg_1 = \left(\frac{f}{2(f^2 k^p)^{\left(\frac{1}{2}\right)}} + \frac{1}{2}\right)\left(\frac{1+f}{2((1+f)^2 + k^p)^{\left(\frac{1}{2}\right)}} + \frac{1}{2}\right) \qquad (67)$$

This is the expression that makes the nonnegativity constraint violation active when is on the frequency interval where $G_j(f)$ is active. Refer to FIG. 40 for an illustration of this gate function using two tapered Heaviside functions. Tapered Heaviside functions are described in more detail below.

The $k^p$ terms provide three features. k is a positive value between 0 and 1, and typically will be close to 1. The exponent p is a positive integer. Therefore, $k^p$ is always non-zero. $f^2$ of $1+f^2$ could be 0 so adding $k^p$ prevents a singularity from occurring. As p increases $k^p$ will decrease toward 0, but always be a positive value. f is a normalized frequency that will have values on the order of 1. The presence of $k^p$ at low values of p makes the gate functions rise slowly and have slopes that become steeper as p increases. At large p the gate functions approximate Heaviside functions, but without the singularity that occurs with the Heaviside function. These functions that approximate Heaviside functions, but that are tapered, are called tapered Heaviside functions. The tapering of these functions makes them much more useful than using Heaviside functions when searching for solutions. Using tapered Heaviside functions in constraints is a feature of the present invention. The ability to adjust the slope of the gate function facilitates convergence during the search process. The process can start with low values of p and then increase p to force the solution to ever more tightly enforce constraints.

The $k^p$ term provides a second useful feature besides providing a means of altering the slope of the gate functions. the presence of $k^p$ causes non-zero gradient and Hessians to occur, which are necessary for using Newton's method to find solutions.

The preferred embodiment for $fg_2$ is based on setting up one function. The second gate function is to have a value that tends to 1 when $G_j(f_{j,ext})<0$ and that otherwise tends to 0.

Following the same function form as just used, set up a function that is 1 when $G_j(f_{j,ext})<0$ and otherwise is 0. Base the expression on $$\frac{-G_j(f_{j,ext})}{\sqrt{G_j(f_{j,ext})^2}}$$

which will have a value of 1 when $G_j(f_{j,ext})<0$ and −1 when $G_j(f_{j,ext})>0$. This base expression has a total amplitude of 2. The desired range for the function is [0, 1], so divide by 2 to obtain the correct span for the range and then add $$\frac{1}{2}$$

to obtain a function that has the desired range. To avoid a singularity when $G_j(f_{j,ext})=0$ and to have the expression to produce increasingly sharp results as change a parameter, include a constant in the denominator. Unlike the functions based on $f_{j,ext}$, this function does not have a natural scale of 1.

Therefore, include a scale factor, μ. The extreme amplitudes of each $G_j(f)$ are linear in the $a_j$, and the other term in the denominator is $G_j(f_{j,ext})^2$, therefore a reasonable scale factor to use is the mean squared value of the $a_j$ in |a|. Another approach would be scale the $a_j$ by normalizing the function for which the spectral density function is being estimated. In that case, the natural scale factor would become 1. For the general case, the preferred embodiment uses the following expression for the second gate function:

$$fg_2 = -\frac{1G}{2(G^2 + \mu k^p)^{\left(\frac{1}{2}\right)}} + \frac{1}{2} \tag{68}$$

where
$0<k<1$
$1 \leq p$
μ: scale factor, $$\mu = \frac{\sum_{j=1}^{N-2} a_j^2}{N-2}$$

and
$G=G_j(f_{j,\,ext})$, the extreme value for the jth function segment, whether or not it occurs over the region where $G_j(f)$ is active.

Figure 41:
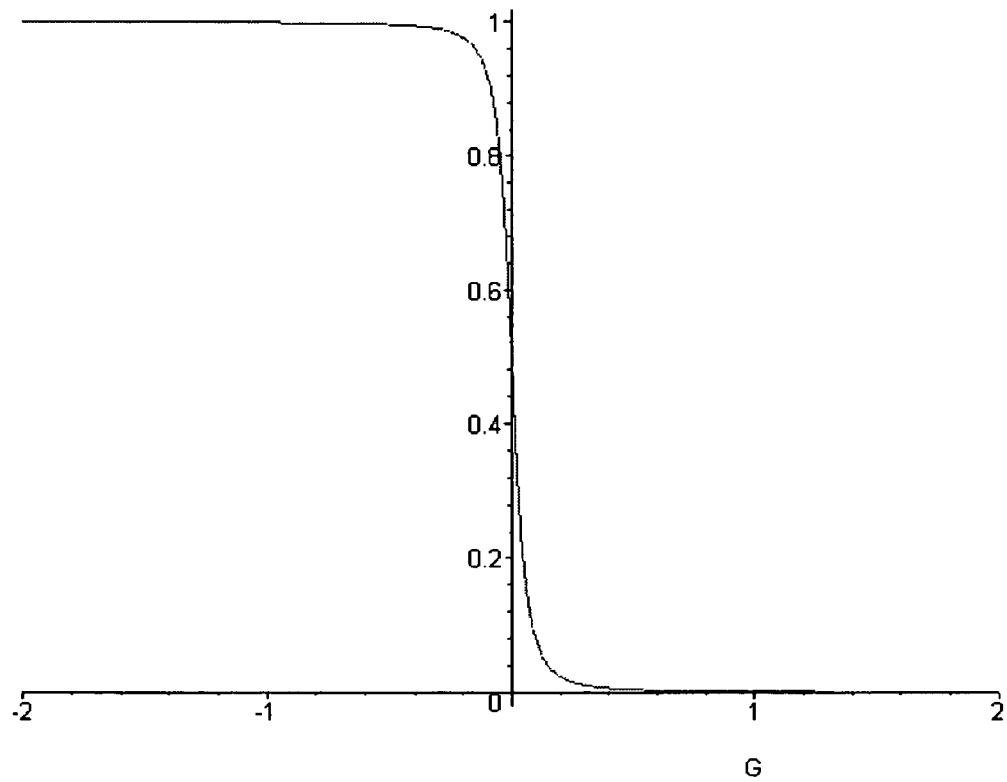

Refer to FIG. 41 for an example illustrating the second gate function. This figure shows the tapered Heaviside gate function for the case when the extreme value of $G(f)$ is less than zero.

The preferred embodiment for $fg_3$ is based on setting up one function. As was the case with the second gate function, the third gate function is to have a value that tends to 1 when $G_j(f_{j,ext})<0$ and that otherwise tends to 0. Following the same function form as just used, set up a function that is 1 when $G_j(f_{j,ext})$ is in a valley and that otherwise is 0. The second derivative of the jth segment of $G(f)$ is 2 $a_j$. Therefore, when $a_j>0$ the extreme is a valley.

Using the same function form as just used: Set up a function that is 1 when $a_j>0$ and otherwise is 0. Base the expression on $$\frac{a_j}{\sqrt{a_j^2}}$$

which will have a value of 1 when $a_j>0$ and −1 when $a_j<0$. The base expression has a total amplitude of 2 and the desired range is [0, 1], so divide by 2 to obtain the correct amplitude and then add $$\frac{1}{2}$$

to shift the zero. To avoid a singularity when $a_j=0$ and to have the expression produce increasingly sharp results as a change in parameter, include a constant in the denominator. Unlike the functions based on $f_{j,ext}$ this function does not have a natural scale of 1. Therefore, include a scale factor, μ. The other term in the denominator is $a_j^2$, therefore a reasonable scale factor to use is the mean squared values of the $a_j$ in |a|. Another approach would be scale the $a_j$ by normalizing the function for which the spectral density function is being estimated. In that case, the natural scale factor would become 1. For a preferred implementation use the following. This expression makes the nonnegativity constraint violation active only when $G_j(f_{j,ext})$ is less than 0. It has a range of [0, 1], the same as the expressions derived earlier.

$$fg_3 = \frac{1}{2}\frac{a_j}{\sqrt{a_j^2 + \mu k^p}} + \frac{1}{2} \tag{69}$$

where
$0<k<1$
$1 \leq p$
μ: scale factor, $$\mu = \frac{\sum_{j=1}^{N-2} a_j^2}{N-2}$$

Figure 42:
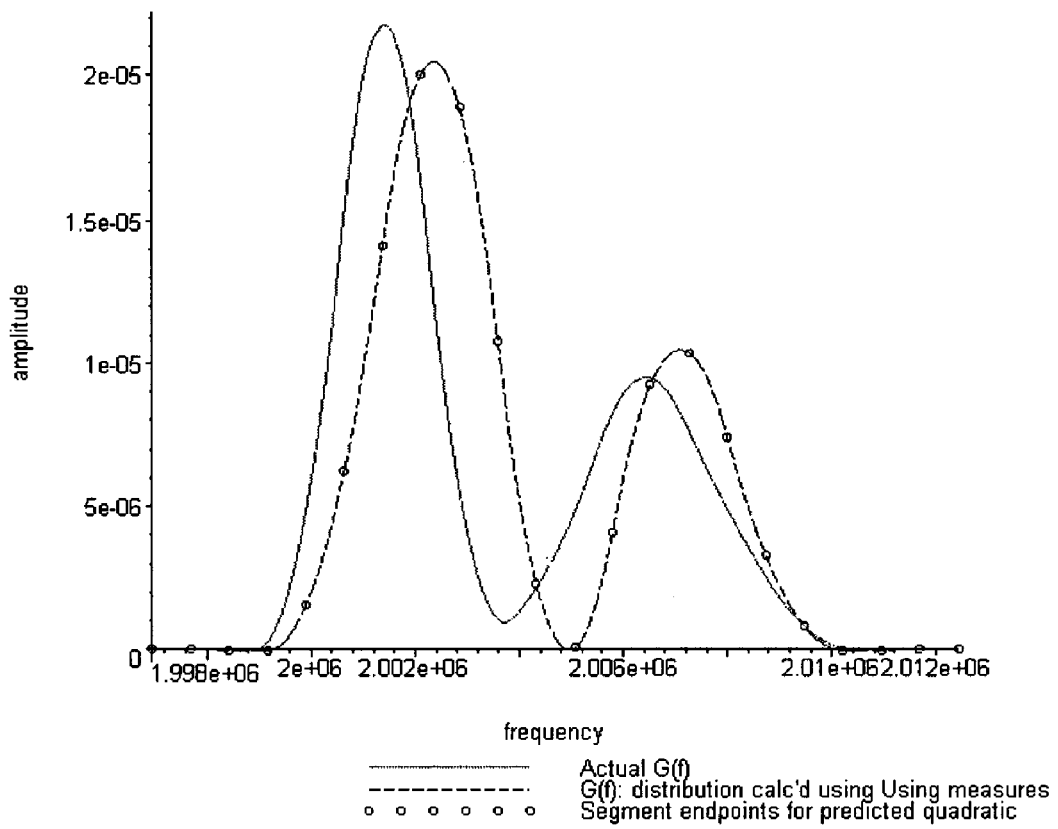

The general expression for NCV, EQ. 64, has a leading weighting factor with the exponent x. When x=2 the product of the gate functions is weighted by $G_j(f_{j,ext})^2$, which produces a nonnegativity constraint value function referred to as NCV 1. FIG. 38 presents NCV 1 for the preferred embodiment case of equally spaced piecewise continuous quadratic functions. NCV 1 forces valleys of $G(f)$ up to the frequency axis, and then stops influencing the position of the valley. If other components of COF are attempting to make a valley negative then an equilibrium position with the valley resting on the frequency axis results. This situation is illustrated in FIG. 42. When x=1 in the general expression for NCV then the nonnegativity constraint value function referred to as NCV2. FIG. 39 presents NCV2 for a preferred implementation case of equally spaced piecewise continuous quadratic functions.

One aspect of the present invention relates to the ability to determine the values for the lower and upper bound frequency limits, $f_L$, $f_H$. When these limits are not known, a preferred implementation uses a search to find them and this search uses NCV1 as the nonnegativity constraint in conjunction with the quadratic curvatures of both $G(f)$ and $F(f)$ as the objective function being minimized and the digitization bin constraints. The search starts using a wide frequency interval. The results are then used to identify one or more narrower frequency ranges to be used as the intervals for another sequence of calculations to determine function parameters. This iterative process may be used as many times as needed until no further improvements occur. The search is often adequate after fewer than 10 iterations, and not using more than this many iterations is preferred because the successive improvements in the results decrease. This iterative search for the frequency limits is preferred for use when such limits are not known before calculations begin to find the best estimates for the SDC functions. After the frequency limits are determined then the NCV2 nonnegativity constraint is used when making the best estimates of the SDC functions.

The peak count constraint value function (PCV), FIG. 43, is very similar to the nonnegativity functions. It uses two gate functions: one that tends to 1 when the $a_j<0$ (meaning that the extreme value is a peak) and another gate function that tends to 1 when the extreme value for $G_j$ is on the frequency interval where $G_j$ is active. Tapered Heaviside functions are used in the expression. This function essentially counts the number of peaks and squares the difference between the number of peaks and target number of peaks. The magnitude of the result is unity, the same as the magnitudes of the other constraints. As the PCV constraint is met its value will decrease as the square of the difference. For these reasons, do not include any additional weighting factor. To force the $k^p$ term used in the NCV function more quickly to a small value, the preferred embodiment uses $k^{(4p)}$ in the PCV function.

A preferred process for calculating the solution that minimizes the COF is to use a multidimensional Newton's method search with backstepping. The basic sequence of the preferred sequence of calculations to estimate SD or SDC functions is listed in FIG. 44 through FIG. 46. This sequence includes the steps used to set up the calculation sequence and then to execute the calculation sequence.

The illustrated process demonstrates that a scale factor, $\lambda$, is used in the calculations, but its value is easily calculated, unlike when scale factors are used with regularization, such as Tikhonov regularization. This process also illustrates that there is no need to estimate the order of a time series model, as is the case with parametric spectral analysis methods. The illustrated process further illustrates that the present invention does not require fitting data using a norm (such as least squared errors) that minimizes errors between estimated values and measured values, and that the method explicitly allows estimated values to take on only values that are within the precision of the estimated values. Explicitly allowing estimated values to take on any value within the corresponding digitization bins, but constraining solutions to only be selected that make estimated values be within the correct digitization bins, provides a better solution than other spectral analysis methods.

The basic sequence of calculations in FIG. 44 through FIG. 46 requires starting with an assumed |d|. The starting values for the elements of |d| are often approximately known, in which case these approximate values should be used. In the absence of approximate values, the values in |d| should start with very small nonzero values to reduce the number of iterations needed for the solution to be found. In the absence of an approximate estimate for the values of |d|, the preferred starting values for |d| are less than $10^{-1}$, and more preferably less than $10^{-5}$, and even more preferably less than $10^{-10}$, and yet more preferably less than $10^{-15}$.

A preferred objective function to use is the sums of the squared values of |a| and of |x|. This objective function is the same as the squared magnitude of |d|. This function will be minimized.

The basic sequence of calculations in FIG. 44 through FIG. 46 may be used with the complete set of measurements from the beginning of the calculations. Using a subset of the total measurements accelerates the calculations when only a poor estimate is available for the starting values of |d|. The method in accordance with the present invention converges quickly to reasonable values of |d| that define the SD or SDC functions, even when a small number of measurements is used. Starting with a very approximate estimate of |d| will usually quickly converge to a reasonable estimate, that can then be used as the starting |d| when the full set of measurements is used. When the number of measurements exceeds a modest number, for example exceeding 128, a preferred implementation starts with a subset of the measurements that spans the total measurement time interval. A preferred number of measurements for the initial calculations is fewer than about 4,096 with an even more preferred number being less than about 512. A preferred number of measurements for initial calculations exceeds 10. A more preferred number of measurements for initial calculations is in the range of 32 to 128. For example, 64 measurements could be selected for initial calculations.

A preferred implementation includes backstepping. This backstepping differs from the typical backstepping employed in Newton and quasi-Newton methods. The preferred backstepping reduces each successive trial change in |d| by an order of magnitude. The preferred approach is to try between 5 and 15 orders of magnitude reduction in steps of one order of magnitude in attempts to reduce the COF. Calculating the starting step is done in the usual manner with Newton's method, as is known. This calculation is computationally more expensive than attempting successive reductions in the step size as attempts are made to reduce the COF. A variety of refinements can be included after a step size has been found that reduces the COF. For example, the interval between the last two steps can be further subdivided to attempt to find an even lower COF. Such refinements can further include using a quadratic or other minimization to estimate the step size that gives the lowest COF.

In a preferred implementation the value of the exponent p present in tapered Heaviside functions and in the double sided constraint functions starts at small values and then is increased. All values of p must be positive even integers for it to be compatible with all of the constraint value functions. A preferred starting value is p=2. In a preferred implementation the final value of p depends on the desired sharpness of the double sided constraint function for CVV. A preferred implementation for calculating the final value of p follows. Define $\epsilon$ to be the allowed deviation from 0 at the digitization constraint boundary. It is a value that effectively becomes the same as 0. When a constraint is less than or equal to $\epsilon$ then the constraint is met. In a preferred implementation the value of $\epsilon$ is much less than 1 and even more preferably the value of $\epsilon$ is less than 0.001 and still more preferably the value of $\epsilon$ is less than or equal to 0.00001. Define a to be the fraction of the digitization bin width at which $\epsilon$ is to occur. $\alpha$ is how close to the edge of a digitization bin $\epsilon$ is to occur. In a preferred implementation the value of $\alpha$ is between 0 and 1. Even more preferred is the value of $\alpha$ being between about 0.9 and 1. Still more preferred is the value of $\alpha$ being between about 0.99 and 1. Yet more preferred is the value of $\alpha$ being between about 0.999 and 1. Calculate the value of the final value of the exponent p based on the fraction of the width of the digitization bin width to where deviation from 0 is $\epsilon$. The value of the final p is the even, positive, value that most closely satisfies the following equality $$\left(\frac{2}{w}\right)^p \left(\frac{\alpha w}{2}\right)^p = \varepsilon,$$

which equals $\alpha^p = \epsilon$. Therefore, a preferred implementation selects the final value of p as the even, positive integer that most closely makes the equality $$p = \frac{\ln(\varepsilon)}{\ln(\alpha)},$$

which is the same as EQ. 70.

$$p = \frac{\log 10(\varepsilon)}{\log 10(\alpha)} \qquad (70)$$

For example, if $\varepsilon=0.00001$ and $\alpha=0.999$ then the final value of p is pValStop:=11508.

The value of p is increased after each Newton method search with backstepping. A preferred increase in p is a value that is the next even positive integer that is no larger than 10 times the value of p most recently used. More preferred is increasing p to a value that is the next even positive integer that is no larger than twice the value of p most recently used. Even more preferred is increasing p to the next even positive integer that is no larger than ½ the value of p most recently used. In a preferred implementation the minimum increase in p is calculated by adding 2 to the most recently used value of p.

For each value of p a Newton method search with backstepping is done until no significant changes in COF occur or until no significant changes in any of the elements of |d| are made or until the Newton search procedure has executed a specific number of search steps. In the preferred embodiment significant changes in COF or |d| that lead to further Newton search iterations are fractional changes that exceed $10^{-2}$ of the starting values and even more preferably fractional changes that exceed $10^{-4}$ and still more preferably changes that exceed $10^{-6}$. In the preferred embodiment the maximum number of Newton search iterations for a particular value of p is between 5 and 100 and even more preferably between 10 and 50 and even more preferably between 10 and 25.

In a preferred implementation the number of basis frequencies, N, is between about 3 and about 50, and more preferably between about 6 and about 30. In a preferred implementation when the number of basis frequencies is greater than about 10 the calculations start with a value of N that is smaller than the final N and the SDC or SD functions for that |d| that are used to determine the starting |d| for the final N. Even more preferably, the starting value for N would be a factor of the final N. For example, if the |d| is desired for N=21 and G(f) and F(f) are being approximated by quadratic polynomials, then the first |d| calculated would be for N=7. The G(f) and F(f) from the |d| from N=7 is then used to calculate |d| for N=21 by fitting 21 segment piecewise continuous quadratic segments to the |d| calculated using N=7. Such curve fitting can be done using standard linear regression techniques. This |d| is then used as the starting |d| for the set of calculations that use N=21.

A preferred implementation performs the calculations using an augmented computing system, wherein such augmented computing system employs one or more electronic, magnetic, or optical components to perform digital or numerical calculations, and store or display the results of calculations. Augmented computing systems include devices that use one or more computers, microprocessors, or microcontrollers configured with nonvolatile or volatile data storage or retrieval means such as magnetic, optical, or electronic data storage or retrieval means and further configured to display or save calculation results or pass the results to a further processing step or system.

A preferred implementation saves the calculated results for use by other algorithms that rely on spectral density data, such as those that use such information for calculating flow rates or for diagnosing diseases. An example of such an algorithm and associated structure is disclosed in PCT Application No. WO 03/032556, published Apr. 17, 2003, which is incorporated herein by reference. Such storage can be done using methods that employ one or more of electronic, magnetic, optical, or hard copy implementations.

Another version of a preferred implementation displays data using optical means such as numeric or graphical displays such as those using one or more electronic means or hard copy.

Figure 47:
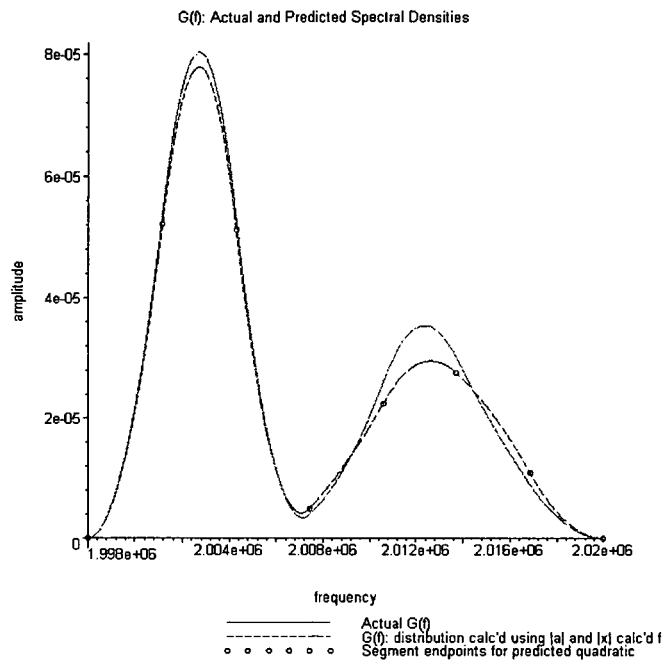
Figure 48:
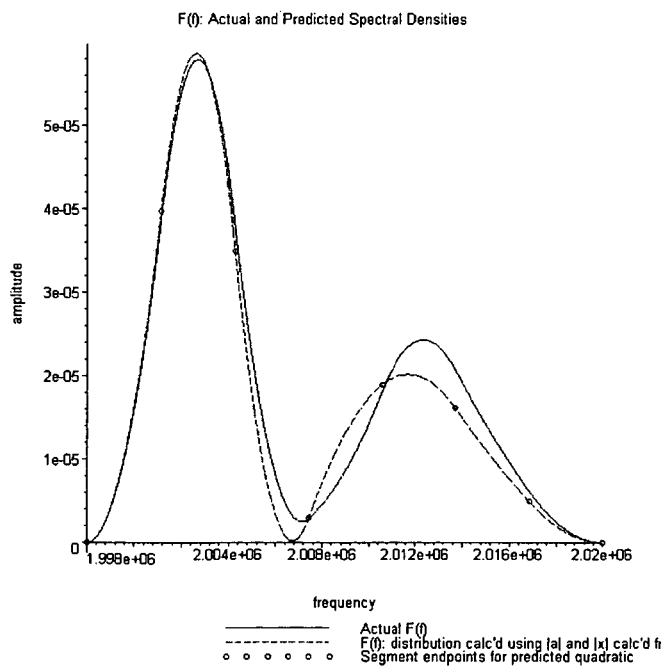
Figure 49:
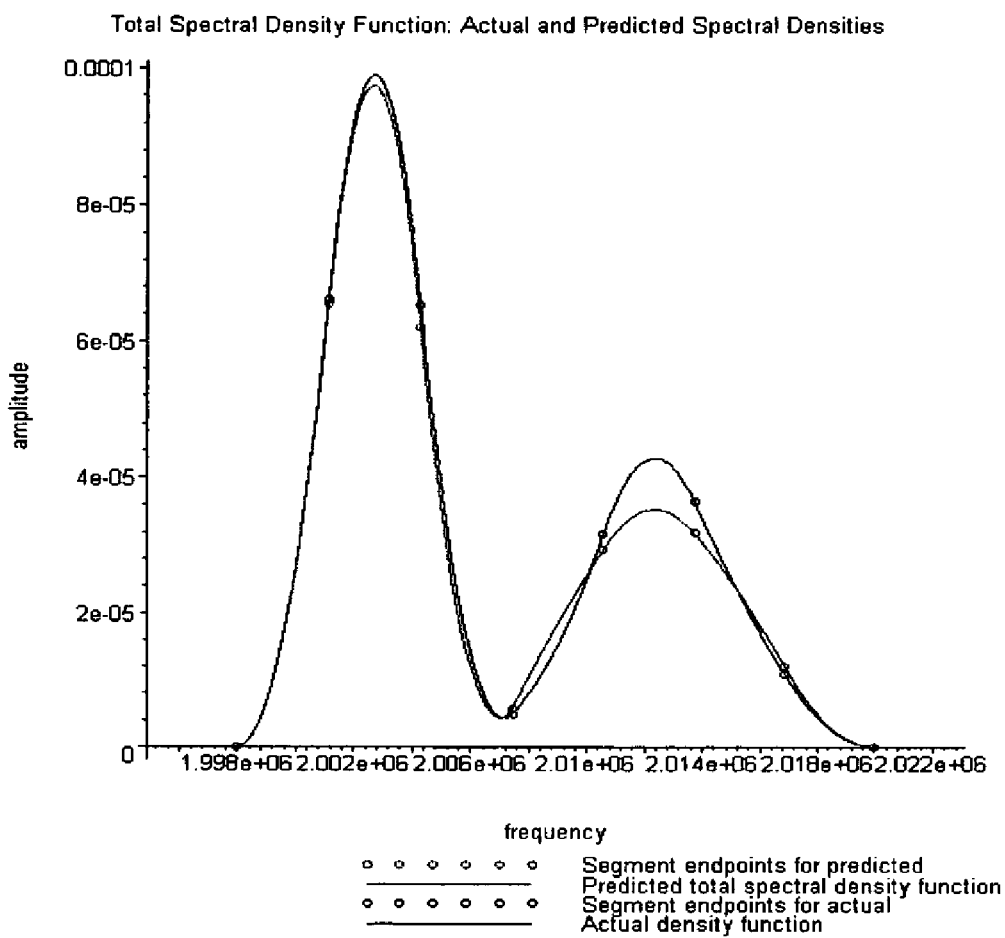
Figure 50:
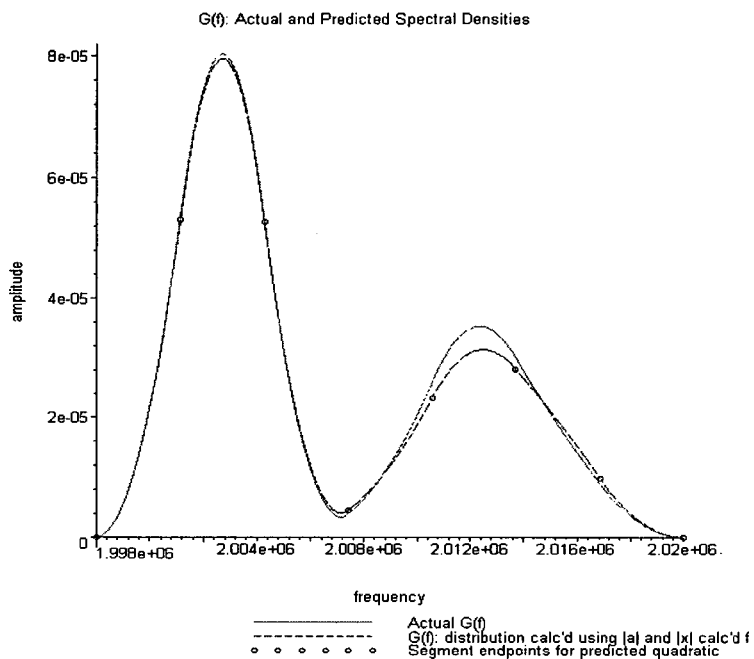
Figure 51:
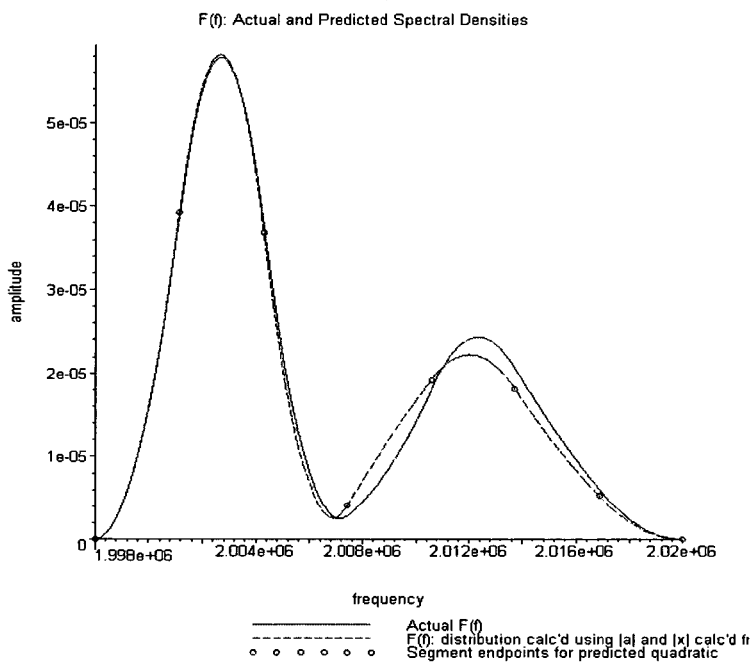
Figure 52:
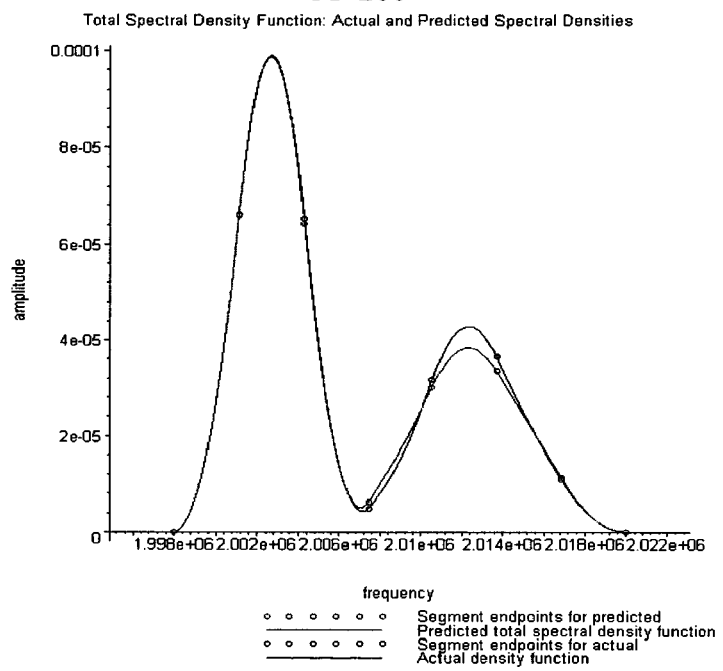
Figure 53:
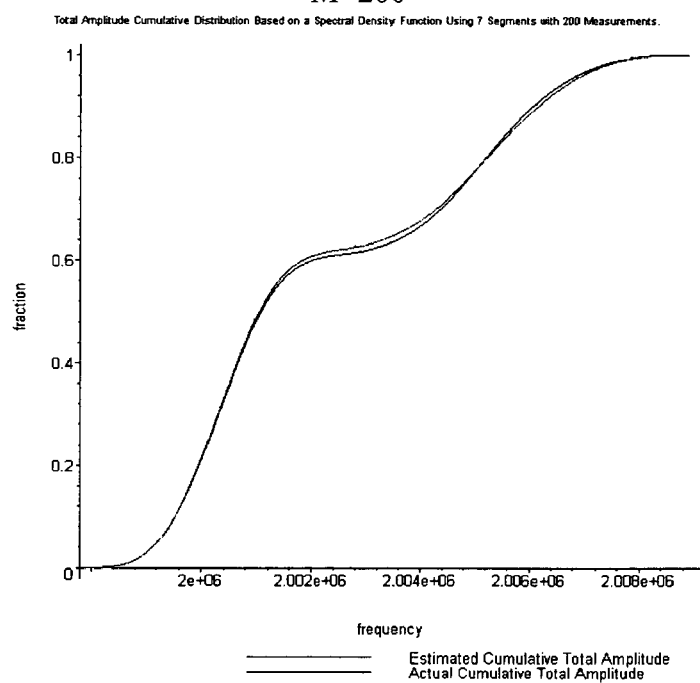
FIG. 53 Actual and Calculated Cumulative Spectral Density Function from Digitized Data (M=200)

FIG. 47 through FIG. 53 are example displays for calculations using the above procedure. All of these figures were calculated using 18 digitization bits, which corrupts the measured f(t) to the point where the spectral density estimates calculated using |P| are incorrect by more than an order of magnitude and G(f) has significant nonnegativity constraint violations. FIG. 47 through FIG. 49 were calculated using 50 measurements. The results are close to the actual SDC and SD functions using a small number of measurements demonstrating that the method produces useful results with an economy of measurements. FIG. 50 through FIG. 53 were calculated using 200 measurements. The results are closer to the actual SDC and SD functions, as they should be because the results are more constrained by the larger number of digitization bin constraints. FIG. 53 is the cumulative distribution calculated from the SD function. Cumulative distributions can be more useful than density functions for some purposes, such as calculating dimensions of tissue structures. One aspect of the present invention relates to its ability to generate continuous spectral density functions that are more readily converted into accurate representations of the cumulative spectral functions than methods that produce values at specific frequencies, such as Fourier methods.

Figure 54:
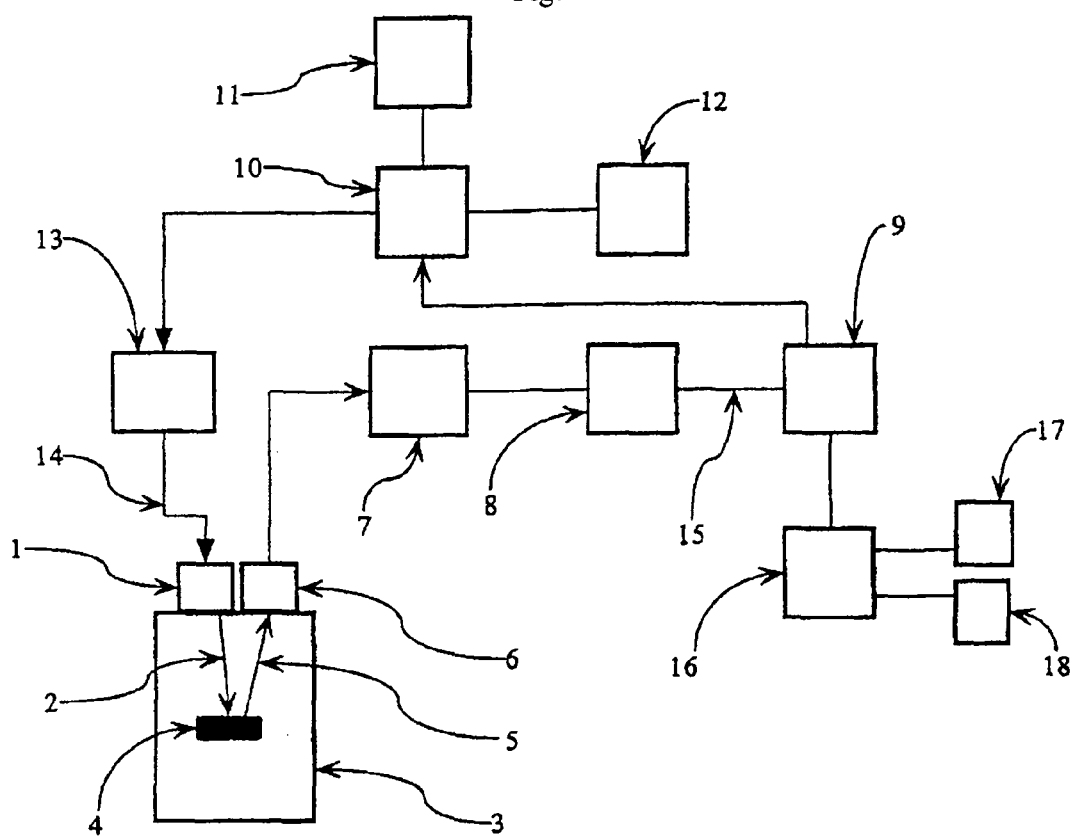
FIG. 54 Block diagram of one embodiment of a system in accordance with the present invention

FIG. 54 illustrates an example of a medical application in accordance with the present invention. In particular, the illustrated system uses an ultrasonic transducer 1 to introduce an interrogating signal 2 into a patient 3, such as for calculating flow rates or dimension related information, using a transform utility in accordance with the present invention. The transducer may be any of various conventional ultrasound units and may provide the signal 2 in the form of a pulse train. In accordance with the present invention, the transducer 1 may be disposed external to the patient 3, for example, in the suprastemal notch and may be directed so that the signal targets the ascending aorta. Depthwise targeting can be accomplished by processing return signal components received during the time window corresponding to the desired depth.

The interrogating signal 2 backscatters from patient tissues 4 and a return signal 5 is detected by the receiving transducer 6. The receiving transducer 6 converts the mechanical energy (not shown) of the return signal 5 into oscillating electrical signals (not shown) that are introduced into the analog amplification and processing module 7. This module may perform a variety of functions including analog digital conversion, amplification, filtering, conditioning and other signal enhancement. The output from the analog amplification and processing module 7 is a digitized stream of data that is the input to the digital processing module 8. The digital processing module 8 converts the digitized signal data into frequency spectra, in accordance with the present invention as described above, and then into velocity data which becomes velocity vectors that the digital processing module 8 stores as vectors of digital dimensioned velocity profile data in a memory location (not shown) of the data processing module 9. The data processing module 9 converts the velocity profile data (not shown) into one or more data vectors (not shown) that represent a piecewise continuous dimensioned velocity spectral density function.

The digital processing module 8 may contain one or more microprocessors and one or more data storage structures that enable it to make the calculations needed to determine Volumetric Flow Rates (VFRs) and derived parameters as described in the above-referenced PCT application. The data storage structures contain values for parameters used in lookup tables that facilitate calculations that avoid or reduce the need to evaluate special functions. Additionally, certain values such as a channel dimension, average flow rate or the like may be predetermined and stored in cache or other storage for combination with values obtained in connection with a later measurement process. FIG. 54 also illustrates that the system has a control module 10 that receives setup parameters (not shown) from the user 11. Setup parameters can include data such as patient parameters, e.g., hematocrit, and on/off signals regarding when data reading and processing should begin and end. The control module 10 receives signals from the data processing module 9 regarding the status of the received data (not shown) and changes in the interrogating signal 2 that are needed to improve or maintain quality measurement data. The control module 10 optionally receives signals of biological activity 12, such as electrical signals related to cardiac activity. The biological signals 12 may be used to synchronize interrogating signals 2 to biological functions or to correlate calculated values such as VFRs to such biological functions. The control module 10 signals the transducer power module 13 when the interrogating signal 2 should begin and end. The transducer power module 13 provides the drive signal 14 to the ultrasonic transducer 1. The data processing module 9 generates output data 15 that go to the output module 16.

The output module 16 generates visible displays 17 and audio devices 18 to inform the user of the system's operating status and the results of the system's interrogation of the patient 3.

The output module 16 may also include ports for providing data to other instruments (such as an EKG) or processing systems, for example, via a LAN or WAN. It will be appreciated that the various processing modules described above may be embodied in one or more computers, located locally or interfaced via a network, configured with appropriate logic to execute the associated algorithms. Additionally, certain signal drive and processing components may be incorporated into the interrogating signal instrument such as an ultrasound system.

The preceding description is not restrictive and presents an example of one implementation of some aspects of the present invention.

What is claimed is:

1. A medical signal processing method, comprising the steps of:
   receiving, at a processor of a medical device, time-based information corresponding to a defined time interval of a time-based, medical diagnostic signal that has been modulated based on interaction with at least one of tissue and fluid of a patient;
   performing, using said processor, a transform on said time-based information to obtain a frequency spectrum defined by a set of nonzero amplitude values, calculated directly from said transform, for a corresponding set of frequencies, said frequency spectrum including a number of said nonzero amplitude values at irregularly spaced frequency intervals, wherein said nonzero amplitude values include a first nonzero amplitude value at a first frequency value and a second nonzero amplitude value greater than said first nonzero amplitude value at a second frequency and said second frequency is a noninteger multiple of each frequency of said set of frequencies other than said second frequency, said step of performing a transform comprising representing said time-based medical diagnostic signal as a series of piecewise function segments; and
   operating said processor in a signal processing environment for using said transform to provide an output, including diagnostic information concerning said at least one of tissue and fluid of said patient, based on said time-based, medical diagnostic signal;
   wherein said time-based signal is an analog signal and said time-based information is digital time-based information, and said step of performing a transform involves accounting for a digitization error associated with a difference between said analog time-based signal and said digital time-based information, and further wherein said digital time-based information comprises a time series of digital values and said accounting involves defining a number of value ranges associated with said digital values, establishing a mathematical model defining a process for deriving said spectrum wherein a given digital value of said series of digital values is allowed to vary within one of said number of value ranges including said given digital value as part of said process, and using said mathematical model to derive said spectrum.

2. A method as set forth in claim 1, wherein a determination process for determining a specific value of said given digital value within said one value range involves modeling said determination process as a constrained optimization problem.

3. A method as set forth in claim 1, wherein said optimization problem involves a constraint related to a limit of said range.

4. A method as set forth in claim 2, wherein said optimization problem involves upper and lower constraints related to limits of said range.

5. A method as set forth in claim 2, wherein said optimization problem involves a nonnegativity constraint.

6. A method as set forth in claim 2, wherein said optimization problem involves a constraint related to a limit of said range and a nonnegativity constraint.

7. A method as set forth in claim 2, wherein said optimization problem includes a constraint related to a peak count within said range.

8. A method as set forth in claim 2, wherein said optimization problem is defined by a convex objective function.

9. A method as set forth in claim 2, wherein said optimization problem involves at least one constraint, and said constraint is implemented by one of a penalty function and a barrier function.

10. A method as set forth in claim 9, wherein said constraint is implemented by a Heaviside function.

11. A method as set forth in claim 10, wherein said Heaviside function is tapered at an area corresponding to a constraint value such that the function is free from singularities at said area.

12. A method as set forth in claim 1, wherein said accounting comprises establishing a mathematical model for imposing at least one constraint on a function associated with said spectrum.

13. A method as set forth in claim 12, wherein said constraint relates to a length of said function within a defined frequency range.

14. A method as set forth in claim 12, wherein said constraint relates to an area underlying said function within a defined frequency range.

15. A method as set forth in claim 12, wherein said constraint requires that said function have non-negative values within a defined frequency range.

* * * * *